(12) United States Patent
Roy et al.

(10) Patent No.: US 10,740,164 B1
(45) Date of Patent: Aug. 11, 2020

(54) APPLICATION PROGRAMMING INTERFACE ASSESSMENT

(71) Applicant: ACCENTURE GLOBAL SOLUTIONS LIMITED, Dublin (IE)

(72) Inventors: Debashish Roy, Covina, CA (US); Sachin Satija, Charlotte, NC (US); Brajesh De, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/802,238

(22) Filed: Feb. 26, 2020

(51) Int. Cl.
*G06F 9/54* (2006.01)
*G06F 21/57* (2013.01)

(52) U.S. Cl.
CPC .......... *G06F 9/547* (2013.01); *G06F 21/577* (2013.01); *G06F 2221/034* (2013.01)

(58) Field of Classification Search
None
See application file for complete search history.

(56) References Cited

U.S. PATENT DOCUMENTS

| 2019/0079734 A1* | 3/2019 | Kadam | ................... G06F 8/30 |
| 2020/0019699 A1* | 1/2020 | Araujo | ................... G06N 3/08 |

\* cited by examiner

*Primary Examiner* — Craig C Dorais
(74) *Attorney, Agent, or Firm* — Mannava & Kang, P.C.

(57) ABSTRACT

Examples of an API assessment system are provided. The system may obtain a security assessment requirement from a user for surveillance of a plurality of application programming interfaces. The system may create a data corpus from the assessment data associated with the query. The system may create a sequence classification model from the data corpus. The system may identify a plurality of risk parameters and a plurality of risk mapping levels associated with the query. The system may create a risk profile for the plurality of application programming interfaces based on mapping the plurality of risk parameters to the plurality of risk mapping levels and the sequence classification model. The system may create a rectification corpus and a data rectification model comprising a plurality of remediations for automated healing of a risk identified by the risk profile. The system may generate a security assessment result for the resolution of the query.

20 Claims, 31 Drawing Sheets

APPLICATION PROGRAMMING INTERFACE ASSESSMENT

BACKGROUND

The importance of Application Programming Interface (API) systems has been increasing with the rapid expansion of digital technology. API technology may provide programmatic access to critical data and services, which may be vulnerable to threats and attacks. Various organizations across the globe have been investing a vast amount of resources into technology related to preventing a breach of API data. Despite deploying such resources, the organizations face the challenge of being attacked for data theft and leakage of critical information.

Presently, organizations have been deploying various types of API security monitoring approaches such as API penetration testing before deploying an API in a production environment, a review of API design documents by various human resources, source code analysis for traditional code-based API. However, these approaches may be time-consuming, prone to error, and may detect issues at a stage where remediation may be complex and resource-intensive. Therefore, to ensure API security assessment effectiveness, efficiency, and completeness both qualitatively and quantitatively, an API assessment system may be required to ensure that API data may be obtained, processed, and analyzed for security leaks in an automated manner. Additionally, the deployment of multiple approaches for API security assessment may lead to low confidence remediation. There is a need for a system that may deploy a single holistic approach for multidimensional scrutiny of an API. There may be a need for a novel security assessment methodology for assessing an API for various security concerns. Additionally, there may be a need for a system that may process and present the API documentation in a corrigible manner, thereby facilitating the generation of key insights related to an API. There may also be a need for a system that may enable code review and establish API design predicates for future API development and upgradation.

Accordingly, a technical problem with the currently available systems for process optimization is that they may be inefficient, inaccurate, and/or not scalable. There is a need for an API assessment system that may account for the various factors mentioned above, amongst others, to generate a security assessment for an application programming interface in an efficient and cost-effective manner.

DETAILED DESCRIPTION

Figure 1:
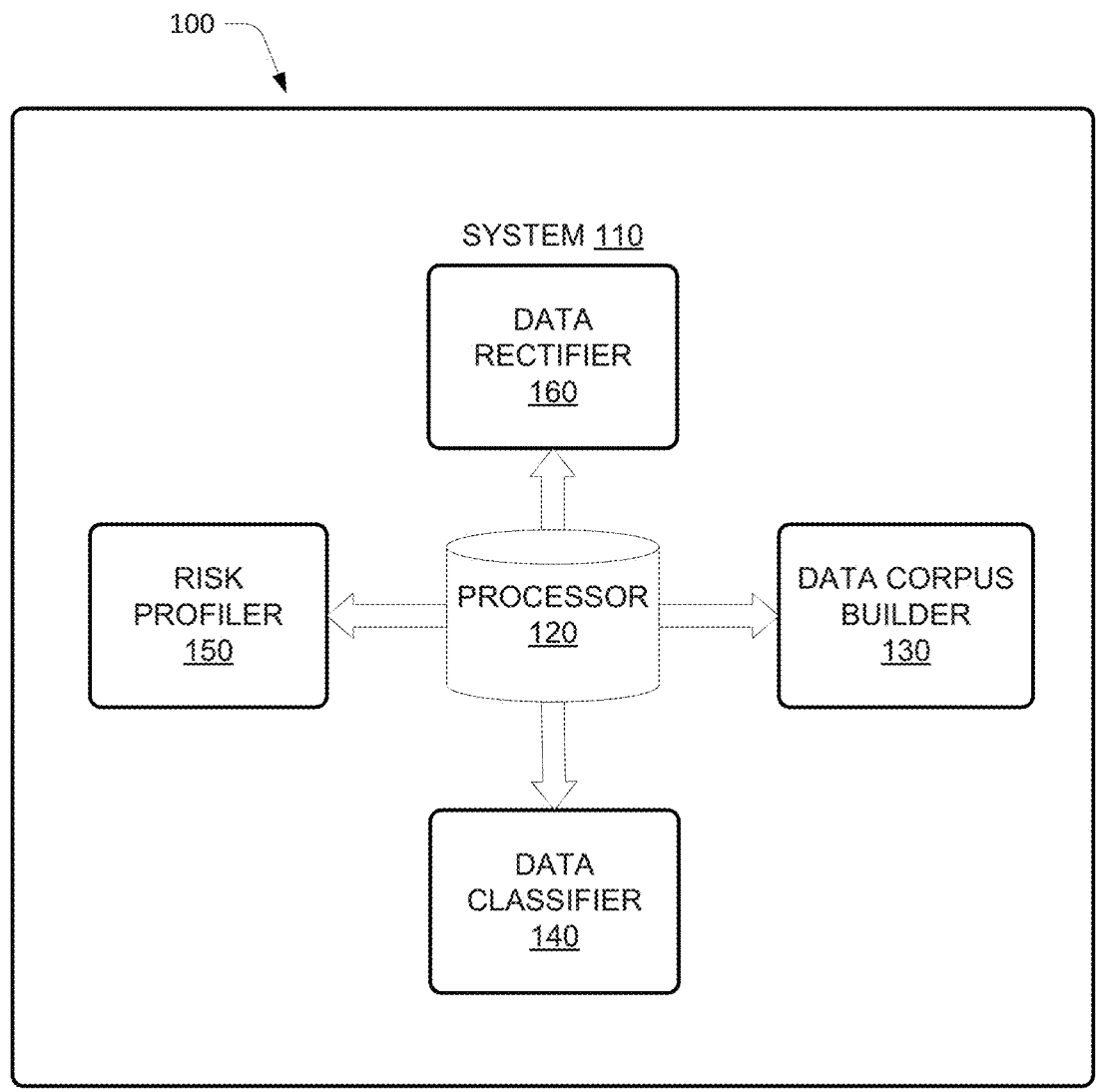
FIG. 1 illustrates a diagram for an application programming interface (API) assessment system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for security assessment including an application programming interface assessment system (APIAS). The APIAS (referred to as "system" hereinafter) may be used for an automated assessment for ensuring security, quality, and uniformity of an application programming interface (API). The system may provide for early detection of security issues with an API. The system may be deployed for generating insights related to technical API configuration. The system may facilitate the extraction of technical information related to an API by using an API policy word cloud for providing technical information.

The system may include a processor, a data corpus builder, a data classifier, a risk profiler, and a data rectifier. The processor may be coupled to the data corpus builder, the data classifier, the risk profiler, and the data rectifier. The data corpus builder may obtain a query from a user. The query may indicate a security assessment requirement relevant to surveillance of a plurality of application programming interfaces. The data corpus builder may obtain assessment data associated with the query from a plurality of data sources. The data corpus builder may implement an artificial intelligence component to sort the assessment data into a data corpus. The data corpus may include a plurality of attributes identified by the artificial intelligence component from the assessment data. Each of the plurality of attributes may be associated with the security assessment requirement.

The data classifier may implement a first cognitive learning operation to create a sequence classification model from the data corpus. The sequence classification model may comprise of a plurality of nodes identified from a deconstruction of an attribute from the plurality of attributes. The risk profiler may implement a second cognitive learning operation to identify a plurality of risk parameters associated with the security assessment requirement from the assessment data. The risk profiler may implement a second cognitive learning operation to identify a plurality of risk mapping levels. Each of the plurality of risk mapping levels may be associated with a weightage parameter indicating severity for a risk mapping level from the plurality of risk mapping levels for each of the plurality of risk parameters. Additionally, the second cognitive learning operation may create a risk profile for each of the plurality of application programming interfaces based on mapping the plurality of risk parameters, the plurality of risk mapping levels and the sequence classification model, the risk profile to include a risk score associated with an application programming interface from the plurality of application programming interfaces.

The data rectifier may implement a third cognitive learning operation to create a rectification corpus from the assessment data comprising a plurality of remediations associated with the rectification of each of the plurality of risk parameters. Additionally, the third cognitive learning operation may create a data rectification model for the risk profile associated with each of the plurality of application programming interfaces. The data rectification model may include the plurality of remediations associated with the rectification of each of the plurality of risk parameters associated with the risk profile for associated application programming interfaces from the plurality of application programming interfaces. In an example, the third cognitive learning operation may also generate a security assessment result based on the data rectification model, the security assessment result comprising each of the plurality of application programming interfaces assessed for resolution of the query. The data rectifier may initiate a remediation process to resolve the security assessment requirement based on the security assessment result. The remediation action may include initiating surveillance and/or initiating a remediation process to remedy risks associated with the plurality of application programming interfaces. In an example, the remediation process may be predefined, based on historical data and user feedback.

The embodiments for the security assessment requirement presented herein are exemplary in nature and should be treated as such. For the sake of brevity and technical clarity, the description of an API assessment system may be restricted to a few exemplary embodiments; however, to a person of ordinary skill in the art, it should be clear that the system may be used for the fulfillment of various security assessment requirements other than those mentioned hereinafter.

Accordingly, the present disclosure aims to provide an API assessment system that may account for the various factors mentioned above, amongst others, to assess an API in an efficient, and cost-effective manner. Furthermore, the present disclosure may categorically analyze various parameters to assess strategies for API implementation, perform an API security assessment, API risk prediction, and API risk rectification in an efficient and cost-effective manner.

FIG. 1 illustrates a system 110 for security assessment (referred to as system 110 hereinafter), according to an example implementation of the present disclosure. In an example, the system 110 may include a processor 120. The processor 120 may be coupled to a data corpus builder 130, a data classifier 140, a risk profiler 150, and a data rectifier 160.

The data corpus builder 130 may obtain a query from a user. The query may be indicating a security assessment. The security assessment requirement may be relevant to the surveillance of a plurality of application programming interfaces. For the sake of brevity, and technical clarity the description may include the system 110 being deployed on an application programming interface (API) from the plurality of application programming interfaces. Henceforth, for the purpose of this document, the plurality of application programming interfaces may be referred to as the API. In accordance with various embodiments of the present disclosure, the API may include a mashup of data services that may be exposed via different systems within an organization's intranet, and in some cases external systems across the Internet. In an example, the security assessment requirement may be associated with at least one of a process, an organization, and an industry-relevant for security assessment and data security assessment operations. The security assessment requirement may include defining an implementation strategy for an application programming interface (API). The security assessment requirement may include ascertaining if an API is being implemented by following the defined strategy. The security assessment requirement may be related to performing a security assessment for an API. The security assessment requirement may be related to various API implementation operations such as an analysis before deployment, API scanning before data migration, API upgrades, application scan to accelerate API support transition, and the like. The security assessment requirement may be related to risk prediction for various API management operations. The security assessment requirement may be related to generating key insights and data related to security concerns about an API system in a corrigible manner. The embodiments for the security assessment requirement presented herein may be exemplary in nature and a person skilled in the art must understand that the security assessment requirement may include any operation related to assessment and evaluation of an API. The system 110 may be an API management platform, which may allow a user to create, document, publish, manage and monitor application programming interfaces in a secure development environment.

The data corpus builder 130 may obtain assessment data associated with the query from a plurality of data sources. The assessment data may be data related to configuration, various definitions related to API, operation, and implementation of an API. The API definitions may include a configuration file or description which may contain the API policy logic or flow. The plurality of data sources may include various API platforms across the internet, various API platforms maintained by an organization, a new API platform acquired by an organization, a new update for an existing API platform, migration of an API platform from a server onto a different server, and the like. The data corpus builder 130 may implement an artificial intelligence component to sort the assessment data into a data corpus. The data corpus may be a collection of written texts comprising information related to an API. The artificial intelligence component may comprise the implementation of a data corpus fabricator that may include an intelligent machine learning module that may help in analyzing, extracting and classifying information from API description and help in building the data corpus. The artificial intelligence component may include the implementation of various natural language processing (NLP) techniques for processing the assessment data. For the sake of brevity, and technical clarity various NLP techniques may not be described herein, however, it should be clear to a person skilled in the art. This may a continuous process and enrich the data corpus. In accordance with various embodiments of the present disclosure, the data corpus builder 130 may obtain the assessment data on a near real-time basis from the plurality of data sources. The data corpus builder 130 may implement the artificial intelligence component on the assessment data obtained on a near real-time basis for creating the data corpus.

The data corpus may also be referred to hereinafter as "API policy corpus". The data corpus may include a plurality of attributes identified by the artificial intelligence component from the assessment data. In an example, each of the plurality of attributes may include written texts, descriptors, and the like related to an API which may be used by a machine learning module in API analysis and classification for resolution of the query. The plurality of attributes may include information related to the security assessment of an API. In accordance with various embodiments of the present disclosure, each of the plurality of attributes may include security-specific words and references that may have been extracted from the assessment data by the implementation of the artificial intelligence component. The plurality of attributes may include data related to the configuration of an API. The plurality of attributes may include various API codes. In accordance with various embodiments of the present disclosure, the API codes may refer to a set of human-readable instructions that may be converted into a set of machine readable instructions. For example, the API codes may be processed through a compiler and turned into a machine code that may be executed by a computer. The plurality of attributes may include descriptors related to the aforementioned API configuration and codes. The data corpus and the associated plurality of attributes may be a structured repository of API related information which may help the system 110 to classify unstructured API definitions. The plurality of attributes may comprise different API policy category, sub-category and relevant keywords, an attribute description & usage reference. Each of the plurality of attributes may be associated with the security assessment requirement. The data corpus builder 130 may implement the artificial intelligence component to update the data corpus and hence the plurality of attributes for keeping it relevant for resolution of the query. The data corpus built from various APIs may be used by the system 110 for further processing a new API that may relevant to the resolution of the query.

The data classifier 140 coupled to the processor may implement a first cognitive learning operation to create a sequence classification model from the data corpus. The data classifier 140 may help in building a structured representation of an API definition using the data corpus. The first cognitive learning operation may include the implementation of a machine learning (ML) engine that may use a combination of various NLP & classification techniques to classify the API components with help of the data corpus. For example, the first cognitive learning operation may include the extraction of API security-related information from an API related to the security assessment requirement. For the sake of technical clarity, the "API security-related information" may be referred to as "security tags for an API" hereinafter. The sequence classification model may be the sequential representation of API definition related to security assessment from the data corpus. The data classifier 140 may analyze and process the structured API definition from the plurality of attributes from the data corpus to provide a security map of the API. The sequence classification model may be comprising a plurality of nodes identified from a deconstruction of an attribute from the plurality of attributes. Each of the plurality of nodes may represent the security tags for an API arranged in a sequential manner and interconnected to other security tags from the data corpus. In accordance with various embodiments of the present disclosure, each node from the plurality of nodes may represent a security tag associated with the resolution of the query. In an example, the security tags associated with each of the plurality of nodes may be related to a security breach parameter.

The first cognitive learning operation may include the initiation of a multi-level sequential NLP technique (described further by way of subsequent Figs.) to create the sequence classification model from the data corpus. For example, the multi-level sequential NLP technique may include the extraction of API security-related information from an API related to the security assessment requirement. The multi-level sequential NLP technique may further include a first-level categorization of the security tags for an API based on the data corpus. The multi-level sequential NLP technique may include a second level categorical tagging of the security tags for an API based on the first level categorization and the data corpus. The multi-level sequential NLP technique may include a third level categorization of the security tags for an API based on the second level categorization and the data corpus. The third level categorization may facilitate the identification of a position of a security tag for an API with the sequence classification model. The data classifier 140 may implement the first cognitive learning operation to associate each of the plurality of nodes with the plurality of attributes from the data corpus. Therefore, the security tags for an API related to the security assessment requirement may be mapped with the data corpus for further processing. The system 110 may extract API attributes from the plurality of nodes of the sequence classification model and associate them with the plurality of attributes from the data corpus. For example, the system 110 may extract attributes like types of data exposed, a function of API and the like using various NLP techniques. The system 110 may map the extracted attributes with the corresponding plurality of attributes from the data corpus.

In accordance with various embodiments of the present disclosure, the data classifier 140 may redistribute the sequence classification model to create a harmonized sequence classification model comprising surveillance insight associated with the plurality of application programming interfaces. The harmonized sequence classification model may be used for the resolution of the query. The harmonized sequence classification model may be a word cloud visual representation of the sequence classification model wherein, each of the security tags for an API may be represented according to their prominence in the resolution of the query. The harmonized sequence classification model may be used to determine a relative prominence of the security tags for an API. The word cloud visual representation may identify the most prominent and least prominent security tags for an API. Therefore, the harmonized sequence classification model may be used to identify the security tags for an API that may be most prominent and least prominent from amongst the sequence classification model. The system 110 may deploy the harmonized sequence classification model for further processing of the query.

The risk profiler 150 may implement a second cognitive learning operation to identify a plurality of risk parameters associated with the security assessment requirement from the assessment data. The risk parameters may be a set of common and consistent security concerns that may affect an API. The second cognitive learning operation may be implemented to identify with criteria for mapping, evaluating, categorizing, and prioritizing the plurality of risk parameters. The second cognitive learning operation may be implemented to identify risk consequences for each of the plurality of risk parameters that may define an impact and the severity of a risk occurrence. The criteria may include identification of a threshold for each of the plurality of risk parameters to determine a probability of a risk occurrence, acceptability, and unacceptability of a risk parameter, a trigger event for a risk parameter, and the like. In accordance with various embodiments of the present disclosure, the plurality of risk parameters may include, for example, Access control (AC), Threat Protection (TP), Message Transformation (MT), Oauth (OA), Message Validation (MV), Mediation (MD), Quota Operations (QO), Rate Limit Operations (RLO), Cache Operations (CO), Custom script (CS), Logging & Auditing (LA), Call Out (CO), Structured Query Language (SQL) injections, JavaScript Object Notation (JSON) injections, Extensible Markup Language (XML) injections, spoofing, a man-in-the-middle attack (MITM) and the like. In accordance with various embodiments of the present disclosure, the system 110 may create the harmonized sequence distribution model so that the plurality of nodes may be mapped with the plurality of risk parameters. For example, the harmonized sequence classification model may be created so that the plurality of nodes may include various risk parameters from the plurality of risk parameters. For the sake of brevity and technical clarity, the term plurality of risk parameters may be used to include both the plurality of nodes as described above and various common and consistent security concerns that may affect an API.

The risk profiler 150 may implement the second cognitive learning operation to identify a plurality of risk mapping levels (described further by way of subsequent Figs.). The plurality of risk mapping levels may quantify risk likelihood and severity levels for each of the plurality of risk parameters. The plurality of risk mapping levels may facilitate mapping a security concern at an appropriate level of scrutiny. In accordance with various embodiments of the present disclosure, each of the plurality of risk mapping levels may be associated with a weightage parameter indicating severity for a risk mapping level from the plurality of risk mapping levels for each of the plurality of risk parameters. The weightage parameter may be used to provide the appropriate level of scrutiny to a security concern. The weightage parameter may be a unit to measure each of the plurality of risk mapping levels. The weightage parameters may be different for each of the plurality of risk mapping levels (explained in detail by way of subsequent Figs). In accordance with various embodiments of the present disclosure, the plurality of risk mapping levels may include a level 1, a level 2, a level 3, a level 4, and a level 5. In accordance with various embodiments of the present disclosure, the risk profiler 150 may assign a level score to each of the plurality of risk mapping levels based on the weightage parameter associated with the plurality of risk mapping levels. The level 1 may be associated with a Level 1 Score (L1), the level 2 may be associated with a Level 2 Score (L2), the level 3 may be associated with a Level 3 Score (L3), the level 4 may be associated with a Level 4 Score (L4), and the level 5 may be associated with a Level 5 Score (L5). The weightage parameter for each of the plurality of mapping levels may be inter-connected. For example, the weightage parameter for the level 1 may be connected to the weightage parameter from level 2.

The second cognitive learning operation may be implemented to assign a score to each of the plurality of risk parameters for each plurality of risk mapping levels (explained in detail by way of subsequent Figs.). In accordance with various embodiments of the present disclosure, each of the risk mapping levels may further include a plurality of groups. The plurality of groups for each of the risk mapping levels may be identified based on the weightage parameter. The plurality of groups may be used to analyze the plurality of risk parameters for a risk mapping level. For example, the level 1 may include a group 1, a group 2, a group 3, and a group 4 based on the weightage parameter such as degree of required protection. The plurality of groups for level 1 may be used to categorize the plurality of risk parameters based on the degree of protection required. The plurality of groups for each of the plurality of risk mapping levels may be assigned a score based on the weightage parameter. For example, for level 1 the group 1, the group 2, the group 3, and the group 4 may be each assigned a score based on the level of protection that may be required for the plurality of risk parameters classified therein. For example, at the level 1 from the plurality of risk mapping levels, the plurality of risk parameters that may require a low degree of added protection may be classified into the group 1 and may be assigned a group 1 score. The plurality of risk parameters that may require an average degree of added protection may be classified into the group 2 and may be assigned a group 2 score. The plurality of risk parameters that may require an above-average degree of added protection may be classified into the group 3 and may assigned a group 3 score. The plurality of risk parameters that may require a significant degree of added protection may be classified into the group 4 and may assigned a group 4 score. The group 1 score, the group 2 score, the group 3 score, and the group 4 score may be aggregated to form the level 1 score L1 (explained in detail by way of subsequent Figs.). The risk profiler 150 may determine the level 2 score L2, the level 3 score L3, the level 4 score L4, and the level 5 score L5 in a similar manner. In accordance with various embodiments of the present disclosure, the risk profiler 150 may compound values associated with the weightage parameter for each of the plurality of risk mapping levels to indicate an increase in the severity for a risk mapping level from the plurality of risk mapping levels (explained in detail by way of FIGS. 14A-20). For example, scores associated with the plurality of groups associated with the level 2 would have a higher value as compared to the plurality of groups associated with the level 1.

The risk profiler 150 may implement the second cognitive learning operation to create a risk profile for each of the plurality of application programming interfaces based on mapping the plurality of risk parameters to the plurality of risk mapping levels and the sequence classification model. The risk profiler 150 may map each of the plurality of risk parameters such as for example, Access control (AC), Threat Protection (TP), Message Transformation (MT), Oauth (OA), Message Validation (MV), Mediation (MD), Quota Operations (QO), Rate Limit Operations (RLO), Cache Operations (CO), Custom script (CS), Logging & Auditing (LA), Call Out (CO), Structured Query Language (SQL) injections, JavaScript Object Notation (JSON) injections, Extensible Markup Language (XML) injections, spoofing, a man-in-the-middle attack (MITM) and the like with the harmonized sequence classification model and identify a level of severity for each of the plurality of risk parameters indicated by a risk mapping level score from the plurality of risk mapping levels such as the Level 1 Score (L1), the Level 2 Score (L2), the Level 3 Score (L3), the Level 4 Score (L4), and the Level 5 Score (L5). In accordance with various embodiments of the present disclosure, the risk profiler 150 may implement the second cognitive learning operation to determine a multivariate regression model for creating the risk profile. In accordance with example provided above, the multivariate regression model may be for example determined using an equation such as, "API RISK PROFILE (ARP)=f [AC, TP, MT, OA, MV, MD, QO, RLO, CO, CS, LA, CO, L1, L2, L3, L4, L5]". The multivariate regression model may be provide an architecture to perform vulnerability assessment using structural representation of an API from the harmonized sequence classification model, and the plurality of risk parameters from the industry-specific aspects of the API related to the security assessment requirement along with a severity factor for each of the plurality of risk parameters signified by the plurality of risk mapping levels. In accordance with various embodiments of the present disclosure, the multivariate regression model may be the ordinal logistic regression by analyzing XML based API descriptors from the data corpus (explained further by way of subsequent Figs.). The ordinal logistic regression may facilitate mapping of the plurality of risk parameters with the plurality of risk mapping levels that may be ordinal variables due to presence of a specific number of outcome values such as for example, the level 1, the level 2, the level 3, the level 4, and the level 5. The risk profile may facilitate categorizing the individual API into 5 broad risk categories (explained further by way of subsequent Figs) using intelligent technology such as the second cognitive learning operation.

The risk profile may include a risk score associated with an application programming interface from the plurality of application programming interfaces. The risk score may indicate the presence of a risk along with an associated severity of the risk for a node from the plurality of nodes present in the harmonized sequence classification model. In an example, the risk score may be output from the equation mentioned above. The risk profiler 150 may determine the risk score associated with an application programming interface from the plurality of application programming interfaces based on an aggregation of the level score for each of the plurality of risk mapping levels. For example, the risk score may be an aggregation of the L1 score, the L2 score, the L3 score, the L4 score, and the L5 score (illustrated by FIG. 21). The risk score may be used to categorize an individual API into 5 broad risk categories such as low, elevated, guarded, high and severe. The risk score calculation may be explained in detail by way of subsequent Figs.

The data rectifier 160 may implement a third cognitive learning operation to create a rectification corpus from the assessment data and comprising a plurality of remediations associated with the rectification of each of the plurality of risk parameters for each of the plurality of risk mapping levels. The rectification corpus may include various actions related to the plurality of risk parameters based on the plurality of risk mapping levels. The rectification corpus may be identified from the plurality of sources as mentioned above. In an example, the rectification corpus may be identified from the data corpus. The third cognitive learning operation may include the implementation of various NLP techniques for identifying and creating the rectification corpus. The data rectifier 160 may update the rectification corpus on a near real-time basis. In an example, the data rectifier 160 may update the rectification corpus based on an update in the assessment data and/or the data corpus. The plurality of remediations included in the rectification corpus may be a collection of different remediation actions, and a repository of steps that may be taken for automated healing of various API's. The data rectifier 160 may implement a third cognitive learning operation to create a data rectification model for the risk profile associated with each of the plurality of application programming interfaces. The data rectifier 160 may map the risk profile with the rectification corpus to identify the plurality of remediations that may be suitable for the risk profile of an API. The conglomerate of the plurality of remediations for the risk profile of an API may be represented by the data rectification model for the API. The data rectification model may include the plurality of remediations associated with the rectification of each of the plurality of risk parameters associated with the risk profile for associated application programming interfaces from the plurality of application programming interfaces. The data rectifier 160 may implement the third cognitive learning operation may generate a security assessment result (explained further by way fi subsequent Figs.) based on the data rectification model, the security assessment result may be comprising each of the plurality of application programming interfaces assessed for resolution of the query.

In accordance with various embodiments of the present disclosure, the data rectifier 160 may obtain a user input to implement the data rectification model for the risk profile associated with each of the plurality of application programming interfaces. In accordance with various embodiments of the present disclosure, the data rectifier 160 may update the rectification corpus based on an update in the assessment data. In accordance with various embodiments of the present disclosure, the data rectifier 160 may initiate surveillance of the plurality of application programming interfaces to resolve the security assessment requirement based on the security assessment result.

The embodiments for the artificial intelligence component, the first cognitive learning operation, the second cognitive learning operation, and the third cognitive learning operation presented herein are exemplary in nature and should be treated as such. For the sake of brevity and technical clarity, the description of an API assessment system may be restricted to few exemplary embodiments, however, to a person skilled in the art it should be clear that the system may be used for the fulfillment of various security assessment requirements other than those mentioned hereinafter.

Figure 2:
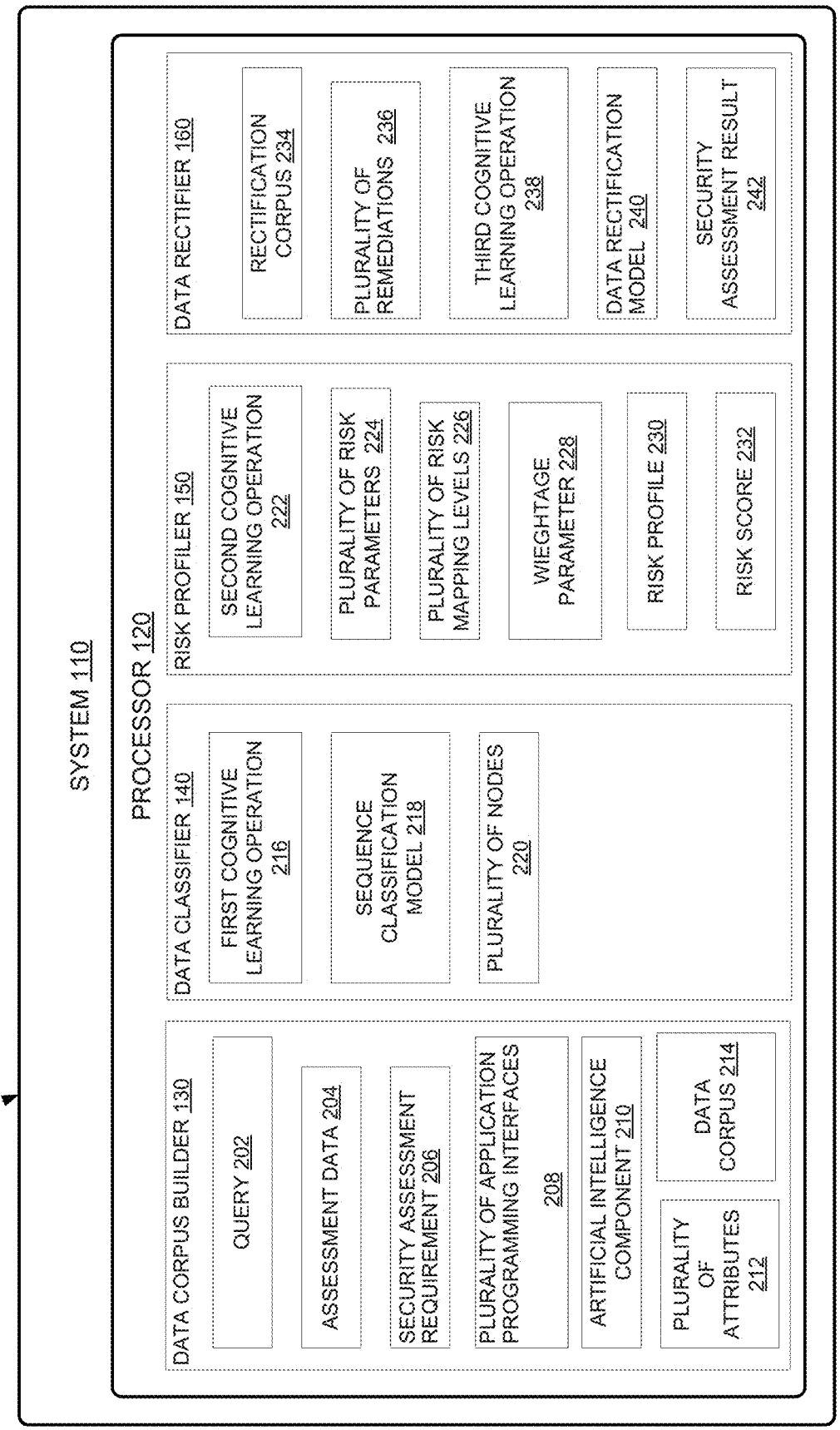
FIG. 2 illustrates various components of an API assessment system, according to an example embodiment of the present disclosure.

FIG. 2 illustrates various components of an API assessment system 110, according to an example embodiment of the present disclosure. In an example, the system may include a processor, a data corpus builder 130, a data classifier 140, a risk profiler 150, and a data rectifier 160. The processor may be coupled to the data corpus builder 130, the data classifier 140, the risk profiler 150, and the data rectifier 160.

The data corpus builder 130 may obtain a query 202 from a user. The query 202 may be indicating a security assessment requirement 206. The security assessment requirement 206 may be relevant to the surveillance of a plurality of application programming interfaces 208. For the sake of brevity, and technical clarity the description may include the system 110 being deployed on an application programming interface (API) from the plurality of application programming interfaces 208. Henceforth, for the purpose of this document, the plurality of application programming interfaces 208 may be referred to as the API. In an example, the security assessment requirement 206 may be associated with at least one of a process, an organization, and an industry-relevant for security assessment and data security assessment operations. The security assessment requirement 206 may include defining an implementation strategy for an application programming interface (API). The security assessment requirement 206 may include ascertaining if an API is being implemented by following the defined strategy. The security assessment requirement 206 may be related to performing a security assessment for an API. The security assessment requirement 206 may be related to various API implementation operations such as an analysis before deployment, API scanning before data migration, API upgrades, application scan to accelerate API support transition, and the like. The security assessment requirement 206 may be related to risk prediction for various API management operations. The security assessment requirement 206 may be related to generating key insights and data related to security concerns about an API system in a corrigible manner. The embodiments for the security assessment requirement 206 presented herein may be exemplary in nature and a person skilled in the art must understand that the security assessment requirement 206 may include any operation related to assessment and evaluation of an API. The system 110 may be an API management platform, which may allow a user to create, document, publish, manage and monitor application programming interfaces in a secure development environment.

The data corpus builder 130 may obtain assessment data 204 associated with the query 202 from a plurality of data sources. The assessment data 204 may be data related to configuration, various definitions related to API, operation, and implementation of an API. The API definitions may include a configuration file or description which may contain the API policy logic or flow. The plurality of data sources may include various API platforms across the internet, various API platforms maintained by an organization, a new API platform acquired by an organization, a new update for an existing API platform, migration of an API platform from a server onto a different server, and the like. The data corpus builder 130 may implement an artificial intelligence component 210 to sort the assessment data 204 into a data corpus 214. The data corpus 214 may be a collection of written texts comprising information related to an API. The artificial intelligence component 210 may comprise the implementation of a data corpus fabricator that may include an intelligent machine learning module that may help in analyzing, extracting and classifying information from API description and help in building the data corpus 214. The artificial intelligence component 210 may include the implementation of various natural language processing (NLP) techniques for processing the assessment data 204. For the sake of brevity, and technical clarity various NLP techniques may not be described herein, however, it should be clear to a person skilled in the art. This may a continuous process and enrich the data corpus 214. In accordance with various embodiments of the present disclosure, the data corpus builder 130 may obtain the assessment data 204 on a near real-time basis from the plurality of data sources. The data corpus builder 130 may implement the artificial intelligence component 210 on the assessment data 204 obtained in a rea-time basis for creating the data corpus 214.

The data corpus 214 may also be referred to hereinafter as "API policy corpus". The data corpus 214 may include a plurality of attributes 212 identified by the artificial intelligence component 210 from the assessment data 204. In an example, each of the plurality of attributes 212 may include written texts, descriptors, and the like related to an API which may be used by a machine learning module in API analysis and classification for resolution of the query 202. The plurality of attributes 212 may include information related to the security assessment of an API. In accordance with various embodiments of the present disclosure, each of the plurality of attributes 212 may include security-specific words and references that may have been extracted from the assessment data 204 by the implementation of the artificial intelligence component 210. The plurality of attributes 212 may include data related to the configuration of an API. The plurality of attributes 212 may include various API codes. The plurality of attributes 212 may include descriptors related to the aforementioned API configuration and codes. The data corpus 214 and the associated plurality of attributes 212 may be a structured repository of API related information which may help the system 110 to classify unstructured API definitions. The plurality of attributes 212 may comprise different API policy category, sub-category and relevant keywords, an attribute description & usage reference. Each of the plurality of attributes 212 may be associated with the security assessment requirement 206. The data corpus builder 130 may implement the artificial intelligence component 210 to update the data corpus 214 and hence the plurality of attributes 212 for keeping it relevant for resolution of the query 202. The data corpus 214 built from various APIs may be used by the system 110 for further processing a new API that may relevant to the resolution of the query 202.

The data classifier 140 coupled to the processor may implement a first cognitive learning operation 216 to create a sequence classification model 218 from the data corpus 214. The data classifier 140 may help in building a structured representation of an API definition using the data corpus 214. The first cognitive learning operation 216 may include the implementation of a machine learning (ML) engine that may use a combination of various NLP & classification techniques to classify the API components with help of the data corpus 214. For example, the first cognitive learning operation 216 may include the extraction of API security-related information from an API related to the security assessment requirement 206. For the sake of technical clarity, the "API security-related information" may be referred to as "security tags for an API" hereinafter. The sequence classification model 218 may be the sequential representation of API definition related to security assessment from the data corpus 214. The data classifier 140 may analyze and process the structured API definition from the plurality of attributes 212 from the data corpus 214 to provide a security map of the API. The sequence classification model 218 may be comprising a plurality of nodes 220 identified from a deconstruction of an attribute from the plurality of attributes 212. Each of the plurality of nodes 220 may represent the security tags for an API arranged in a sequential manner and interconnected to other security tags from the data corpus 214. In accordance with various embodiments of the present disclosure, each node from the plurality of nodes 220 may represent a security tag associated with the resolution of the query 202.

The first cognitive learning operation 216 may include the initiation of a multi-level sequential NLP technique (described further by way of subsequent Figs.) to create the sequence classification model 218 from the data corpus 214. For example, the multi-level sequential NLP technique may include the extraction of API security-related information from an API related to the security assessment requirement 206. The multi-level sequential NLP technique may further include a first-level categorization of the security tags for an API based on the data corpus 214. The multi-level sequential NLP technique may include a second level categorical tagging of the security tags for an API based on the first level categorization and the data corpus 214. The multi-level sequential NLP technique may include a third level categorization of the security tags for an API based on the second level categorization and the data corpus 214. The third level categorization may facilitate the identification of a position of a security tag for an API with the sequence classification model 218. The data classifier 140 may implement the first cognitive learning operation 216 to associate each of the plurality of nodes 220 with the plurality of attributes 212 from the data corpus 214. Therefore, the security tags for an API related to the security assessment requirement 206 may be mapped with the data corpus 214 for further processing. The system 110 may extract API attributes from the plurality of nodes 220 of the sequence classification model 218 and associate them with the plurality of attributes 212 from the data corpus 214. For example, the system 110 may extract attributes like types of data exposed, a function of API and the like using various NLP techniques. The system 110 may map the extracted attributes with the corresponding plurality of attributes 212 from the data corpus 214.

In accordance with various embodiments of the present disclosure, the data classifier 140 may redistribute the sequence classification model 218 to create a harmonized sequence classification model 218 comprising surveillance insight associated with the plurality of application programming interfaces 208. The harmonized sequence classification model 218 may be used for the resolution of the query 202. The harmonized sequence classification model 218 may be a word cloud visual representation of the sequence classification model 218 wherein, each of the security tags for an API may be represented according to their prominence in the resolution of the query 202. The harmonized sequence classification model 218 may be used to determine a relative prominence of the security tags for an API. The word cloud visual representation may identify the most prominent and least prominent security tags for an API. Therefore, the harmonized sequence classification model 218 may be used to identify the security tags for an API that may be most prominent and least prominent from amongst the sequence classification model 218. The system 110 may deploy the harmonized sequence classification model 218 for further processing of the query 202.

The risk profiler 150 may implement a second cognitive learning operation 222 to identify a plurality of risk parameters 224 associated with the security assessment requirement 206 from the assessment data 204. The risk parameters may be a set of common and consistent security concerns that may affect an API. The second cognitive learning operation 222 may be implemented to identify with criteria for mapping, evaluating, categorizing, and prioritizing the plurality of risk parameters 224. The second cognitive learning operation 222 may be implemented to identify risk consequences for each of the plurality of risk parameters 224 that may define an impact and the severity of a risk occurrence. The criteria may include identification of a threshold for each of the plurality of risk parameters 224 to determine a probability of a risk occurrence, acceptability, and unacceptability of a risk parameter, a trigger event for a risk parameter, and the like. In accordance with various embodiments of the present disclosure, the plurality of risk parameters 224 may include, for example, Access control (AC), Threat Protection (TP), Message Transformation (MT), Oauth (OA), Message Validation (MV), Mediation (MD), Quota Operations (QO), Rate Limit Operations (RLO), Cache Operations (CO), Custom script (CS), Logging &

Auditing (LA), Call Out (CO), Structured Query Language (SQL) injections, JavaScript Object Notation (JSON) injections, Extensible Markup Language (XML) injections, spoofing, a man-in-the-middle attack (MITM) and the like.

The risk profiler 150 may implement the second cognitive learning operation 222 to identify a plurality of risk mapping levels 226 (described further by way of subsequent Figs.). The plurality of risk mapping levels 226 may quantify risk likelihood and severity levels for each of the plurality of risk parameters 224. The plurality of risk mapping levels 226 may facilitate mapping a security concern at an appropriate level of scrutiny. In accordance with various embodiments of the present disclosure, each of the plurality of risk mapping levels 226 may be associated with a weightage parameter 228 indicating severity for a risk mapping level from the plurality of risk mapping levels 226 for each of the plurality of risk parameters 224. The weightage parameter 228 may be used to provide the appropriate level of scrutiny to a security concern. The weightage parameter 228 may be a unit to measure each of the plurality of risk mapping levels 226. The weightage parameter 228s may be different for each of the plurality of risk mapping levels 226 (explained in detail by way of subsequent Figs). In accordance with various embodiments of the present disclosure, the plurality of risk mapping levels 226 may include a level 1, a level 2, a level 3, a level 4, and a level 5. The level 1 may be associated with a Level 1 Score (L1), the level 2 may be associated with a Level 2 Score (L2), the level 3 may be associated with a Level 3 Score (L3), the level 4 may be associated with a Level 4 Score (L4), and the level 5 may be associated with a Level 5 Score (L5). The weightage parameter 228 for each of the plurality of mapping levels may be inter-connected. For example, the weightage parameter 228 for the level 1 may be connected to the weightage parameter 228 from level 2.

The second cognitive learning operation 222 may be implemented to assign a score to each of the plurality of risk parameters 224 for each plurality of risk mapping levels 226 (explained in detail by way of subsequent Figs.). In accordance with various embodiments of the present disclosure, each of the risk mapping levels may further include a plurality of groups. The plurality of groups for each of the risk mapping levels may be identified based on the weightage parameter 228. The plurality of groups may be used to analyze the plurality of risk parameters 224 for a risk mapping level. For example, the level 1 may include a group 1, a group 2, a group 3, and a group 4 based on the weightage parameter 228 such as degree of required protection. The plurality of groups for level 1 may be used to categorize the plurality of risk parameters 224 based on the degree of protection required. The plurality of groups for each of the plurality of risk mapping levels 226 may be assigned a score based on the weightage parameter 228. For example, for level 1 the group 1, the group 2, the group 3, and the group 4 may be each assigned a score based on level of protection that may be required for the plurality of risk parameters 224 classified therein. For example, at the level 1 from the plurality of risk mapping levels 226, the plurality of risk parameters 224 that may require a low degree of added protection may be classified into the group 1 and may assigned a group 1 score. The plurality of risk parameters 224 that may require an average degree of added protection may be classified into the group 2 and may assigned a group 2 score. The plurality of risk parameters 224 that may require an above-average degree of added protection may be classified into the group 3 and may assigned a group 3 score. The plurality of risk parameters 224 that may require a significant degree of added protection may be classified into the group 4 and may assigned a group 4 score. The group 1 score, the group 2 score, the group 3 score, and the group 4 score may be aggregated to form the level 1 score L1 (explained in detail by way of subsequent Figs.). The risk profiler 150 may determine the level 2 score L2, the level 3 score L3, the level 4 score L4, and the level 5 score L5 in a similar manner. In accordance with various embodiments of the present disclosure, the risk profiler 150 may compound values associated with the weightage parameter 228 for each of the plurality of risk mapping levels 226 to indicate an increase in the severity for a risk mapping level from the plurality of risk mapping levels 226 (explained in detail by way of FIGS. 14A-20). For example, scores associated with the plurality of groups associated with the level 2 would have a higher value as compared to the plurality of groups associated with the level 1.

The risk profiler 150 may implement the second cognitive learning operation 222 to create a risk profile 230 for each of the plurality of application programming interfaces 208 based on mapping the plurality of risk parameters 224 to the plurality of risk mapping levels 226 and the sequence classification model 218. The risk profiler 150 may map each of the plurality of risk parameters 224 such as for example, Access control (AC), Threat Protection (TP), Message Transformation (MT), Oauth (OA), Message Validation (MV), Mediation (MD), Quota Operations (QO), Rate Limit Operations (RLO), Cache Operations (CO), Custom script (CS), Logging & Auditing (LA), Call Out (CO), Structured Query Language (SQL) injections, JavaScript Object Notation (JSON) injections, Extensible Markup Language (XML) injections, spoofing, a man-in-the-middle attack (MITM), and the like with the harmonized sequence classification model 218 and identify a level of severity for each of the plurality of risk parameters 224 indicated by a risk mapping level score from the plurality of risk mapping levels 226 such as the Level 1 Score (L1), the Level 2 Score (L2), the Level 3 Score (L3), the Level 4 Score (L4), and the Level 5 Score (L5). In accordance with various embodiments of the present disclosure, the risk profiler 150 may implement the second cognitive learning operation 222 to determine a multivariate regression model for creating the risk profile 230. In accordance with example provided above, the multivariate regression model may be for example determined using an equation such as, "API RISK PROFILE 230(ARP)=f [AC, TP, MT, OA, MV, MD, QO, RLO, CO, CS, LA, CO, L1, L2, L3, L4, L5]". The multivariate regression model may provide an architecture to perform vulnerability assessment using structural representation of an API from the harmonized sequence classification model 218, and the plurality of risk parameters 224 from the industry-specific aspects of the API related to the security assessment requirement 206 along with a severity factor for each of the plurality of risk parameters 224 signified by the plurality of risk mapping levels 226. In accordance with various embodiments of the present disclosure, the multivariate regression model may be the ordinal logistic regression by analyzing XML based API descriptors from the data corpus 214 (explained further by way of subsequent Figs.). The ordinal logistic regression may facilitate mapping of the plurality of risk parameters 224 with the plurality of risk mapping levels 226 that may be ordinal variables due to presence of a specific number of outcome values such as for example, the level 1, the level 2, the level 3, the level 4, and the level 5. The risk profile 230 may facilitate categorizing the individual API into 5 broad risk categories (explained further by way of subsequent Figs) using intelligent technology such as the second cognitive learning operation 222.

The risk profile 230 may include a risk score 232 associated with an application programming interface from the plurality of application programming interfaces 208. The risk score 232 may indicate the presence of a risk along with an associated severity of the risk for a node from the plurality of nodes 220 present in the harmonized sequence classification model 218. In an example, the risk score 232 may be output from the equation mentioned above. The risk score 232 may be used to categorize an individual API into 5 broad risk categories such as low, elevated, guarded, high and severe. The risk score 232 calculation may be explained in detail by way of subsequent Figs.

The data rectifier 160 may implement a third cognitive learning operation 238 to create a rectification corpus 234 from the assessment data 204 and comprising a plurality of remediations 236 associated with the rectification of each of the plurality of risk parameters 224 for each of the plurality of risk mapping levels 226. The rectification corpus 234 may include various actions related to the plurality of risk parameters 224 based on the plurality of risk mapping levels 226. The rectification corpus 234 may be identified from the plurality of sources as mentioned above. In an example, the rectification corpus 234 may be identified from the data corpus 214. The third cognitive learning operation 238 may include the implementation of various NLP techniques for identifying and creating the rectification corpus 234. The data rectifier 160 may update the rectification corpus 234 on a near real-time basis. In an example, the data rectifier 160 may update the rectification corpus 234 based on an update in the assessment data 204 and/or the data corpus 214. The plurality of remediations 236 included in the rectification corpus 234 may be a collection of different remediation actions, and a repository of steps that may be taken for automated healing of various API's. The data rectifier 160 may implement a third cognitive learning operation 238 to create a data rectification model 240 for the risk profile 230 associated with each of the plurality of application programming interfaces 208. The data rectifier 160 may map the risk profile 230 with the rectification corpus 234 to identify the plurality of remediations 236 that may be suitable for the risk profile 230 of an API. The conglomerate of the plurality of remediations 236 for the risk profile 230 of an API may be represented by the data rectification model 240 for the API. The data rectification model 240 may include the plurality of remediations 236 associated with the rectification of each of the plurality of risk parameters 224 associated with the risk profile 230 for associated application programming interfaces from the plurality of application programming interfaces 208. The data rectifier 160 may implement the third cognitive learning operation 238 may generate a security assessment result 242 (explained further by way fi subsequent Figs.) based on the data rectification model 240, the security assessment result may be comprising each of the plurality of application programming interfaces 208 assessed for resolution of the query 202. The user of the system 110 may deploy the security assessment result 242 for automated healing of an API. In an example, the user of the system 110 may deploy the security assessment result 242 to resolve the query 202. In an example, the system 110 may automatically deploy the security assessment result 242 for the resolution of the query 202. The data rectifier 160 may initiate surveillance and remediation of the plurality of application programming interfaces 208 to resolve the security assessment requirement based on the security assessment result 242. The system 110 may be configurable to perform security assessment and remediation of the plurality of application programming interfaces 208 automatically and/or based on a user-input. For instance, the system 110 may include a repository that includes steps to performed to remedy an issue related to security, based on historical data and/or user provided feedback.

In accordance with various embodiments of the present disclosure, the data rectifier 160 may obtain a user input to implement the data rectification model 240 for the risk profile 230 associated with each of the plurality of application programming interfaces 208. In accordance with various embodiments of the present disclosure, the data rectifier 160 may update the rectification corpus 234 based on an update in the assessment data 204.

The embodiments for the artificial intelligence component 210, the first cognitive learning operation 216, the second cognitive learning operation 222, and the third cognitive learning operation 238 presented herein are exemplary in nature and should be treated as such. For the sake of brevity and technical clarity, the description of an API assessment system may be restricted to few exemplary embodiments, however, to a person skilled in the art it should be clear that the system may be used for the fulfillment of various security assessment requirements 206 other than those mentioned hereinafter.

In operation, the system 110 may be deployed for evaluation, assessment, and remediation of risks associated with an API. The system 110 may provide a novel API security assessment methodology, generate key insights regarding security concerns for an API, create a word cloud model for various security tags associated with an API for the visual assertion, and provide a code review and establish API design predicates for API development. The system 110 may be an API management platform that may be a software application, which may allow users to create, document, publish, manage and monitor API in a secure development environment. The system 110 may include a data corpus builder 130 that may be an intelligent ML module which may help in analyzing, extracting and classifying information from API description and help in building the data corpus 214. This may be a continuous process and enrich the data corpus 214 on a near real-time basis. The data corpus 214 may be a collection of API attributes, written texts, descriptors etc. which may be used by the first cognitive learning operation 216, the second cognitive learning operation 222, and the third cognitive learning operation 238 in API analysis and classification. The data classifier 140 may implement the first cognitive learning operation 216 may deploy a combination of various NLP & classification techniques to classify the API components with the help of the data corpus 214. The data classifier 140 may help in building a structured representation of an API definition using various pre-processing and post-processing steps. The data classifier 140 may create the sequence classification model 218 that may include the structured API definition created by the data classifier 140 to provide a security map of the API. The sequence classification model 218 may include the plurality of nodes 220 that may represent various components of an API. The data classifier 140 may be referred to as the API policy classifier module in this document. The results from the data classifier 140 may be deployed by the risk profiler 150. The risk profiler 150 may help in categorizing the individual API into 5 broad risk categories using the third cognitive learning operation 238. The risk profiler 150 may create the risk profile 230 and assigning a risk score 232 to each of the plurality of nodes 220 from the sequence classification model 218. The risk profile 230 may be used by the data rectifier 160 to build the data rectification model 240. The data rectifier 160 may take automated actions based on the risk profile 230 of the API to remediate the risks. The data rectifier 160 may create the rectification corpus 234 from the assessment data 204. The rectification corpus 234 may be a collection of different remediation actions, and a repository of steps to be taken for automated healing of API. The data rectification model 240 may be a risk to action mapper that may store a standard or user-specific configuration of an API between the plurality of risk parameters 224 based in the plurality of risk levels & actions to be taken for automated healing. The data rectifier 160 may generate the data security assessment result based on the data rectification model 240. The security assessment result may include predefined API internet robot applications to perform a different kind of API remediation activities. The operation of the system 110 and the functionality of various components may be explained in detail by way of subsequent Figs.

Accordingly, the system 110 may be designed to perform a real-time security assessment of an API, provide actionable insights & mediate the problems & risks using an intelligent artificial intelligence (AI) and machine learning (ML) based solution. This system 110 may enable getting insights from the API and help in manual and automated risk preventative steps. The system 110 may provide an architecture for quality assessment and advanced vulnerability remediation of APIs using neural networks & NLP techniques. The system 110 may provide a platform-independent ML-driven method to perform an assessment of APIs, based on a curated data corpus 214. The system 110 may provide a method to score API vulnerability using ordinal logistic regression by analyzing XML based API descriptors.

The system 110 may provide deep insights into an organization's APIs to help improve the security, design, and performance of the APIs. The system 110 may provide deep insights using a multi-level design predicates approach to provide integration complexity rating. The system 110 may provide deep insights into the security weaknesses of an organization by scrutinizing the APIs. The system 110 may also implement proposed fixes to your APIs. The system 110 may provide automated policy code reviews that may circumvent the requirement for human code review and may be less error-prone. This may provide tremendous monetary benefits to various organizations. The system 110 may perform automated API security assessment checks to ensure security, quality & uniformity. The system 110 may enable early detection of possible security issues in API. The system 110 may ensure an overall good API design. the system 110 may perform API code review & API design predicates. The system 110 may provide access to key insights for an API configuration. The system 110 may provide an API security dashboard (explained later by way of subsequent Figs.) for the management of key insights from technical API configuration. The system 110 may check of an API policy developed by an organization may be implemented for an API.

Figure 3:
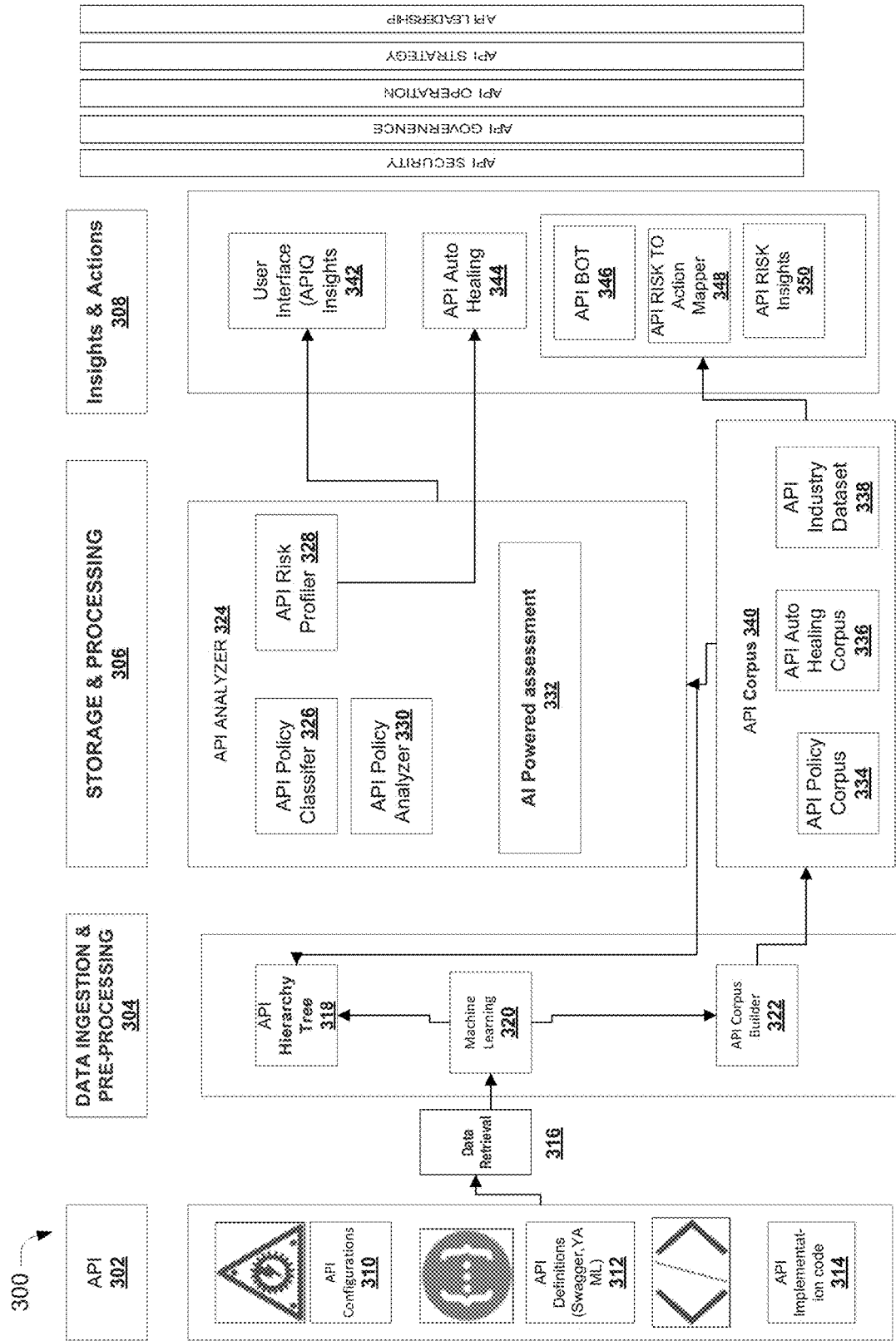
FIG. 3 illustrates an architectural flow diagram of an API assessment system, according to an example embodiment of the present disclosure.

FIG. 3 illustrates an architectural flow diagram 300 of the API assessment system 110, according to an example embodiment of the present disclosure. The components of the system 110 may be deployed for the description of FIG. 3. For the same of brevity and technical clarity any description of the components of the system 110 described above may be repeated hereinafter. The flow diagram 300 may include an API 302. The API 302 may be comprising an API configuration 310, a set of API definitions 312, and an API implementation code 314. The API configuration 310, the set of API definitions 312, and the API implementation code 314 may be a part of the assessment data 204. The system 110 may implement a data retrieval 316 for extraction of the API configuration 310, the set of API definitions 312, and the API implementation code 314 from the API 302. The data retrieval 316 may include the implementation of the artificial intelligence component 210. The system may further include a data ingestion and processing component 304, a storage and processing component 306, and an insights and actions component 308. The data ingestion and processing component 304 may include an API corpus builder 322, a machine learning component 320 and an API hierarchy tree 318. The storage and processing component 306 may include an API analyzer 324 and an API corpus 340. The API analyzer 324 may include an API policy classifier 326, an API risk profiler 150 328, an AI-powered assessment 332 and an API policy analyzer 330. The API corpus 340 may include an API policy corpus 334, an API auto-healing corpus 336, and an API industry dataset 338. The insights and actions component 308 may include a user interface 342, and API auto-healing 344, an API BOT 346, an API risk to action mapper 348, and an API risk insight set 350. The flow diagram 300 may further illustrate various uses of the system 110 such for example, in API security, API governance, API operation, API strategy, API leadership, and the like.

The set of API definitions 312 may include configuration file or description which may contain the API policy logic or flow. The API corpus builder 322 may be an intelligent ML module which may help in analyzing, extracting and classifying information from the API description and help in building the API corpus 340. This is a continuous process and may enrich the API corpus 340 on a near real-time basis. The API policy corpus 334 may be a collection of API attributes, written texts, descriptors, and the like, which may be used by the AI-powered assessment 332 in API analysis and classification. The AI-powered assessment 332 may deploy a combination of various NLP & classification techniques to classify various API components with help of the API policy corpus 340. This is used by the API policy classifier 326. The API policy classifier 326 may help in building a structured representation of an API definition using components from the data ingestion and processing component 304, and the storage and processing component 306, which may be used by the API policy analyzer 330. The API policy analyzer 330 may process the structured API definition created by the API policy classifier 326 to provide a security map of the API 302. The API risk profiler 150 328 may help in categorizing the individual API's into 5 broad risk categories (described above by way of FIGS. 1 and 2) using an intelligent technique. The API auto-healing 344 may include an API Auto healer taking automated actions based on the risk profile 230 of the API to remediate the risks as described by the API auto-healing corpus 336. The API auto-healing corpus 336 may be a collection of different remediation actions, and a repository of steps to be taken to auto-heal API's. The API risk to action mapper 348 may store a standard or client-specific configuration between different risk categories & actions to be taken by the Auto Healers. The API BOT 346 may include a collection of predefined BOTS to perform a different kind of API remediation activities.

Figure 4:
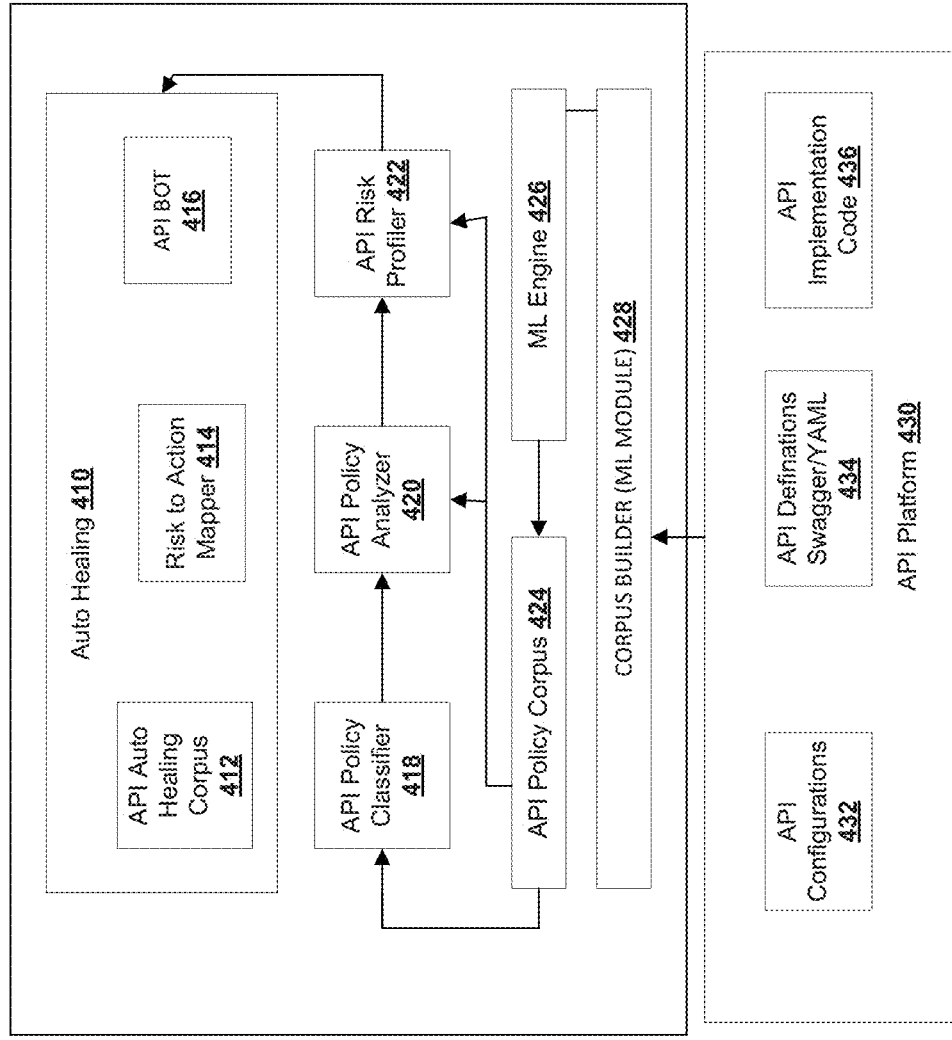
FIG. 4 illustrates a technical flow diagram of an API assessment system, for performing real-time security assessment according to an example embodiment of the present disclosure.
Figure 4:
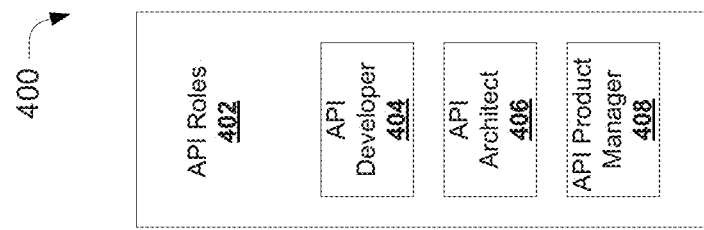

FIG. 4 illustrates a technical flow diagram 400 of the API assessment system 110, for performing real-time security assessment according to an example embodiment of the present disclosure. The components of the system 110 may be deployed for the description of FIG. 4. For the same of brevity and technical clarity any description of the components of the system 110 described above may be repeated hereinafter. The flow diagram 400 may include an API platform 430. The API platform 430 may include an API configuration set 432, a set of API definitions 434, and an API implementation code 436. The flow diagram 400 may include an API role component 402. The API role component 402 may include an API developer 404, an API architect 406, and an API product manager 408. The API role component 402 may indicate various human resource teams that may deploy the system 110 within an organization. The API platform 430 may be connected to a corpus builder module 428. The corpus builder module 428 may comprise a machine learning engine 426. The machine learning engine 426 may facilitate the creation of an API policy corpus 424. The API policy corpus 424 may provide input for an API policy classifier 418, an API policy analyzer 420 and a risk profiler 150 422. The API policy classifier 418 may provide input to the API policy analyzer 420 along with the API policy corpus 424. The API policy analyzer 420 may provide input to the risk profiler 150 422 along with the API policy corpus 424. The risk profiler 150 422 may be connected to an auto-healing component 410. The auto-healing component 410 may include an API auto-healing corpus 412, a risk to action mapper 414, and an API BOT 416. The auto-healing component 410 may remediate the risks identified by the risk profiler 150.

Figure 5:
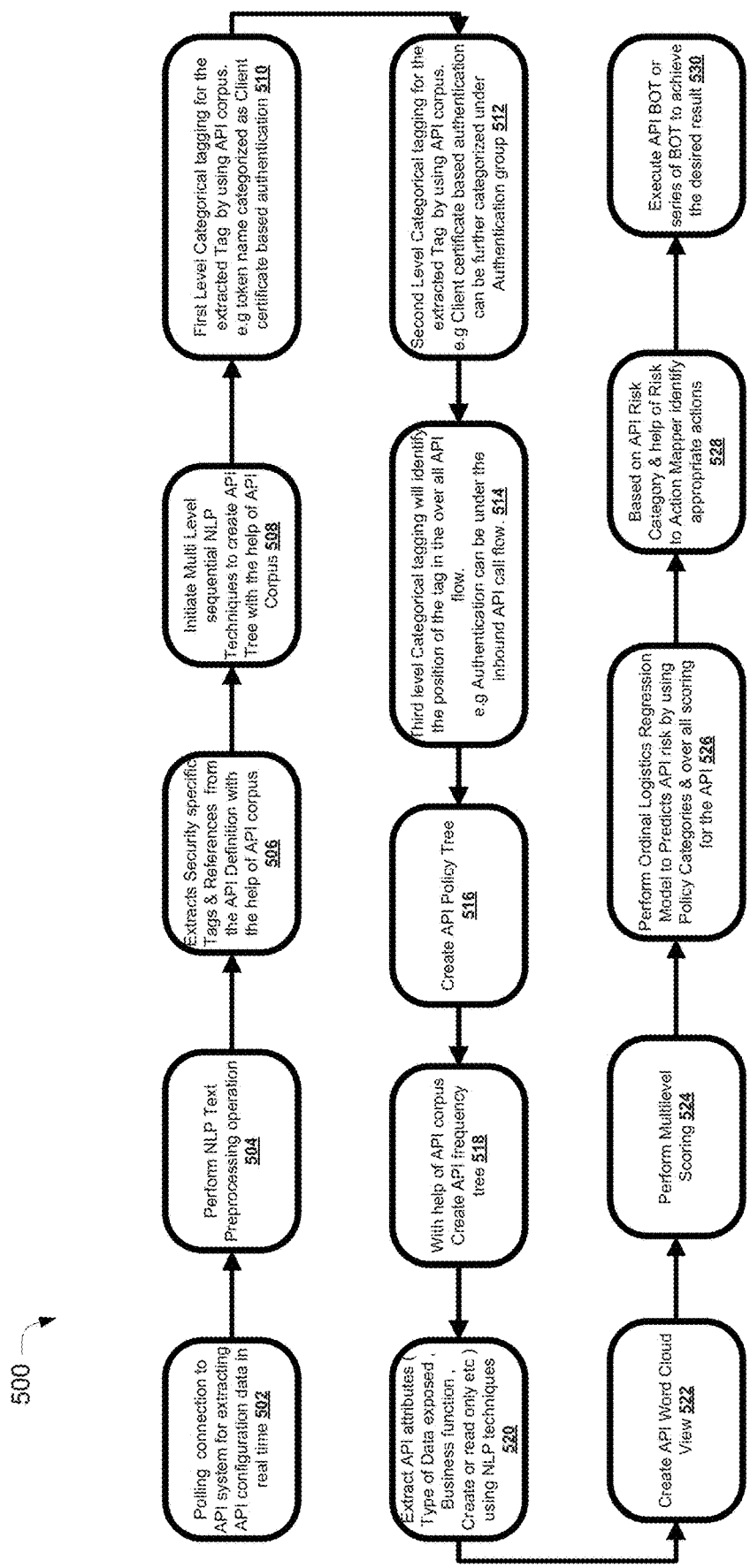
FIG. 5 illustrates a workflow diagram of an API assessment system, according to an example embodiment of the present disclosure.
Figure 6:
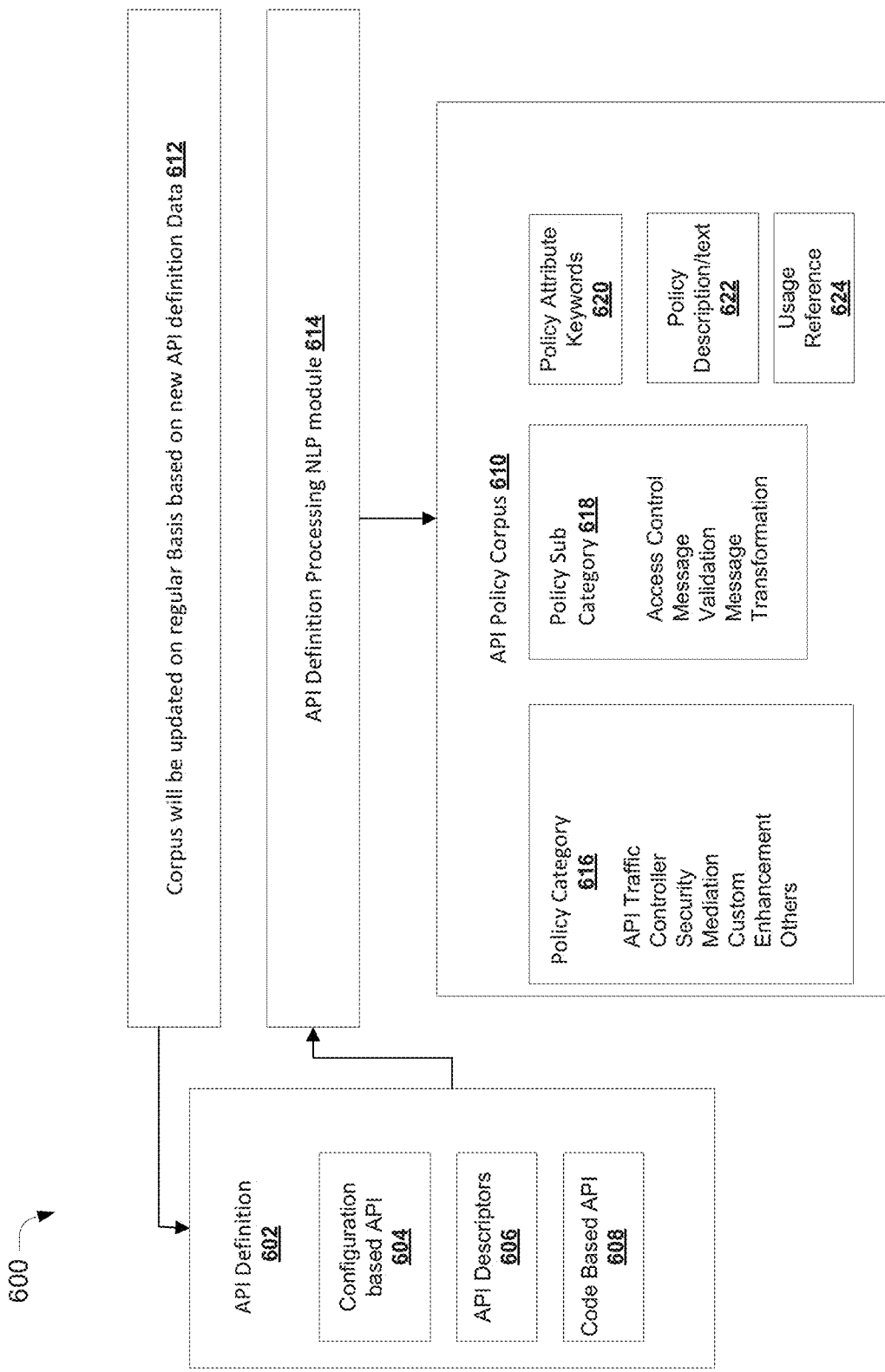
FIG. 6 illustrates a technical architecture for a data corpus builder deployed by an API assessment system, for process optimization according to an example embodiment of the present disclosure.

FIG. 5 illustrates a workflow diagram 500 of the API assessment system 110, according to an example embodiment of the present disclosure. The components of the system 110 may be deployed for description of FIG. 5. For the same of brevity and technical clarity any description of the components of the system 110 described above may be repeated hereinafter. The workflow diagram 500 may include a step 502 wherein the system 110 may poll a connection to the API system 110 for extracting API configuration data in real-time. At step 504, the system 110 may perform NLP text preprocessing operation. At step 506, the system 110 may extract security specific tags & references from the API Definition with the help of the API corpus. At step 508, the system 110 may initiate multi-level sequential NLP Techniques to create the API Tree with the help of the API Corpus. At the step 510, the system 110 may initiate the first level categorical tagging for the extracted tag by using the API corpus. For example, a token name categorized as Client certificate-based authentication. At step 512, the system 110 may initiate a Second Level Categorical tagging for the extracted Tag by using API corpus. For example, a Client certificate-based authentication may be further categorized under Authentication group. At step 514, the system 110 may initiate a Third level Categorical tagging will identify the position of the tag in the overall API flow. For example, Authentication can be under the inbound API call flow. At step 516, the system 110 may create the API policy tree. At step 518, the system 110 may create the API policy tree with help of the API corpus. At the step 520, the system 110 may extract API attributes such as Type of Data exposed, Business function, Create or read-only, and the like using NLP techniques. At the step 522, the system 110 may create API word cloud view. At the step 524, the system 110 may perform a multi-level scoring. At the step 526, the system 110 may perform an ordinal logistics regression model to predicts API risk by using policy categories & overall scoring for the API 526. At the step 528, based on API risk category & help of Risk to Action Mapper, the system 110 to identify appropriate actions. At the step 530, the system 110 may execute API BOT or series of BOT to achieve the desired result, FIG. 6 illustrates a technical architecture for a data corpus builder 600 deployed by the API assessment system 110, for API corpus building according to an example embodiment of the present disclosure. The components of the system 110 may be deployed for description of FIG. 6. For the same of brevity and technical clarity any description of the components of the system 110 described above may be repeated hereinafter. The data corpus builder 600 may include a set of API definitions 602. The set of API definitions 602 may include a configuration-based API 604, API descriptors 606, and a set of code-based API 608. The set of API definitions 602 may be processed by a machine learning module 614. The machine learning module 614 may create an API policy corpus 610 from the set of API definitions 602 as described above. The set of API definitions 602 may receive update on new API definitions on a near real-time basis. The data corpus builder 600 may update the API policy corpus 610 based on the update received by the set of API definitions 602 on new API definitions.

The API policy corpus 610 may include a policy category 616, a policy sub-category 618, and policy attribute keywords 620, policy description 622, and a usage reference 624. In accordance with various exemplary embodiments of the present disclosure, the policy category 616 may include categories like an API traffic controller, security, mediation, custom enhancement, and the like. The policy sub-category 618 may include access control, message validation, message transformation and the like. The policy attribute keywords 620 may include a set of words that may be used by the artificial intelligence component 210 to identify various attributes of an API policy. The usage reference 624 may refer to a data point from the data corpus 214 that may serve as a link between multiple API policy documents, thereby providing a structure for facilitating a policy analysis for the resolution of the query 202. The policy description 622 may include details regarding various attributes such as features like security, rate-limiting, transformation, and mediation capabilities, and the like. As mentioned above, the API policy corpus 610 may be used by the system 110 for performing a security assessment on a policy related to the query 202. In an example, the policy corpus may be a reference directory for analysis of the API policy associated with the query 202.

Figure 7:
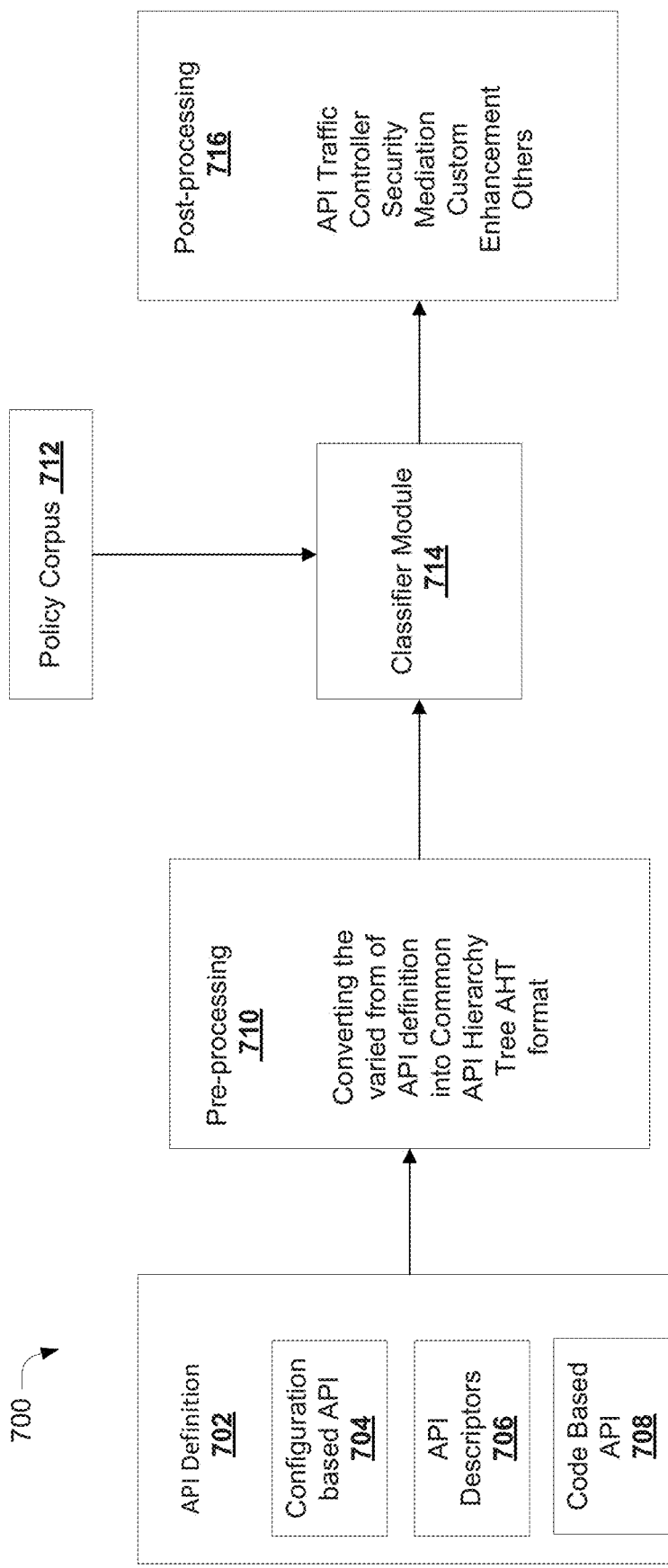
FIG. 7 illustrates a technical architecture of a data classifier deployed by an API assessment system, according to an example embodiment of the present disclosure.

FIG. 7 illustrates a technical architecture 700 of the data classifier 140 deployed by the API assessment system 110, according to an example embodiment of the present disclosure. The components of the system 110 may be deployed for the description of FIG. 7. For the same of brevity and technical clarity any description of the components of the system 110 described above may be repeated hereinafter. The data classifier 140 may include a set of API definitions 702, a pre-processing component 710, a classifier module 714, a post-processing component 716, and a policy corpus 712. The API definition component 702 may include a configuration-based API 704, a set of API descriptors 706, and a set of code-based API 708. The set of API definitions 702 may be processed by artificial intelligence component 210 using various NLP techniques to generate the data corpus 214 as described above. The pre-processing component 710 may convert the varied definitions from the set of API definitions 702 into a common format. In an example, the pre-processing component 710 may be an aspect of the first cognitive learning operation 216. The classifier module 714 may use the output from the pre-processing component 710 and the policy corpus 712 to create the sequence classification model 218 for each of the plurality of attributes 212 as described above. The policy corpus 712 may be the data corpus 214. The post-processing component 716 may create the harmonized sequence classification model 218 based on output from the classifier module 714. The harmonized sequence classification model 218 may be comprising surveillance insight associated with the plurality of application programming interfaces 208. The harmonized sequence classification model 218 being used for resolution of the query 202. In operation, the set of API definitions 702 may include information regarding various APIs. The set of API definitions 702 may be analyzed and the policy corpus 712 may be created therefrom by implementing the artificial intelligence component 210 as described above. The pre-processing component 710 may use the set of API definitions 702 and make create a common format structure from the same. The classifier module 714 may use the policy corpus 712 and the common format structure created by the pre-processing component 710 to create the sequence classification model 218. The classifier module 714 may be as aspect of the first cognitive learning operation 216. The post-processing component 716 may use the output from the classifier module 714 to create the harmonized sequence classification model 218 that may include various attributes like API traffic controller, security, mediation, custom enhancement, and the like arranged in an insightful manner (explained by way of FIGS. 10 and 11) so as to provide a surveillance insight associated with various APIs. The classifier module 714 may be an intelligent ML-powered module that may help to extract meaningful information from the set of API definitions 702 and create a hierarchical tree with the help of the policy Corpus 712.

Figure 8:
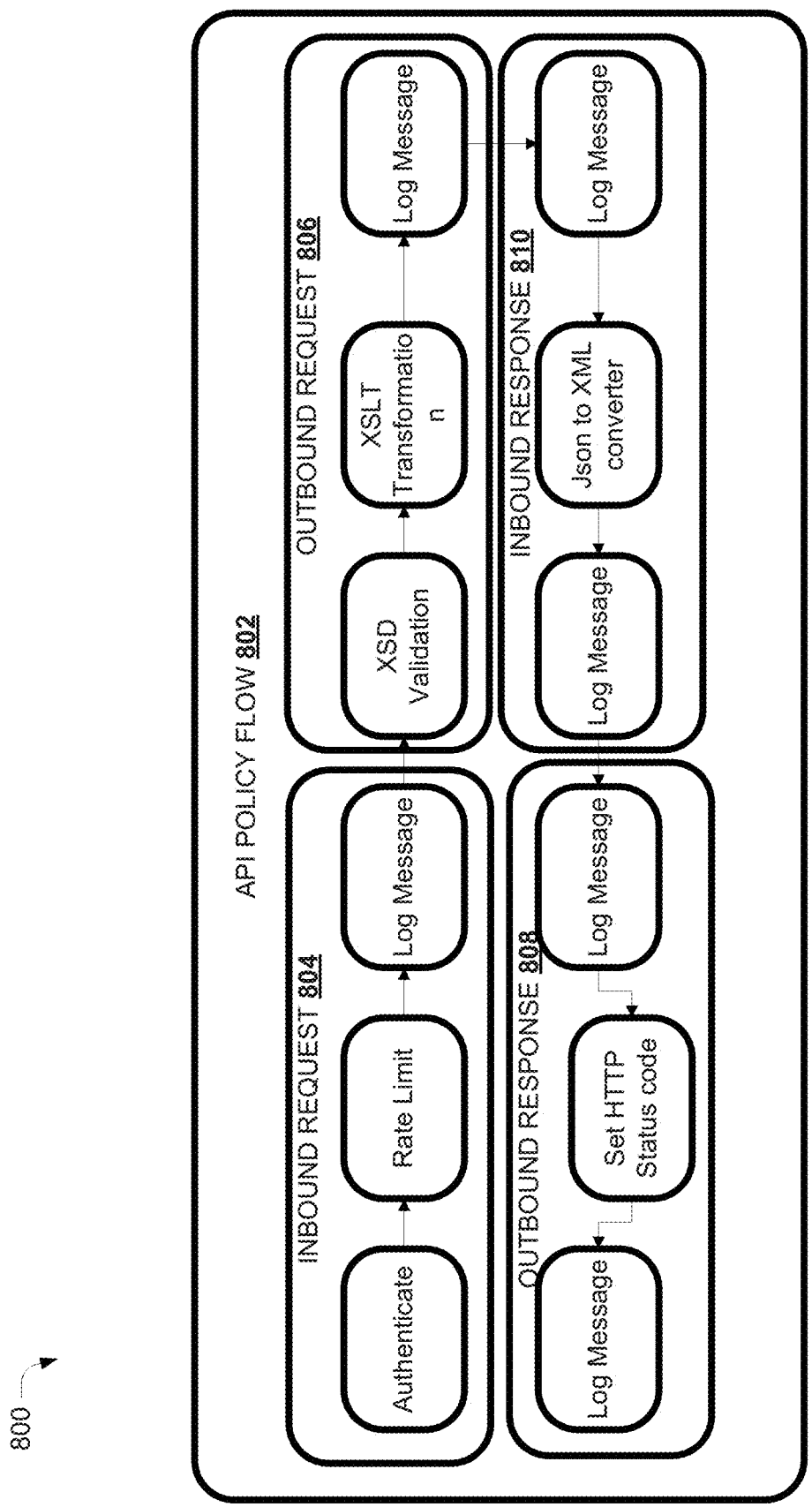
FIG. 8 illustrates an API policy flow as deployed an API assessment system, according to an example embodiment of the present disclosure.

FIG. 8 illustrates an API policy flow diagram 800 as deployed the API assessment system 110, according to an example embodiment of the present disclosure. The components of the system 110 may be deployed for the description of FIG. 8. For the same of brevity and technical clarity any description of the components of the system 110 described above may be repeated hereinafter. The policy flow diagram 800 may include an API policy flow 802. The API policy flow 802 may include an inbound request 804, an outbound request 806, an inbound response 810, and an outbound response 808. The inbound request 804, and the inbound response 810 may refer to policies that may be executed when an API management API is called. The outbound request 806, and the outbound response 808 may refer to API policies that may be executed when API management returns the response to the caller. In accordance to the example illustrated by the API policy flow diagram 800, the inbound request 804 may include policy attributes such as an "authenticate", a "rate limit", and a "log message" for processing an API policy. The inbound request 804 may provide input to the outbound request 806. The outbound request 806 may include policy attributes such as an "XSD validation", an XSLT transformation", and a "log message" for processing an API policy. The outbound request 806 may provide input to the inbound response 810. The inbound response 810 may include policy attributes such as an "log message", a "JSON to XML converter", and a "log message" for processing an API policy. The inbound response 810 may provide input to the outbound response 808. The outbound response 808 may include policy attributes such as an "log message", a "set HTTP status code", and a "log message" for processing an API policy. The inbound request 804, the outbound request 806, the inbound response 810, and the outbound response 808 and associated categories may be explained further by way of FIG. 10.

Figure 9:
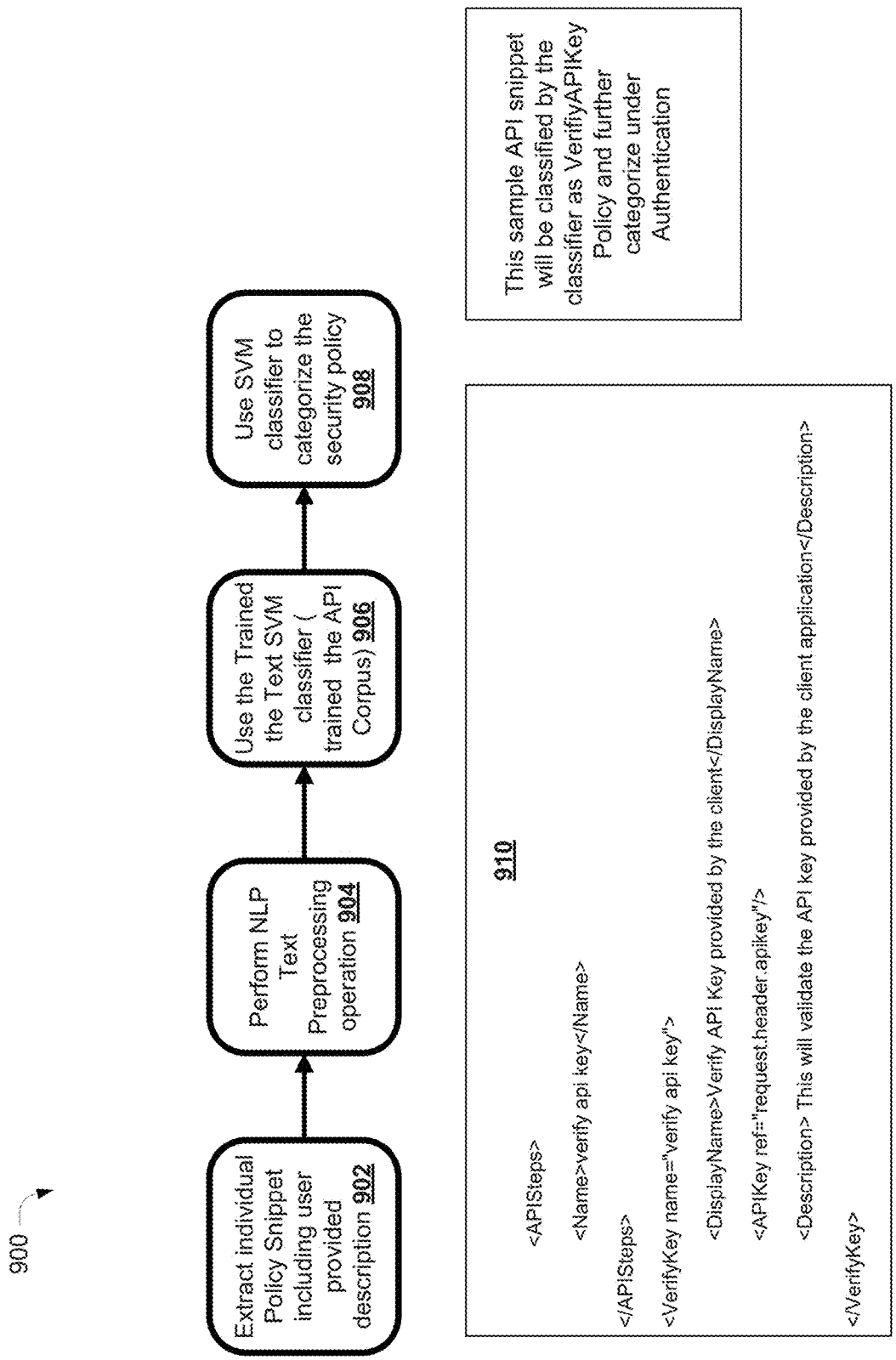
FIG. 9 illustrates a flow diagram for API policy classification as deployed by an API assessment system, according to an example embodiment of the present disclosure.

FIG. 9 illustrates a flow diagram 900 for API policy classification as deployed by the API assessment system 110, according to an example embodiment of the present disclosure. The components of the system 110 may be deployed for the description of FIG. 9. For the same of brevity and technical clarity any description of the components of the system 110 described above may be repeated hereinafter. As mentioned above, the system 110 may create the data corpus 214 from various API policy and classify an API policy based on the data corpus 214. The flow diagram 900 describes the API policy classification as an exemplary embodiment. The flow diagram 900 may execute an extraction 902. The extraction 902 may include extracting an individual policy snippet including user-provided description. The extraction 902 may be followed by a pre-processing operation 904. The pre-processing operation 904 may include performing a natural language processing (NLP) text preprocessing operation as mentioned by the pre-processing component 710. The pre-processing operation 904 may be followed by an implementation 906. The implementation 906 may include the implementation of a text classification algorithm such as a Support Vector Machine (SVM) classifier and the policy corpus 712 for classification of the output from the pre-processing operation 904. The SVM algorithm may refer to supervised learning models that may be associated with learning algorithms that may analyze data used for classification and regression analysis. The implementation 906 may be followed by an implementation 908 that may use the SVM classifier to categorize the API security policy to form the sequence classification model 218. In an example, the commands for the flow diagram 900 may be represented by the code 910. For example, a sample API snippet may be classified by the data classifier 140 as described by the flow diagram 900 as "VerifiyAPlKey" Policy and further categorized under the "authentication" category.

Figure 10:
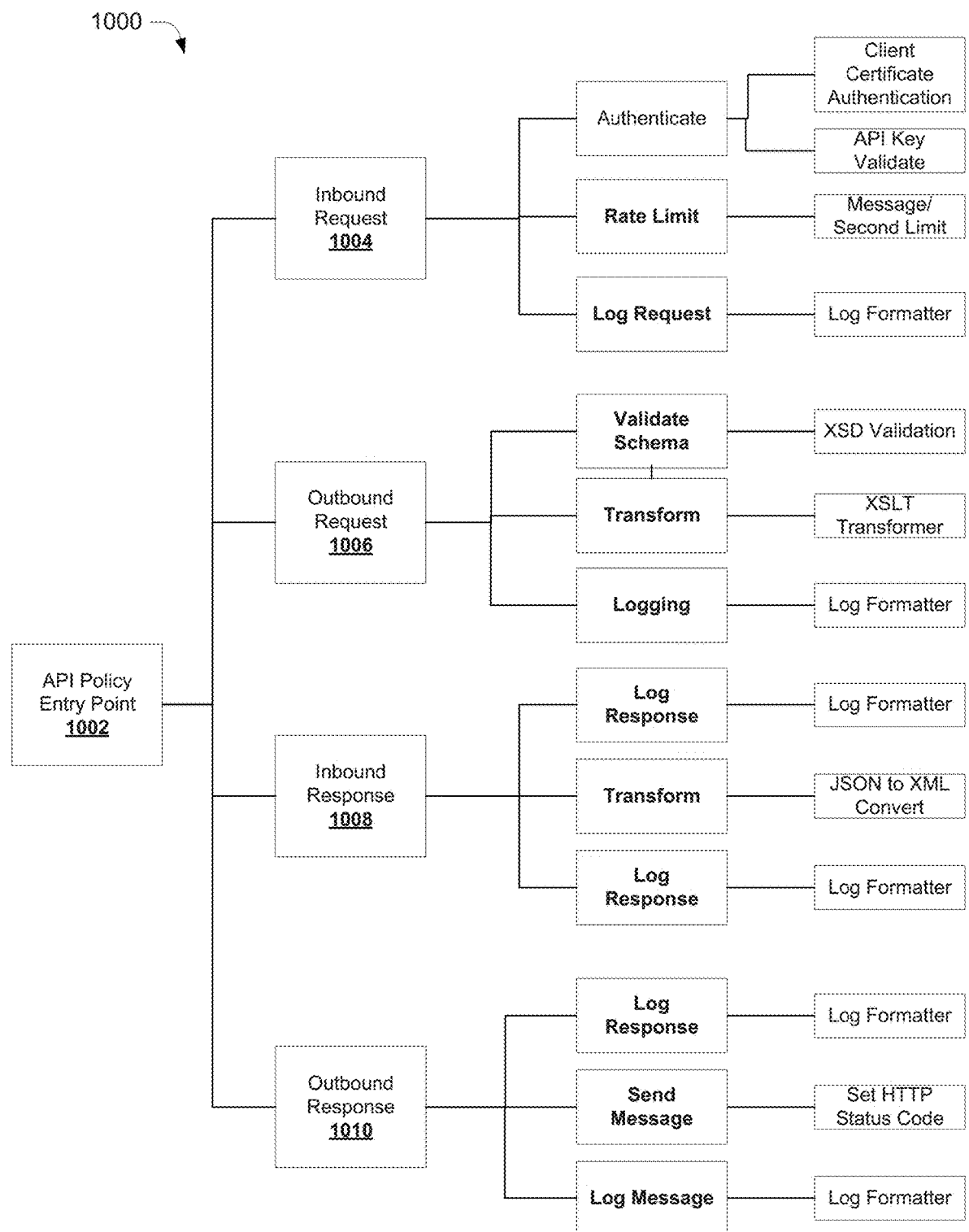
FIG. 10 illustrates a flow diagram for a sequence classification model as created by an API assessment system, according to an example embodiment of the present disclosure.

FIG. 10 illustrates a flow diagram 1000 for the sequence classification model 218 as created by the API assessment system 110, according to an example embodiment of the present disclosure. The components of the system 110 may be deployed for the description of FIG. 10. For the same of brevity and technical clarity any description of the components of the system 110 described above may be repeated hereinafter. The flow diagram 1000 may include an API policy entry point 1002. The API policy entry point 1002 may provide API descriptors that may contain information about an API, the available functionality of the API and the Uniform Resource Locator (URL) to access it. The API policy entry point 1002 may include an inbound request 1004, an outbound request 1006, an inbound response 1008, an outbound response 1010. The data classifier 140 may categorize the plurality of attributes 212 from an API policy in one of the inbound request 1004, the outbound request 1006, the inbound response 1008, and the outbound response 1010. The data classifier 140 may implement the first cognitive learning operation 216 to categorize the plurality of attributes 212 and create the sequence classification model 218. For example, the attributes such as the "authenticate", "rate limit", and "log request" may be classified into the inbound request 1004. In accordance with various exemplary embodiments of the present disclosure, the "authenticate" attribute may be bifurcated further to include categories such as "client certificate authentication", and "API key validate". The "rate limit" attribute may be classified further to include categories such as "message/ second limit". The "log request" attribute may be classified further to include categories such as "log formatter". The categories such as "authenticate", "rate limit", "log request", "client certificate authentication", "API key validate", "message/second limit", and "log formatter" may be nodes from the plurality of nodes 220 mentioned above.

The attributes such as the "validate schema", "transform", and "logging" may be classified into the outbound request 1006. The "validate schema" attribute may be classified further to include categories such as "XSD validation". The "transform" attribute may be classified further to include categories such as "XSLT transformer". The "logging" attribute may be classified further to include categories such as "log formatter". The categories such as "validate schema", "transform", "logging", "XSD validation", "XSLT transformer", and "log formatter" may be nodes from the plurality of nodes 220 mentioned above.

The attributes such as the "log response", "transform", and "log response" may be classified into the inbound response 1008. The "log response" attribute may be classified further to include categories such as "log formatter". The "transform" attribute may be classified further to include categories such as "JSON to XML convert". The "log response" attribute may be classified further to include categories such as "log formatter". The categories such as "log response", "transform", "log response", "log formatter", "JSON to XML convert", and "log formatter" may be nodes from the plurality of nodes 220 mentioned above.

The attributes such as the "log response", "send message", and "log message" may be classified into the outbound response 1010. The "log response" attribute may be classified further to include categories such as "log formatter". The "send message" attribute may be classified further to include categories such as "set HTTP status code". The "log message" attribute may be classified further to include categories such as "log formatter". The categories such as "log response", "send message", "log message", "set HTTP status code" and "log formatter" may be nodes from the plurality of nodes 220 mentioned above.

Figure 11:
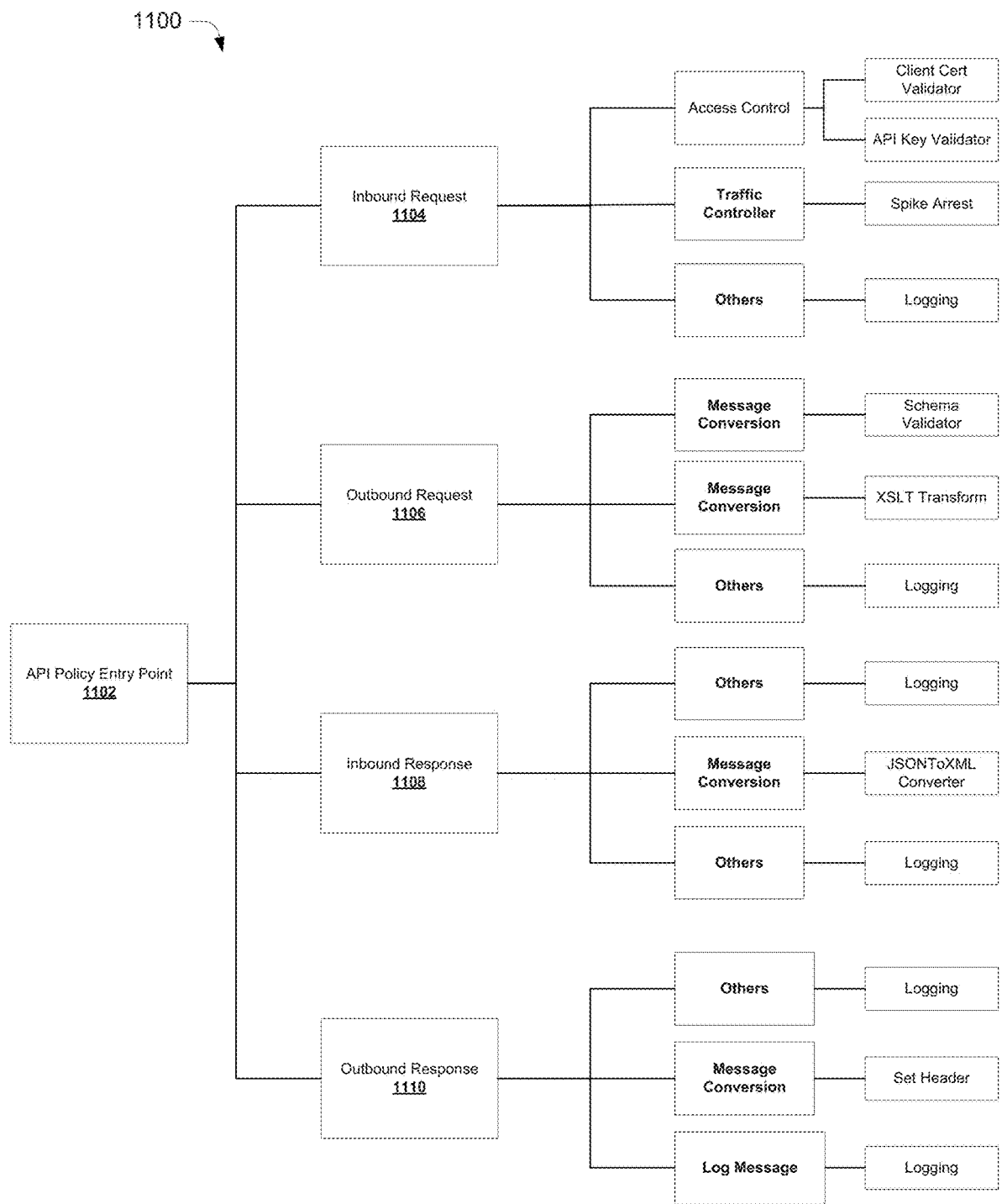
FIG. 11 illustrates a flow diagram for a harmonized sequence classification model as created by an API assessment system, according to an example embodiment of the present disclosure.

FIG. 11 illustrates a flow diagram 1100 for the harmonized sequence classification model 218 as created by the API assessment system 110, according to an example embodiment of the present disclosure. The components of the system 110 may be deployed for the description of FIG. 11. For the same of brevity and technical clarity any description of the components of the system 110 described above may be repeated hereinafter. As mentioned above, the harmonized sequence classification model 218 may be an insightful representation of the sequence classification model 218. Also, as mentioned above, the data classifier 140 may redistribute the sequence classification model 218 to create the harmonized sequence classification model 218. Additionally, the data classifier 140 may rename and rearrange other nodes from the plurality of nodes 220 to form an easily comprehensible sequence classification model 218 known as the sequence classification model 218. For example, all the categories pertaining to logging various responses from the flow diagram 1000 may be consolidated under a single category named "others". The flow diagram 1100 may include an API policy entry point 1102. The API policy entry point 1102 may provide API descriptors that may contain information about an API, the available functionality of the API and the Uniform Resource Locator (URL) to access it. The API policy entry point 1102 may include an inbound request 1104, an outbound request 1106, an inbound response 1108, and an outbound response 1110. The inbound request 1104, the outbound request 1106, the inbound response 1108, and the outbound response 1110 may be the same as the inbound request 1004, the outbound request 1006, the inbound response 1008, and the outbound response 1010. The data classifier 140 may rename and classify the plurality of nodes 220 from the flow diagram 1000 to create the flow diagram 1100. For example, all the categories pertaining to logging various responses from the flow diagram 1000 may be consolidated under a single category name "others". The attributes such as the "authenticate", "rate limit", and "log request" from the flow diagram 1000 may be renamed as "access control", "traffic controller", and "others". The attributes related to message validation, transformation and sending such as "validate schema", "transform", and "send message" from the flow diagram 1000 may be consolidated under a single category name "message conversion".

In accordance with various embodiments of the present disclosure, the renamed and categorized flow diagram 1100 may include the attributes such as "access control", "traffic controller", and "others" classified into the inbound request 1104. In accordance with various exemplary embodiments of the present disclosure, the "access control" attribute may be bifurcated further to include categories such as "client certificate validator", and "API key validator". The categories such as "client certificate validator", and "API key validator" may refer to the categories such as "client certificate authentication", and "API key validate" from the flow diagram 1000 that may have been renamed for facilitating data homogenization and analysis for resolving the query 202. The attributes such as the "message conversion", and "others" may be classified into the outbound request 1006. The "message conversion" attribute may be classified further to include categories such as "schema validator", and "XSLT transform". The "others" attribute may be classified further to include categories such as "logging". The "message conversion" may refer to the "validate schema", "transform" from the flow diagram 1000. The "XSD validation" and "XSLT transformer" from flow diagram 1000 may be renamed as "schema validator" and "XSLT transform" respectively. Similarly, the flow diagram 1100 may include all the attributes from the flow diagram 1000 rearranged for providing an advantage in security assessment and risk scoring. The renaming may be advantageous because it may lead to the generation of a common keyword set that may be referred to from the data corpus 214 automatically by the system thereby circumventing human interference in the classification process.

In an example, the attributes such as the "others", and "message conversion", may be classified into the inbound response 1108. The "others" attribute may be classified further to include categories such as "logging" as mentioned above. The "message conversion" attribute may be classified further to include categories such as "JSON to XML converter". The attributes such as "others", "message conversion", and "log message" may be classified into the outbound response 1010. The "others" attribute may be classified further to include categories such as "logging". The "message conversion" attribute may be classified further to include categories such as "set header". The "log message" attribute may be classified further to include categories such as "logging".

Figure 12:
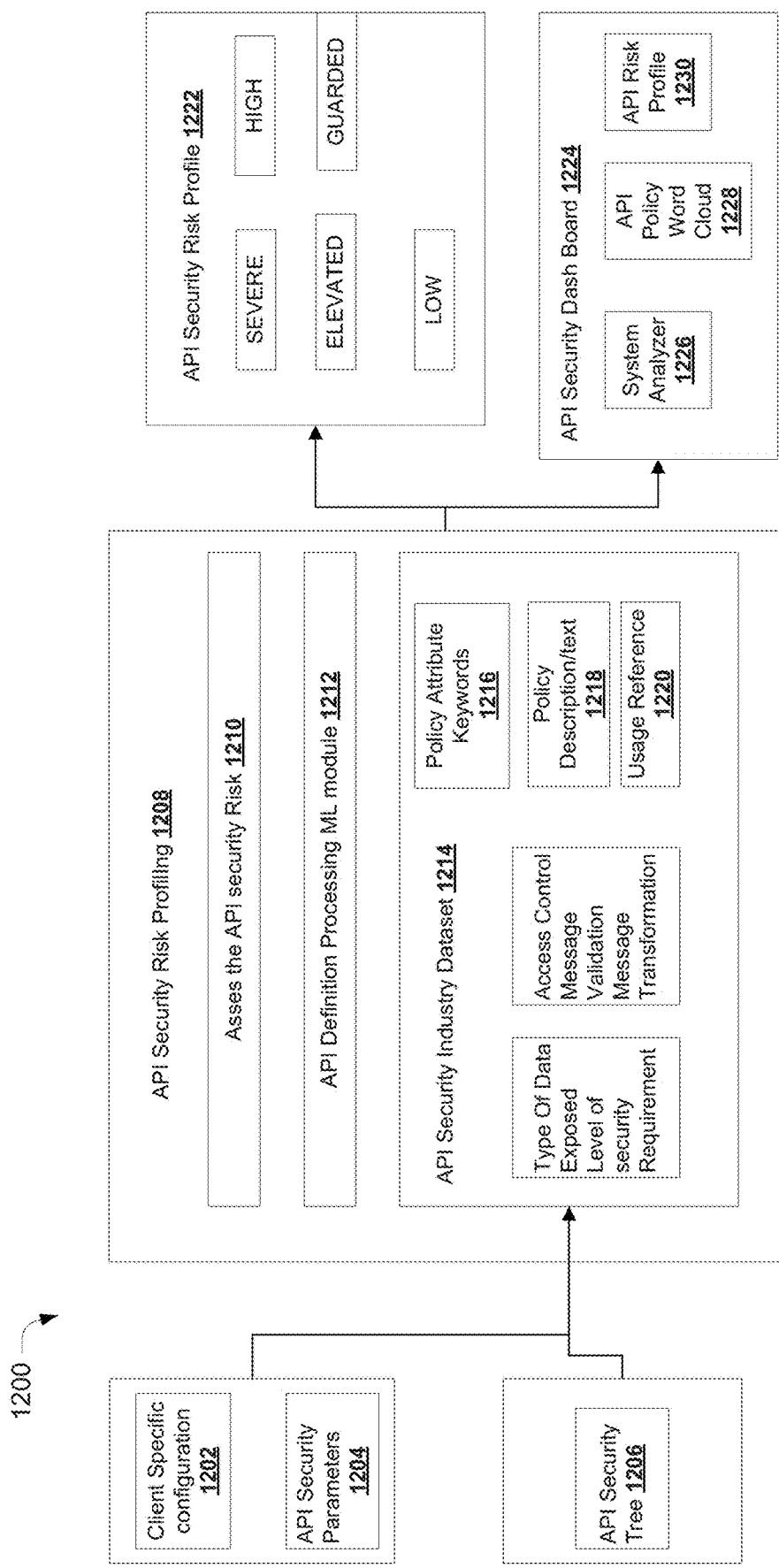
FIG. 12 illustrates a flow diagram for an automatic healing process for an API created by deploying an API assessment system, according to an example embodiment of the present disclosure.

FIG. 12 illustrates a flow diagram for a vulnerability assessment 1200 and security risk profiling for an API created by deploying the API assessment system 110, according to an example embodiment of the present disclosure. The components of the system 110 may be deployed for the description of FIG. 12. For the same of brevity and technical clarity any description of the components of the system 110 described above may be repeated hereinafter. The vulnerability assessment 1200 may include a client-specific API configuration 1202, API security parameters 1204. The client-specific API configuration 1202 may be obtained from the query 202. In an example, the client-specific API configuration 1202 may be obtained from the assessment data 204 based on input from the user. The API security parameters 1204 may be the plurality of risk parameters 224 identified by the risk profiler 150 from the assessment data 204 as mentioned above. The vulnerability assessment 1200 may further include an API security tree 1206. In accordance with various embodiments of the present disclosure, the API security tree 1206 may be the harmonized sequence classification model 218 as created by the flow diagram 1100. The vulnerability assessment 1200 may include a risk profiling process 1218. The risk profiling process 1218 may include an assessment 1210 for assessing the API security risk, a processing 1212, and an API security industry data set 1214. The API security industry data set 1214 may include a set of policy keywords 1216, a set of policy description 1218, and a usage reference 1220. In an example, the client-specific API configuration 1202, the API security parameters 1204, and the API security tree 1206 may be used for the creation of the set of policy keywords 1216, the set of policy description 1218, and the usage reference 1220. Further, the API security industry data set 1214 may include the plurality of risk parameters 224 such as type of data exposed, level of security requirement, and the like. The API security industry data set 1214 may include various attributes from the policy description classified as per the harmonized sequence classification model 218 such as access control, message validation, message transformation and the like.

The vulnerability assessment 1200 may further include the processing 1212, wherein a definition processing algorithm may be implemented to process the API security industry data set 1214. In an example, the definition processing algorithm may be the multivariate regression model for creating the risk profile 230. In an example, the multivariate regression model may be the ordinal logistic regression by analyzing XML based API descriptors from the data corpus 214. The definition processing algorithm may execute the assessment 1210 to create a risk assessment for an API based on mapping the plurality of risk parameters 224 to the sequence classification model 218. The definition processing algorithm may create an API security risk profile 1222. The API security risk profile 1222 may be the risk profile 230 as mentioned above. The API security profile 1222 may include 5 risk levels as mentioned by way of FIGS. 1-2. For example, the API security profile 1222 may include risk profile 230 levels such as "low", "guarded", "elevate", "high", "severe". The vulnerability assessment 1200 may further include associating the risk profile 230 with a security dashboard 1224. The security dashboard may include a system analyzer 1226, an API policy word cloud 1228, and an API risk profile 1230. The API risk profile 1230 may be the risk profile 230. The API policy word cloud 1228 may be the policy word cloud described above. The system analyzer 1226 may be a component of the risk profiler 150 analyzing the risks for resolving the query 202. The process of assessment 1210 and the implementation of the definition processing algorithm may be explained in detail by way of FIGS. 14A-20. The assessment 1210 may lead to the generation of the risk score 232.

Figure 13:
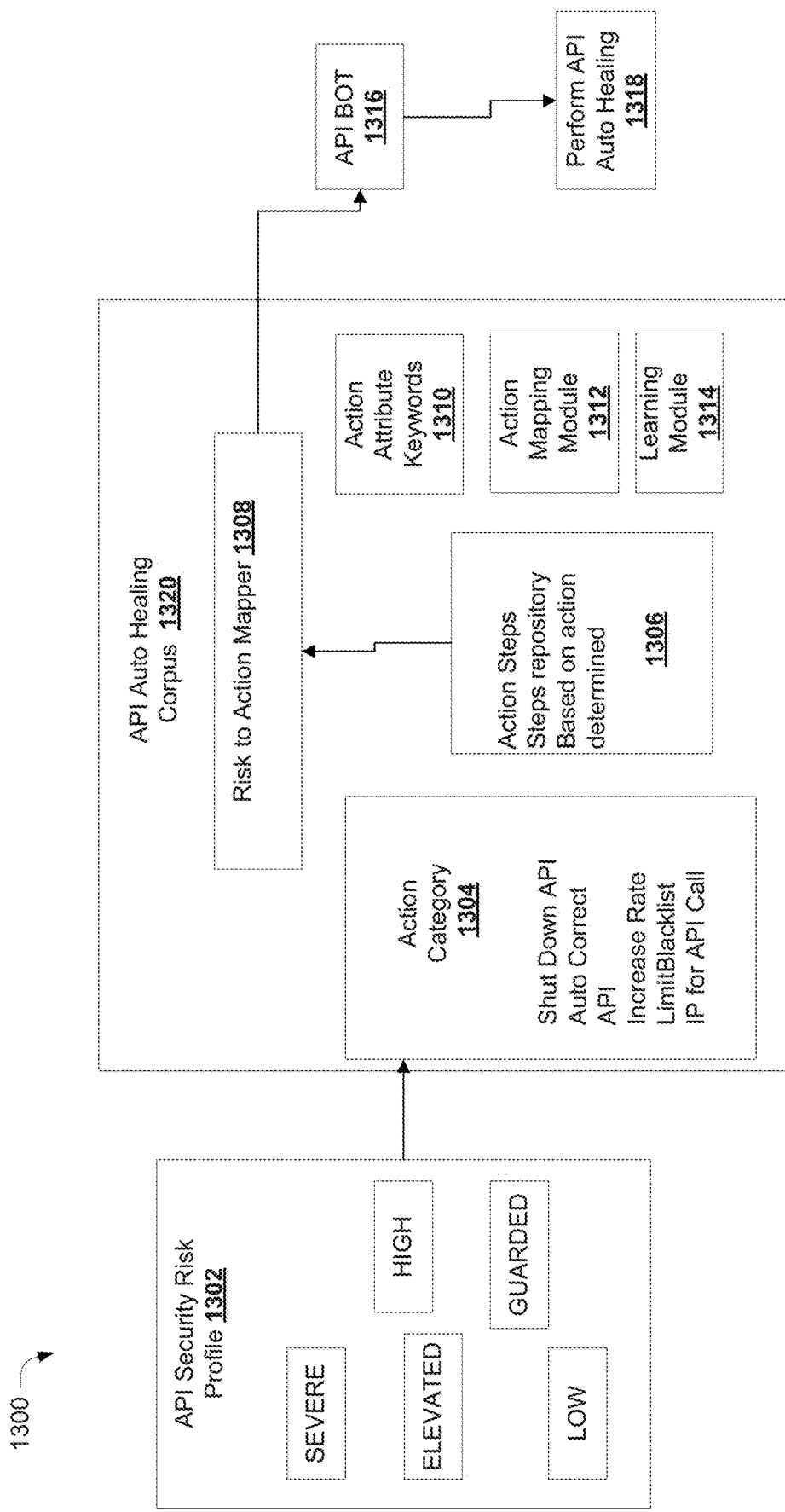
FIG. 13 illustrates a flow diagram for a vulnerability assessment and security risk profiling for an API created by deploying an API assessment system, according to an example embodiment of the present disclosure.

FIG. 13 illustrates a flow diagram 1300 for an automatic healing process for an API created by deploying the API assessment system 110, according to an example embodiment of the present disclosure. The components of the system 110 may be deployed for the description of FIG. 13. For the same of brevity and technical clarity any description of the components of the system 110 described above may be repeated hereinafter. The flow diagram 1300 may include an API risk profile 1302. In accordance with various embodiments of the present disclosure, the API risk profile 1302 may include risk profile 230 range such as "low", "guarded", "elevate", "high", "severe". The automatic healing process may further include an auto-healing corpus 1320. The auto-healing corpus 1320 may be the rectification corpus 234 as mentioned above. The auto-healing corpus 1320 may be a collection of different remediation actions, and a repository of steps that may be taken for automated healing of various API's. The auto-healing corpus 1320 may include an action category 1304, an action step repository 1306, an action attribute keyword set 1310, an action mapping module 1312, and a learning module 1314. The action category 1304 may include the plurality of remediations 236 such as shut down API, auto-correct an API, increase rate limit blacklist IP for API call, and the like. The system 110 may implement the third cognitive learning operation 238 to map remediation actions from the assessment data 204 to generate the action attribute keyword set 1310. The steps that may be undertaken for each of the remediation actions may be stored in the action step repository 1306. The learning module 1314 may be an aspect of the third cognitive learning operation 238. The learning module 1314 may record various remediation actions and steps. The learning module 1314 may update the auto-healing corpus 1320 based on an update in the assessment data 204 on a near real-time basis.

The auto-healing corpus 1320 may further include a risk to action mapper 1308. The risk to action mapper 1308 may be coupled to the action step repository 1306. The risk to action mapper 1308 may map the level of risk from the API risk profile 1302 with the action step repository 1306 using the action mapping module 1312. The action step repository 1306 may include steps for the remediation actions from the action category 1304. For example, the risk to action mapper 1308 may identify a remediation action "shut down API" from the action category 1304 for a risk level "elevated". The steps for the remediation action "shut down API" from the action category 1304 may be stored in the action step repository 1306. The risk to action mapper 1308 may be coupled to an API BOT 1316. The API BOT 1316 may be an automated algorithm that may implement the action step identified by the risk to action mapper 1308 for a particular risk. The API BOT 1316 may execute an automatic healing 1318. For example, the API BOT 1316 may automatically implement the steps for remediation action step "shut down API" from the action step repository 1306. The learning module 1314, and the action mapping 1312 may be an aspect of the third cognitive learning operation 238.

Figure 14A:
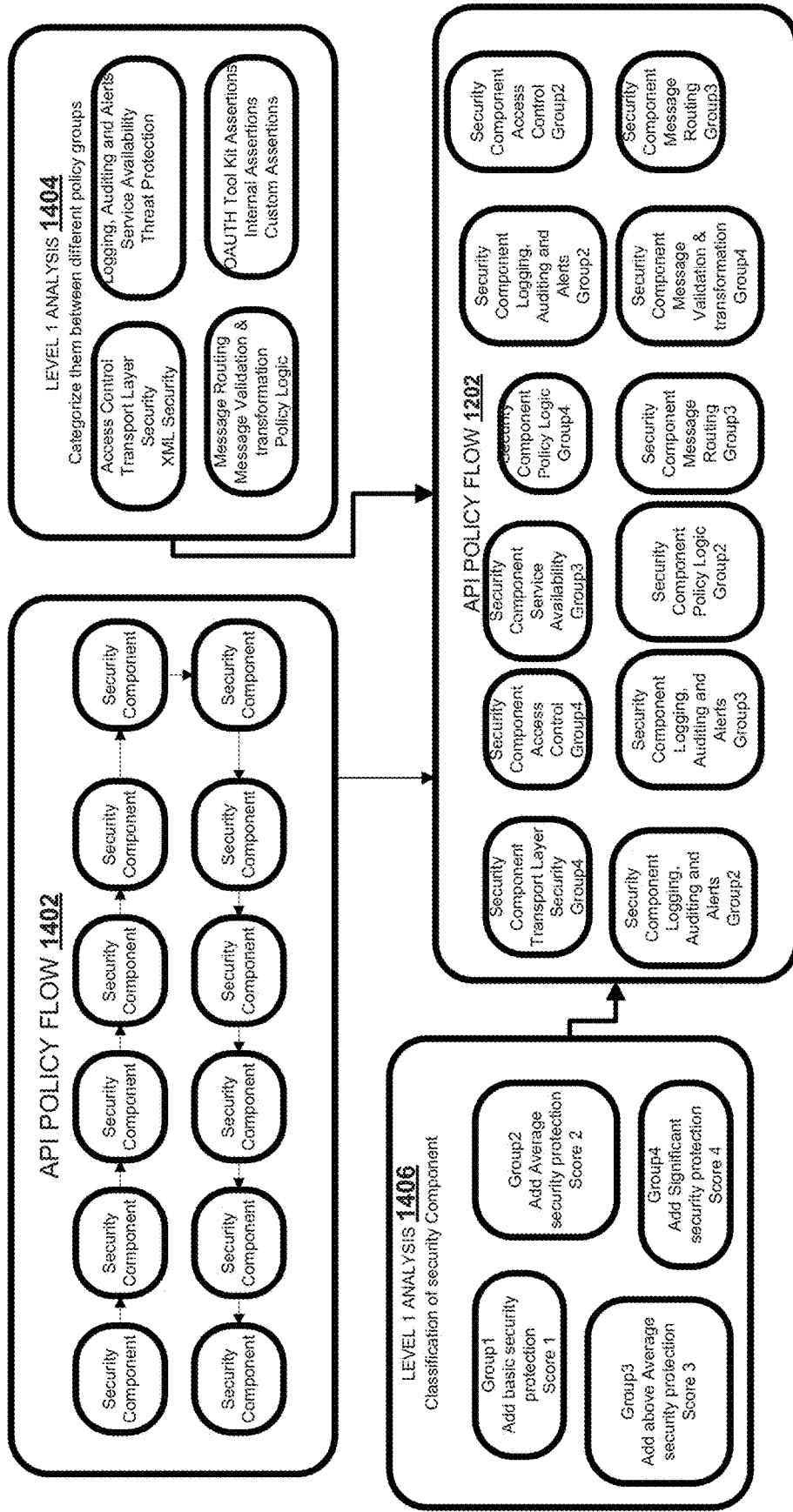
FIGS. 14A and 14B illustrate a flow diagram for a first level for a scoring technique deployed for security risk profiling of an API by deploying an API assessment system, according to an example embodiment of the present disclosure.
Figure 14B:
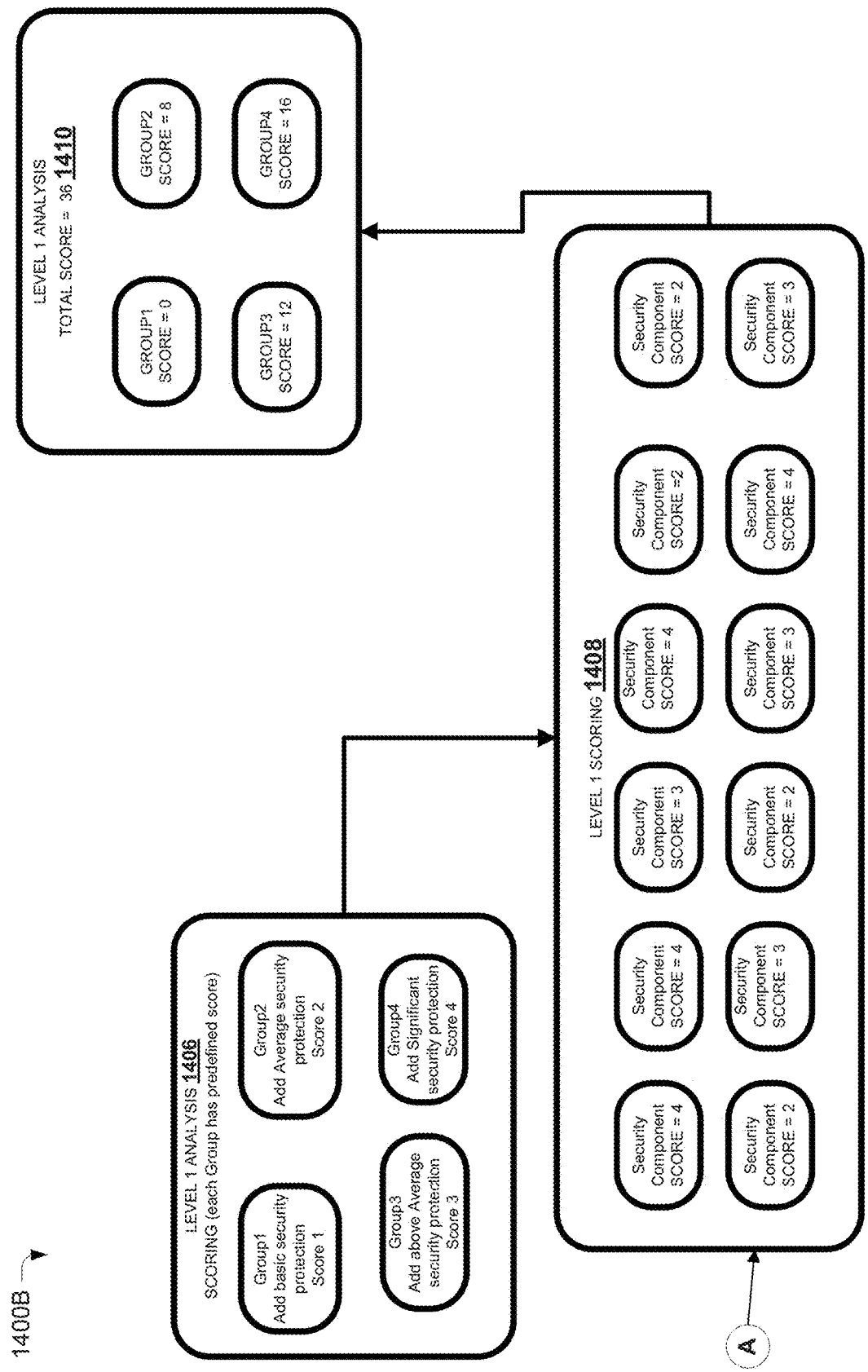

FIGS. 14A and 14B illustrate a flow diagram 1400 for a first level for a scoring technique deployed for security risk profiling of an API by deploying the API assessment system 110, according to an example embodiment of the present disclosure. The components of the system 110 may be deployed for the description of FIGS. 14A and 14B. For the same of brevity and technical clarity any description of the components of the system 110 described above may be repeated hereinafter. As mentioned above, the risk profiler 150 may deploy the multivariate regression model for creating the risk profile 230. The multivariate regression model may be the ordinal logistic regression by analyzing XML based API descriptors from the data corpus 214. The multivariate regression model may include multiple levels for analyzing XML based API descriptors. In an example, each of the levels may be associated with a risk mapping level from the plurality of risk mapping levels 226. The FIGS. 14A and 14B illustrate a first level of scoring for risk score 232 calculation. The first level may be the first risk mapping level from the plurality of risk mapping levels 226. The multivariate regression model may implement a categorization 1404 wherein, the plurality of nodes 220 of the sequence classification model 218 may be categorized into various policy groups as illustrated. The policy groups may be defined based on a level of protection that may be required. For example, a group 1 may be identified to classify the plurality of nodes 220 wherein basic security protection would be added. The multivariate regression model may implement a classification 1404, wherein the plurality of groups for level 1 may be identified based on a level of protection that may be required for the plurality of nodes 220 classified therein. For example, the plurality of groups may include a group 1 that may require a low level of added protection, a group 2 that may require an average level of added protection, a group 3 that may require an above-average level of added protection and a group 4 that may require a significant level of added protection for all the plurality of nodes 220 classified therein. The system 110 may assign a score 1406 to each of the plurality of groups within a risk mapping level, as mentioned above. In the FIGS. 14A and 14B the each of the plurality of groups may be assigned a first score value at step 1406 such as for example, the group 1 may be assigned a score value "1", the group 2 may be assigned a score value "2", the group 3 may be assigned a score value "3", and the group 4 may be assigned a score value "4". The FIGS. 14A and 14B may further include an API policy flow 1402. The API policy flow 1402 may be similar to the policy flow 802 as described by the FIG. 8. The system 110 may implement a scoring 1408 wherein, the system may implement the regression model onto the API policy flow 1402 by categorizing each of the components of the API policy flow 1402 into one of the group 1, the group 2, the group 3, and the group 4 and assign the corresponding score. The system 110 may implement a calculation 1410, wherein a total score may be calculated. The total score may include an aggregation of all the scores assigned as per the group number to each of the components present in the API policy flow 1402. In the illustrated example, the total score may be "36". In an example, the components present in the API flow 1402 may be the plurality of nodes 220 from the sequence classification model 218. In an example, the components present in the API flow 1402 may be the plurality of risk parameters 224.

Figure 15A:
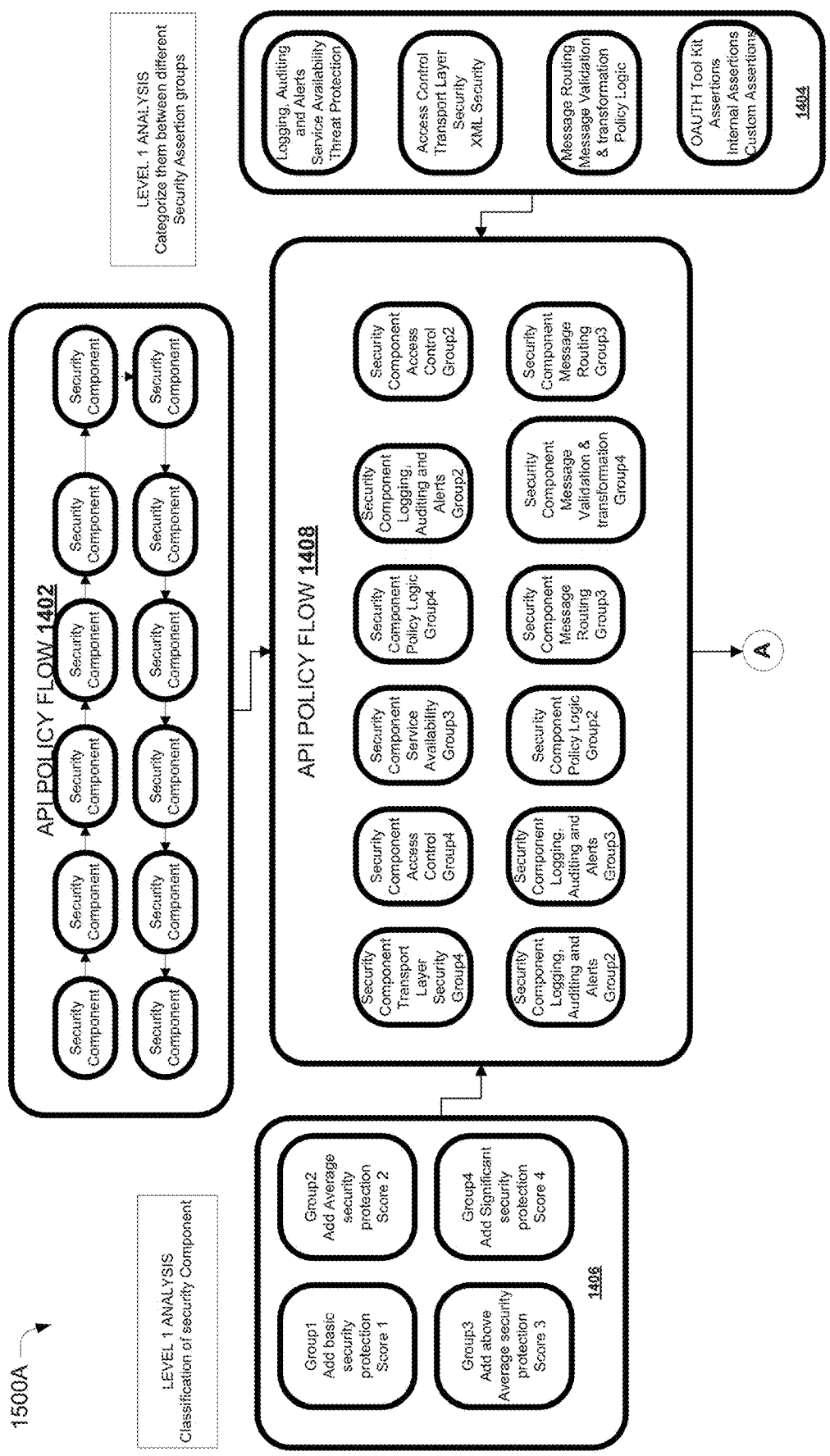
FIGS. 15A and 15B illustrate a flow diagram for a second level for a scoring technique deployed for security risk profiling of an API by deploying an API assessment system, according to an example embodiment of the present disclosure.
Figure 15B:
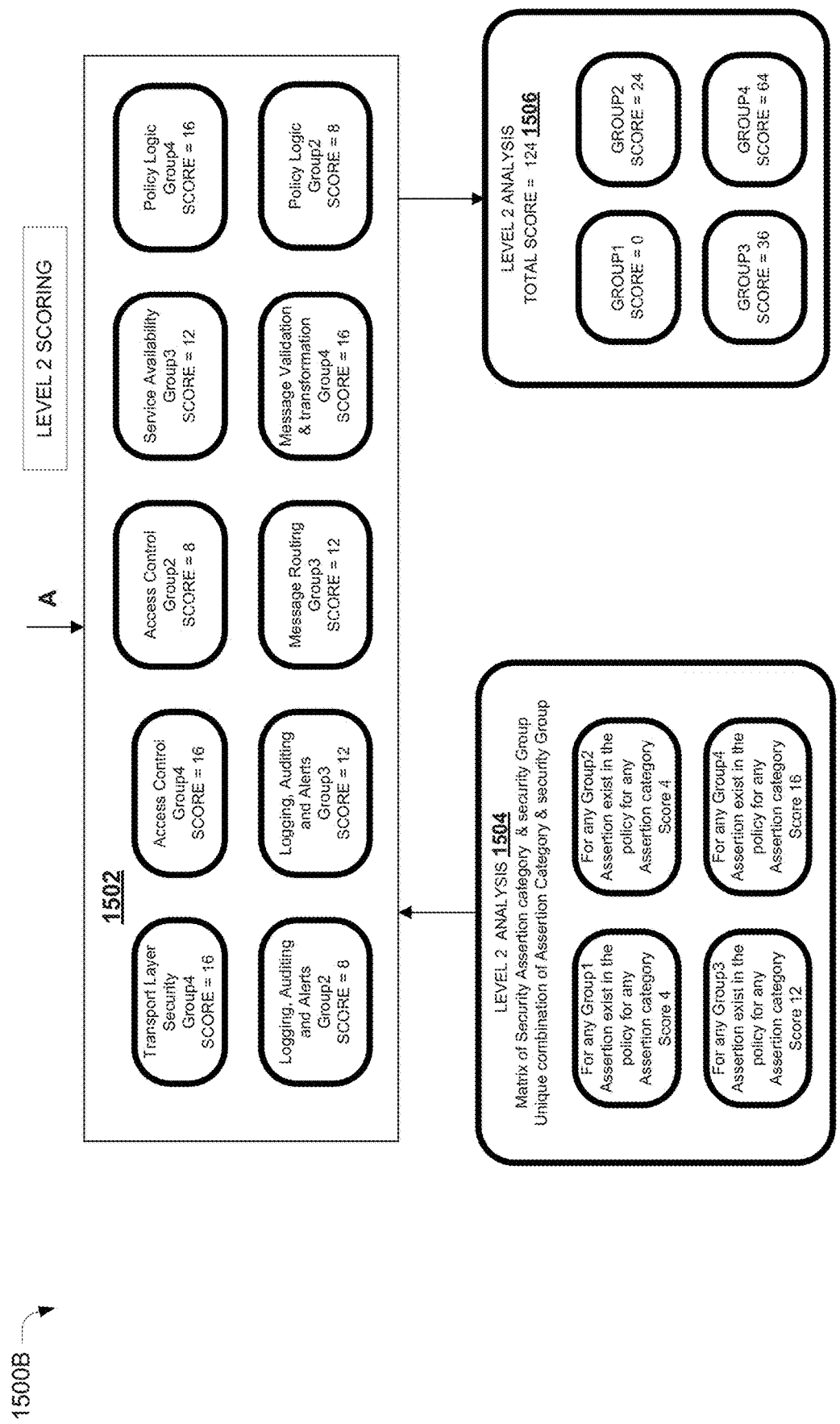

FIGS. 15A and 15B illustrate a flow diagram 1500 for a second level for a scoring technique deployed for security risk profiling of an API by deploying the API assessment system 110, according to an example embodiment of the present disclosure. The components of the system 110 may be deployed for the description of FIGS. 15A and 15B. For the same of brevity and technical clarity any description of the components of the system 110 described above may be repeated hereinafter. The description of FIGS. 15A and 15B may in continuation with the FIGS. 14A and 14B since the FIGS. 15A and 15B represent the second level for the regression model. The second level may be the second risk mapping level from the plurality of risk mapping levels 226. The API policy flow 1402, the classification 1404, the score 1406, and the scoring 1408 for level 1 remain the same as illustrated. The level 2 mapping may further include an analysis 1504. The analysis 1504 may include identification of the plurality of groups for level 2 based on a matrix creation amongst a security aspect for each of the components from the API policy flow 1402 the plurality of groups from level. The system may assign a second score value to each of the plurality of groups for level 2 based on the analysis 1504. The second score value may be greater than the score value assigned by the score 1406 for the first risk level mapping. For example, the plurality of groups for the level 2 may include a group 1 "For any Group1 Assertion exist in the policy for any Assertion category", a group 2 "For any Group2 Assertion exist in the policy for any Assertion category", a group 3 "For any Group3 Assertion exist in the policy for any Assertion category", and a group 4 "For any Group4 Assertion exist in the policy for any Assertion category". The second score value assigned herein to the group 1 may be "4", to the group 2 may be "4", to the group 3 may be "12", and to the group 3 may be "16". It should be clear to a person skilled in the art that the second score value may be substantially greater than the first score value. The level 2 risk mapping may further include implementing a scoring 1502 wherein the second score value may be applied to the scoring 1408. The system 110 may implement a calculation 1506, wherein a total score for level 2 may be calculated. The total score may include an aggregation of all the scores assigned as per the group number to each of the components present in the scoring 1502. In the illustrated example, the total score for level 2 may be "124".

Figure 16A:
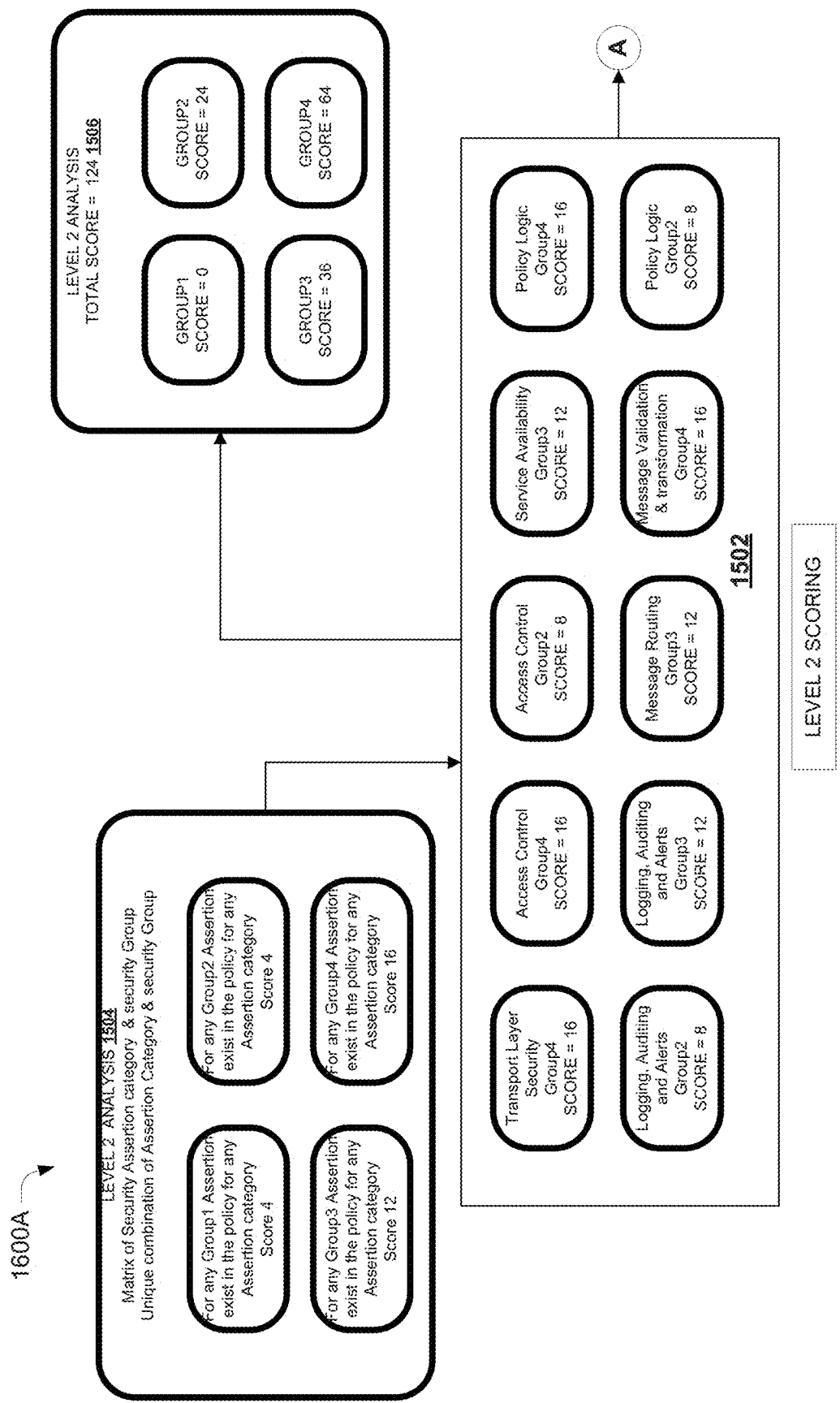
FIGS. 16A and 16B illustrate a flow diagram for a third level for a scoring technique deployed for security risk profiling of an API by deploying an API assessment system, according to an example embodiment of the present disclosure.
Figure 16B:
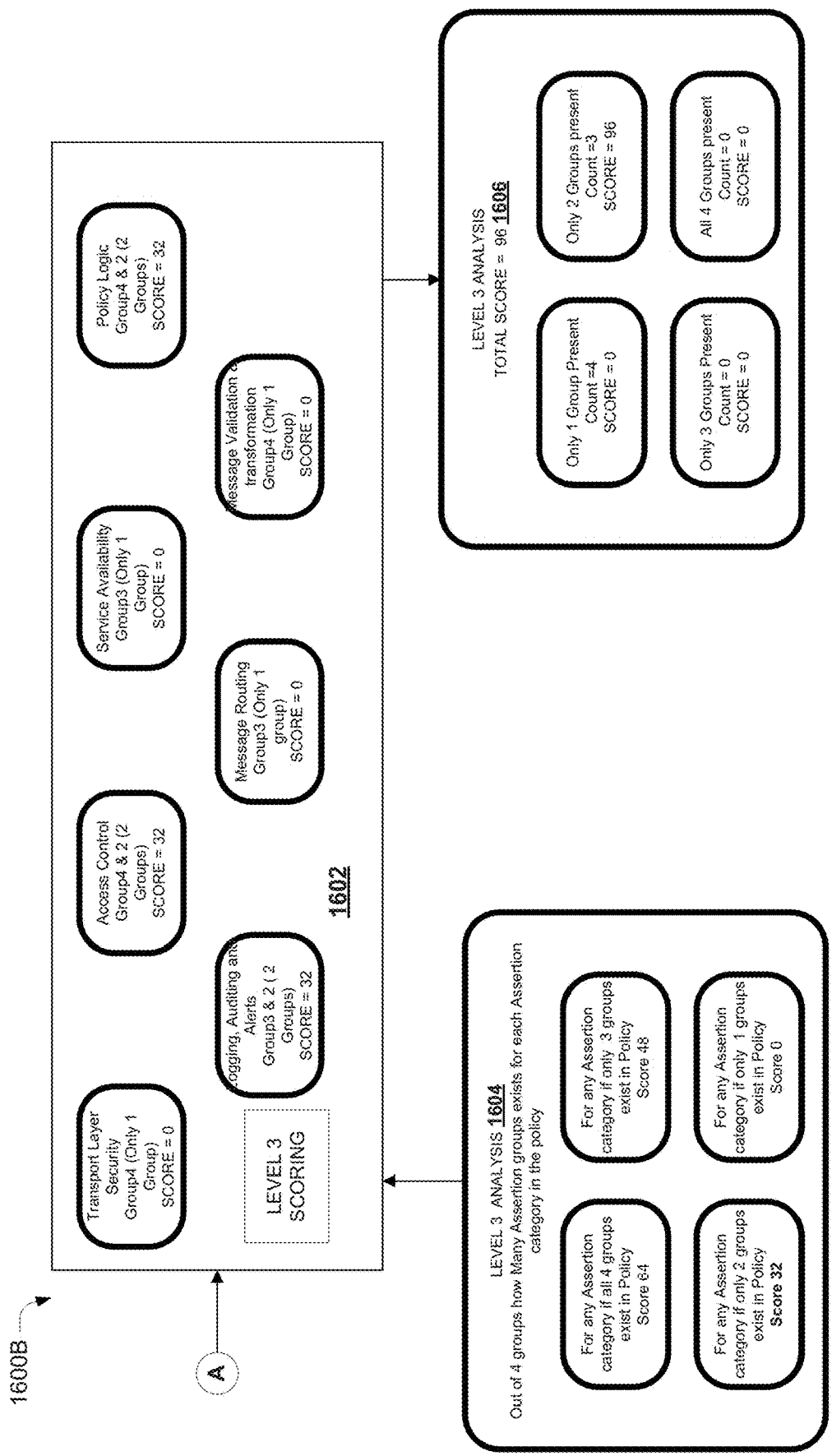

FIGS. 16A and 16B illustrate a flow diagram 1600 for a third level for a scoring technique deployed for security risk profiling of an API by deploying the API assessment system 110, according to an example embodiment of the present disclosure. The components of the system 110 may be deployed for the description of FIGS. 16A and 16B. For the same of brevity and technical clarity any description of the components of the system 110 described above may be repeated hereinafter. The description of FIGS. 16A and 16B may in continuation with the FIGS. 14A,14B, 15A, and 15B since the FIGS. 16A and 16B represent the third level for the regression model. The third level may be the third risk mapping level from the plurality of risk mapping levels 226. The analysis 1504, the scoring 1502, and the calculation 1506 may remain the same as illustrated. The level 3 mapping may further include an analysis 1604. The analysis 1604 may include identification of the plurality of groups for level 3 based on for example, a comparison of a number of assertion groups in each assertion category in an API policy. The system may assign a third score value to each of the plurality of groups for level 3 based on the analysis 1604. The third score value may be greater than the second score value. For example, the plurality of groups for the level 3 may include a group 1 "For any Assertion category if all 4 groups exist in Policy", a group 2 "For any Assertion category if only 3 groups exist in Policy", a group 3 "For any Assertion category if only 2 groups exist in Policy", and a group 4 "For any Assertion category if only 1 group exist in Policy". The third score value assigned herein to the group 1 may be "64", to the group 2 may be "48", to the group 3 may be "32", and to the group 3 may be "0". It should be clear to a person skilled in the art that the third score value may be substantially greater than the second score value and the first score value. The level 3 risk mapping may further include implementing a scoring 1602 wherein the third score value may be applied to the scoring 1502. The system 110 may implement a calculation 1606, wherein a total score for level 3 may be calculated. The total score may include an aggregation of all the scores assigned as per the group number to each of the components present in the scoring 1602. In the illustrated example, the total score for level 3 may be "96".

Figure 17A:
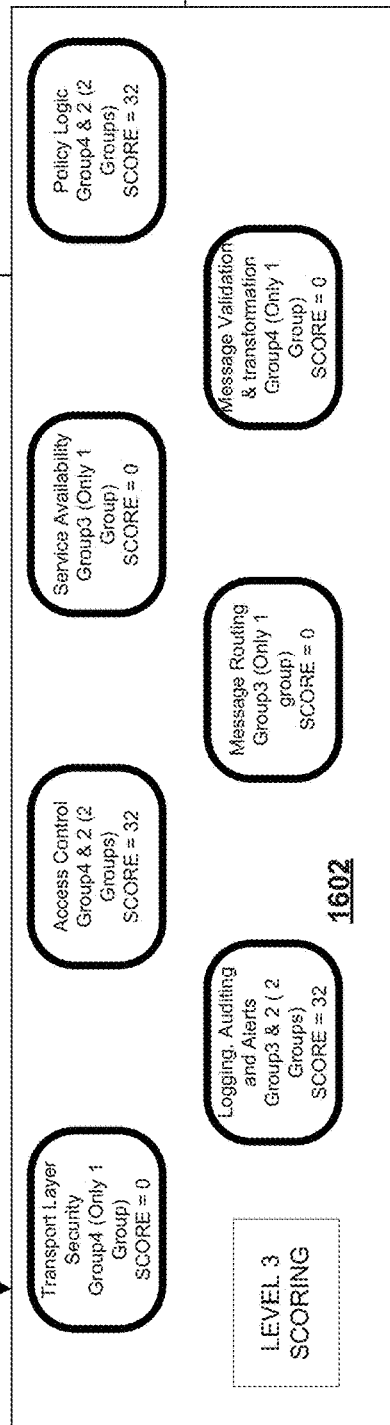
FIGS. 17A and 17B illustrate a flow diagram for a fourth level for a scoring technique deployed for security risk profiling of an API by deploying an API assessment system, according to an example embodiment of the present disclosure.
Figure 17A:
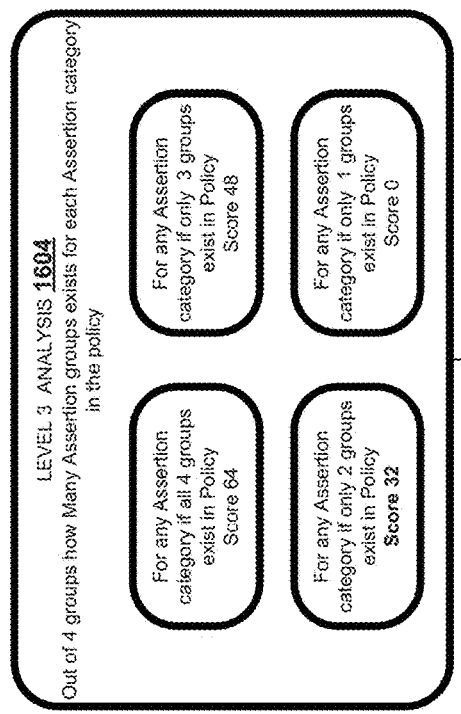
Figure 17B:
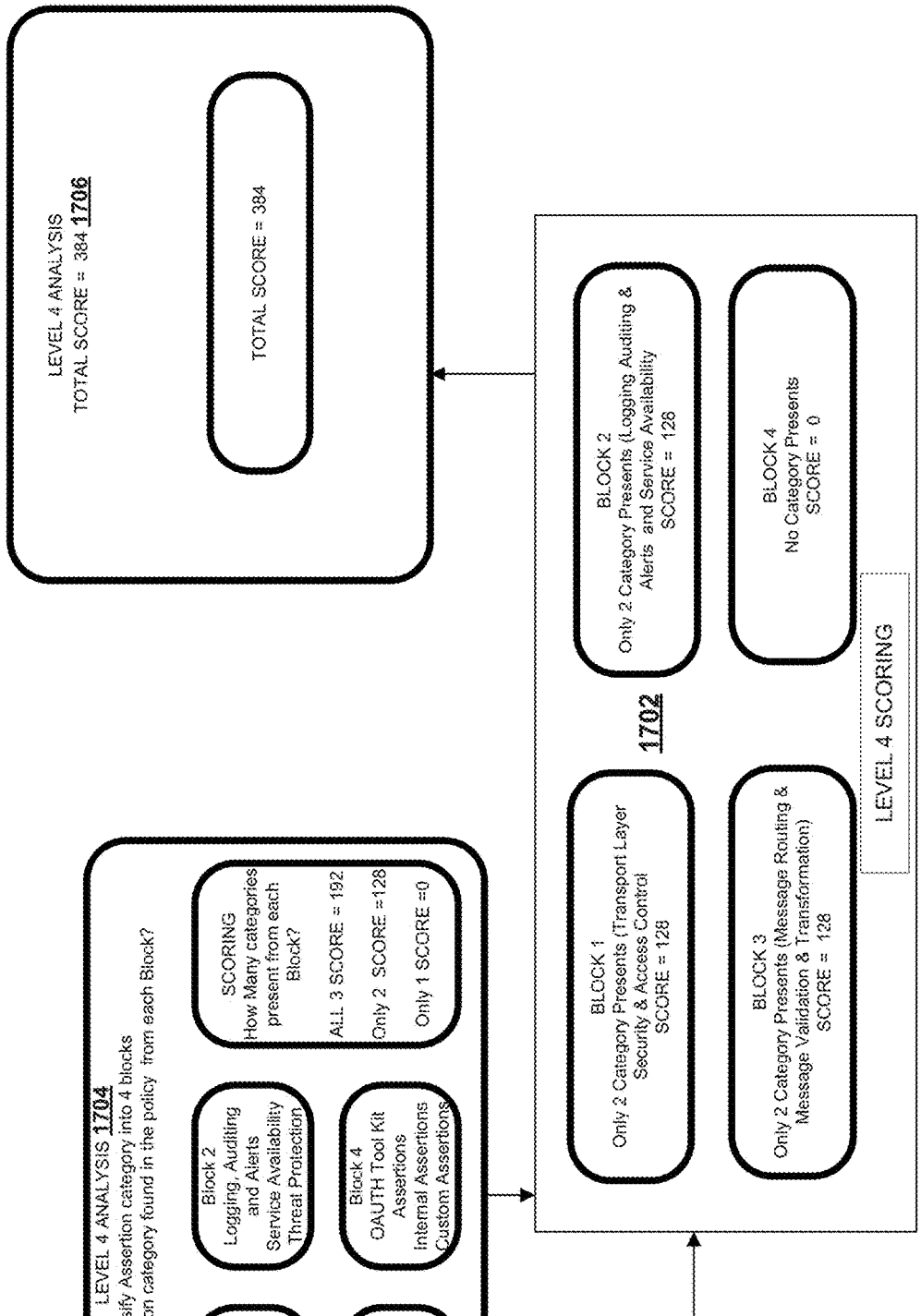

FIGS. 17A and 17B illustrate a flow diagram 1700 for a fourth level for a scoring technique deployed for security risk profiling of an API by deploying the API assessment system 110, according to an example embodiment of the present disclosure. The components of the system 110 may be deployed for the description of FIGS. 17A and 17B. For the same of brevity and technical clarity any description of the components of the system 110 described above may be repeated hereinafter. The description of FIGS. 17A and 17B may in continuation with the FIGS. 14A,14B, 15A, 15B, 16A, and 16B since the FIGS. 17A and 17B represent the fourth level for the regression model. The fourth level may be the fourth risk mapping level from the plurality of risk mapping levels 226. The analysis 1604, the scoring 1602, and the calculation 1606 may remain the same as illustrated. The level 4 mapping may further include an analysis 1704. The analysis 1704 may include identification of the plurality of groups for level 4 based on for example, how many assertion categories may be found in policy in each of the plurality of groups from the level 1. The system may assign a fourth score value to each of the plurality of groups for level 4 based on the analysis 1704. The fourth score value may be greater than the third score value. For example, the plurality of groups for the level 4 may include a group 1 "Access Control, Transport Layer Security, XML Security", a group 2 "Logging, Auditing and Alerts, Service Availability, Threat Protection", a group 3 "Message Routing, Message Validation & transformation, Policy Logic", and a group 4 "OAUTH Tool Kit Assertions, Internal Assertions, Custom Assertions". The fourth score value assigned herein may be based on for example, how many security assertion categories may be present from each of the plurality of groups mentioned above such as for score for all 3 categories present may be "192", score for 2 categories present may be "128", and the score for no category present may be "0". It should be clear to a person skilled in the art that the fourth score value may be substantially greater than the third score value, the second score value, and the first score value. The level 4 risk mapping may further include implementing a scoring 1702 wherein the fourth score value may be applied to the scoring 1602. The system 110 may implement a calculation 1706, wherein a total score for level 4 may be calculated. The total score may include an aggregation of all the scores assigned as per the group number to each of the components present in the scoring 1702. In the illustrated example, the total score for level 4 may be "384".

Figure 18A:
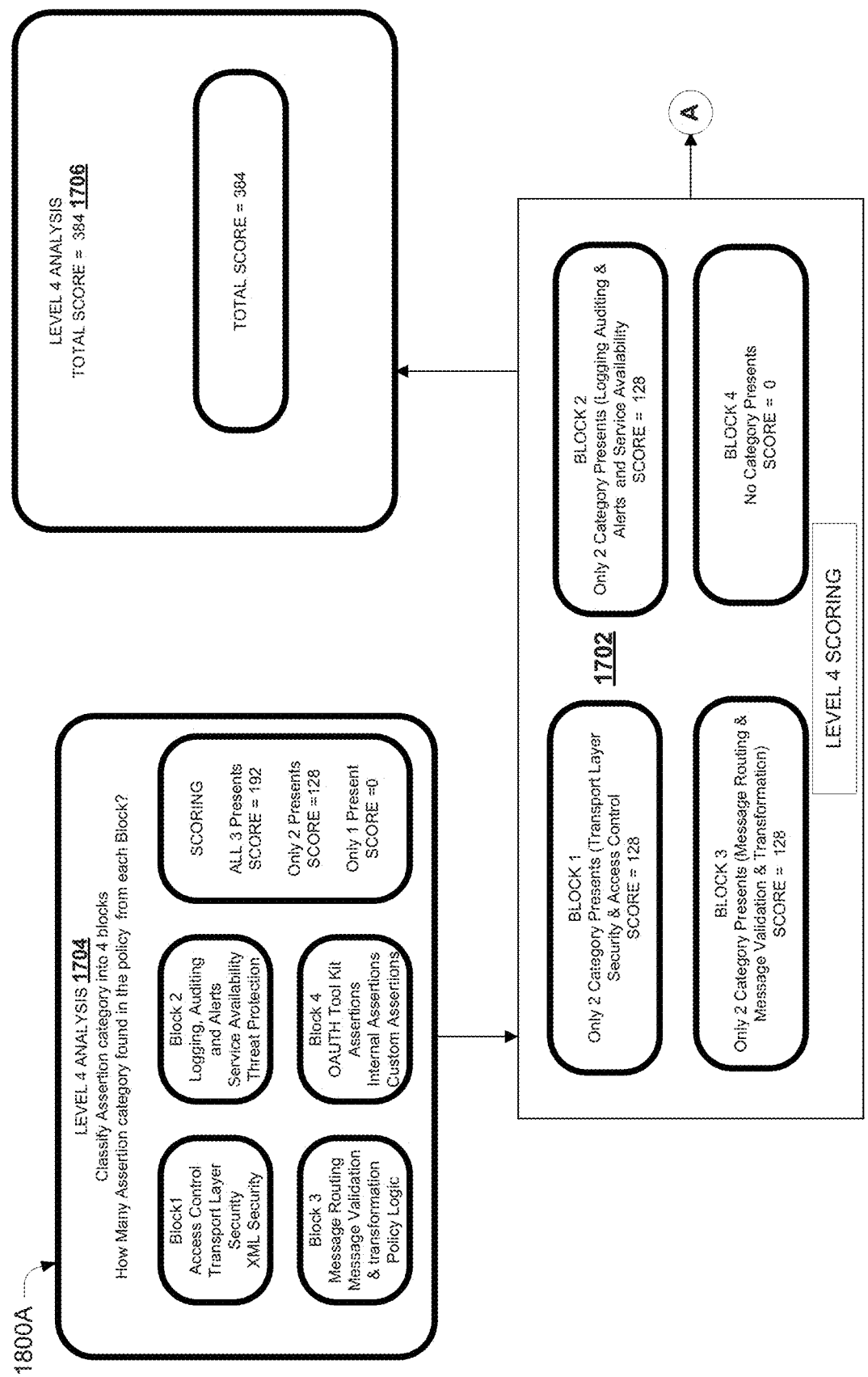
FIGS. 18A and 18B illustrate a flow diagram for a fifth level for a scoring technique deployed for security risk profiling of an API by deploying an API assessment system, according to an example embodiment of the present disclosure.
Figure 18B:
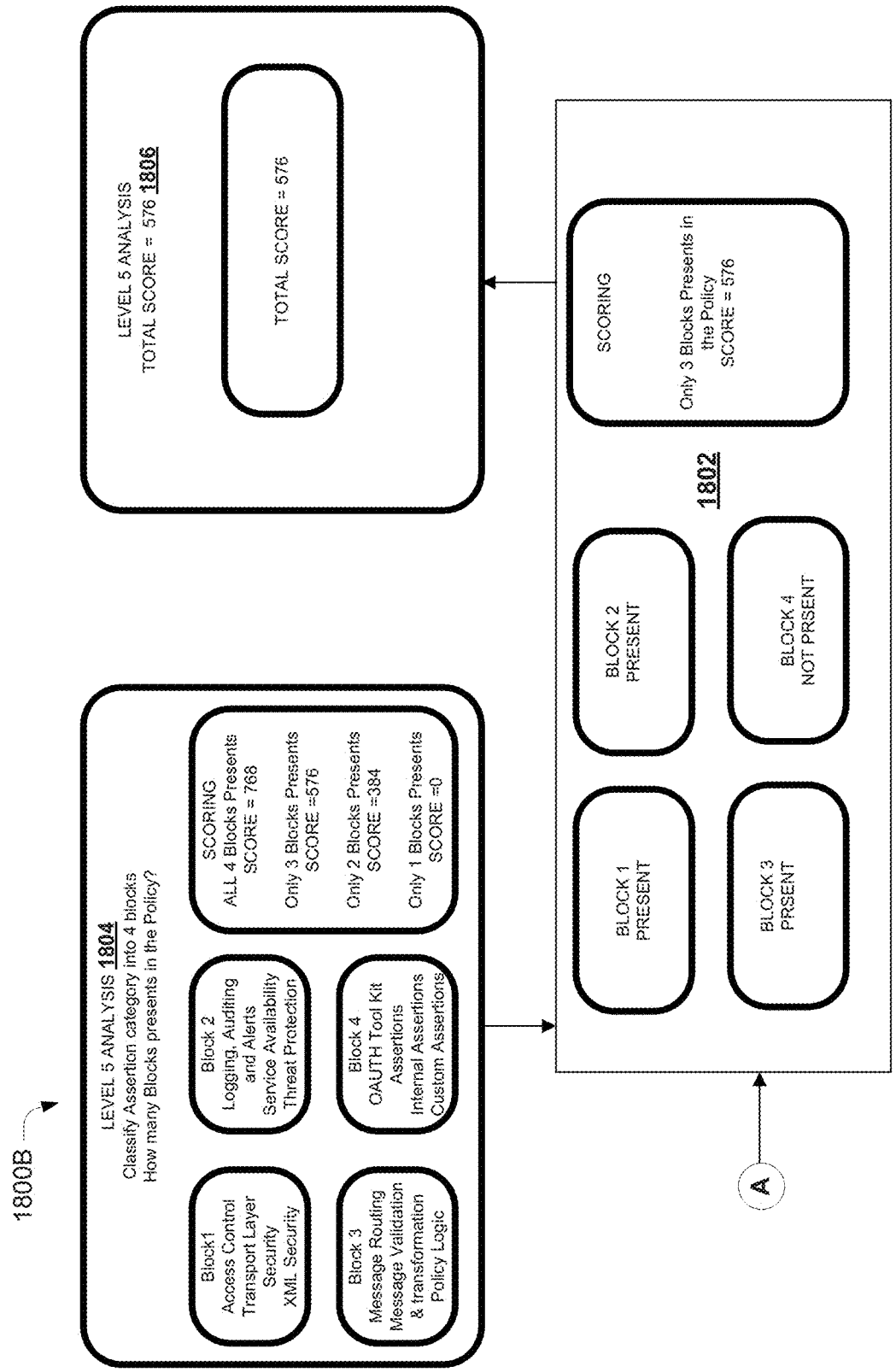

FIGS. 18A and 18B illustrate a flow diagram 1800 for a fifth level for a scoring technique deployed for security risk profiling of an API by deploying the API assessment system 110, according to an example embodiment of the present disclosure. The components of the system 110 may be deployed for the description of FIGS. 18A and 18B. For the same of brevity and technical clarity any description of the components of the system 110 described above may be repeated hereinafter. The description of FIGS. 17A and 17B may in continuation with the FIGS. 14A,14B, 15A, 15B, 16A, 16B, 17A, and 17B since the FIGS. 18A and 18B represent the fifth level for the regression model. The fifth level may be the fifth risk mapping level from the plurality of risk mapping levels 226. The analysis 1704, the scoring 1702, and the calculation 1706 may remain the same as illustrated. The level 5 mapping may further include an analysis 1804. The analysis 1804 may include identification of the plurality of groups for level 5 based on for example, how many groups from the level 4 mapping may be present in an API. The system may assign a fifth score value to each of the plurality of groups for level 5 based on the analysis 1804. The fifth score value may be greater than the fourth score value. For example, the plurality of groups for the level may include a group 1 "Access Control, Transport Layer Security, XML Security", a group 2 "Logging, Auditing and Alerts, Service Availability, Threat Protection", a group 3 "Message Routing, Message Validation & transformation, Policy Logic", and a group 4 "OAUTH Tool Kit Assertions, Internal Assertions, Custom Assertions". The fifth score value assigned herein may be based on for example, how many groups from those mentioned above may present in an API. In the illustrated example, for a score for all 4 groups present may be "768", a score for 3 groups present may be "576", the score for 2 groups present may be "384" and the score for no group present may be "0". It should be clear to a person skilled in the art that the fifth score value may be substantially greater than the fourth score value, the third score value, the second score value, and the first score value. The level 5 risk mapping may further include implementing a scoring 1802 wherein the fifth score value may be applied to the scoring 1702. The system 110 may implement a calculation 1806, wherein a total score for level 5 may be calculated. The total score may include an aggregation of all the scores assigned as per the group number to each of the components present in the scoring 1802. In the illustrated example, the total score for level 5 may be "576". In accordance with various embodiments of the present disclosure, the fifth score value, the fourth, the third score value, the second score value, and the first score value may be pre-defined into the system 110 by a user.

Figure 19:
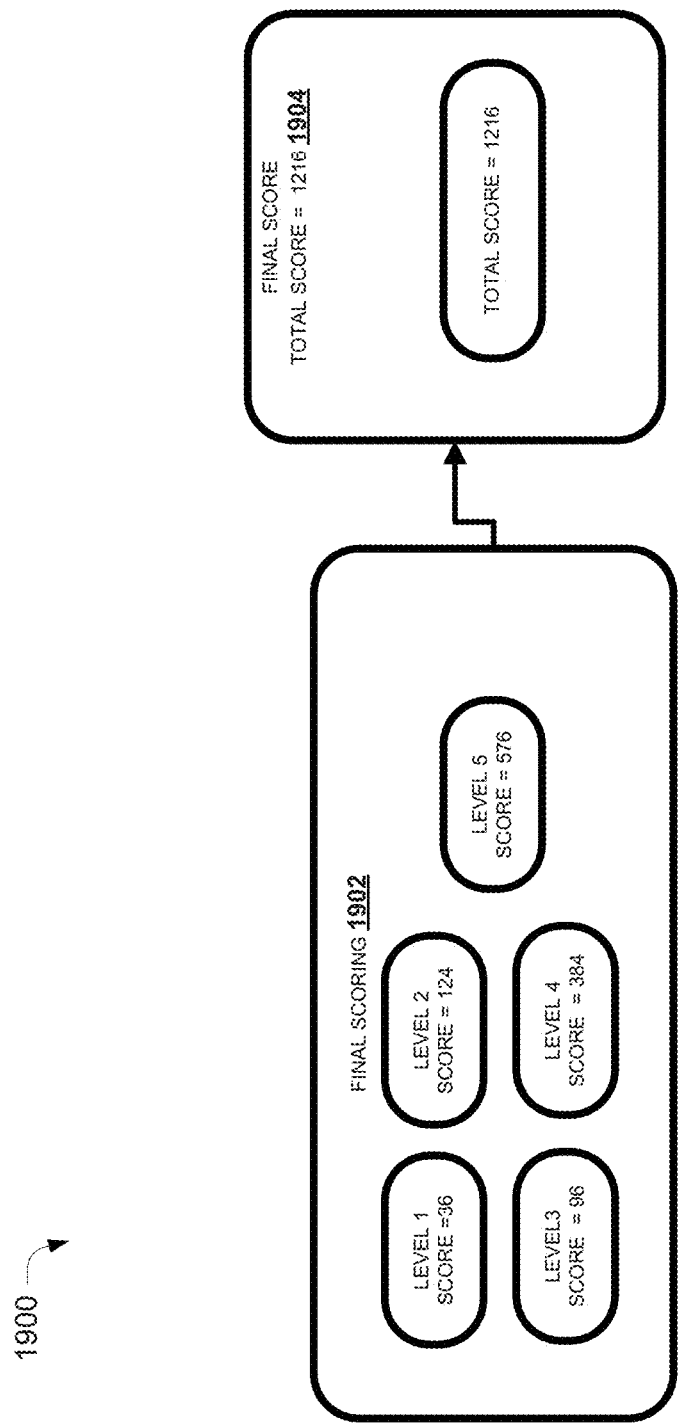
FIG. 19 illustrates a flow diagram for a score calculation level for a scoring technique deployed for security risk profiling of an API by deploying an API assessment system, according to an example embodiment of the present disclosure.

FIG. 19 illustrates a flow diagram 1900 for a score calculation level for a scoring technique deployed for security risk profiling of an API by deploying the API assessment system 110, according to an example embodiment of the present disclosure. The components of the system 110 may be deployed for the description of FIG. 19. For the same of brevity and technical clarity any description of the components of the system 110 described above may be repeated hereinafter. The final score calculation may be done by aggregating the fifth score value, the fourth score value, the third score value, the second score value, and the first score value at a step 1902. For example, the fifth score value "576", the fourth score value "384", the third score value "96", the second score value "124", and the first score value "36". The calculation may further include a final score 1904. In the illustrated example, the final score 1904 may be "1216".

Figure 20:
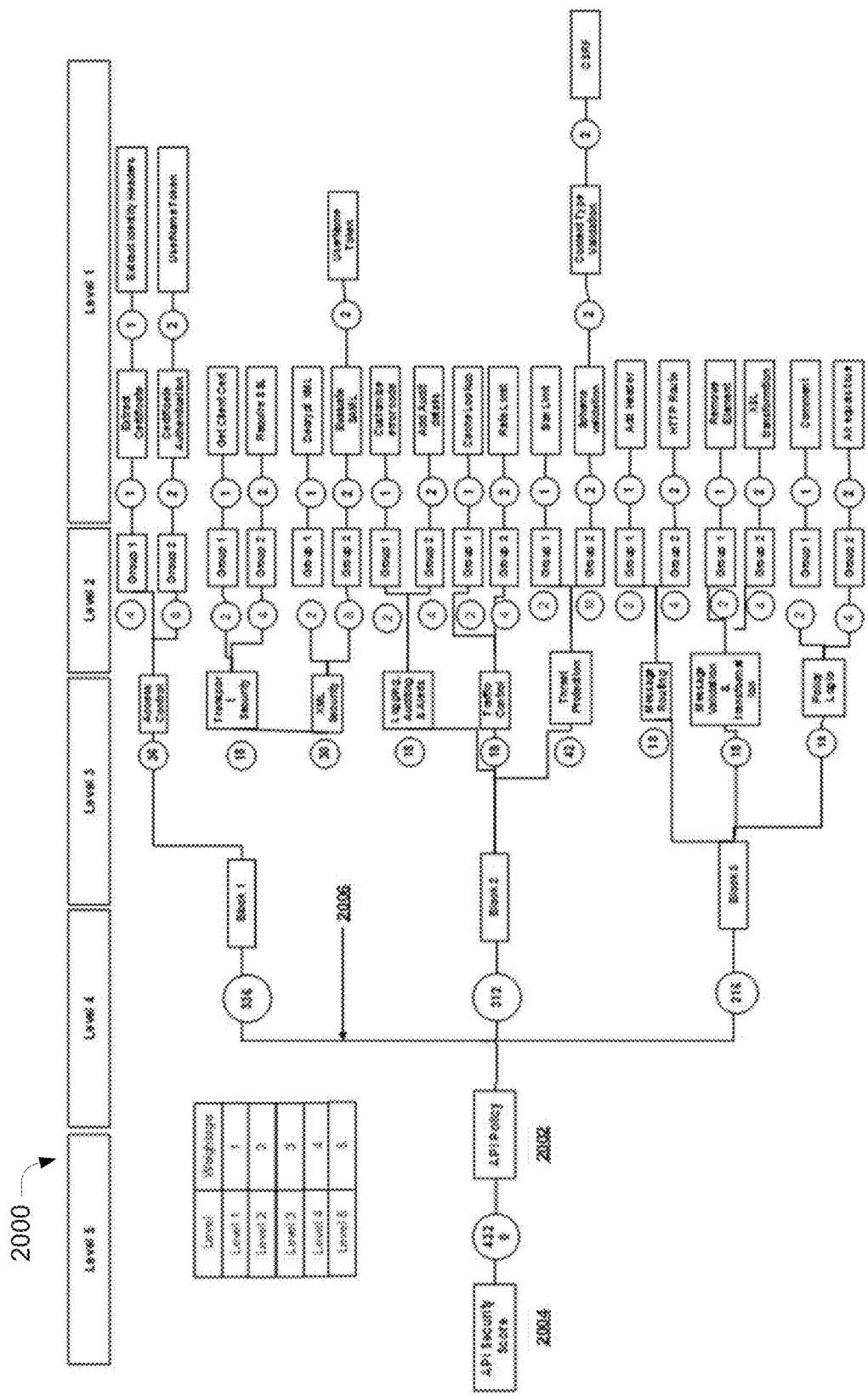
FIG. 20 illustrates a risk profile for an API as created by the deployment of an API assessment system, according to an example embodiment of the present disclosure.

FIG. 20 illustrates a risk profiling 2000 for an API as created by the deployment of the API assessment system 110, according to an example embodiment of the present disclosure. The components of the system 110 may be deployed for the description of FIG. 20. For the same of brevity and technical clarity any description of the components of the system 110 described above may be repeated hereinafter. The FIG. 20 illustrates an example of the calculation of a risk score 2004 for an API policy 2002. The FIG. 20 may include the API policy deconstructed to form a classification model 2006 that may be the same as the sequence classification model 218 as described above. The risk profiling 2000 may further include the plurality of risk mapping levels 226 such as the level 1, the level 2, the level 3, the level 4, and the level 5. The system 110 may implement the score techniques as described by the FIGS. 14A-19 for the risk profiling 2000 as illustrated.

Figure 21:
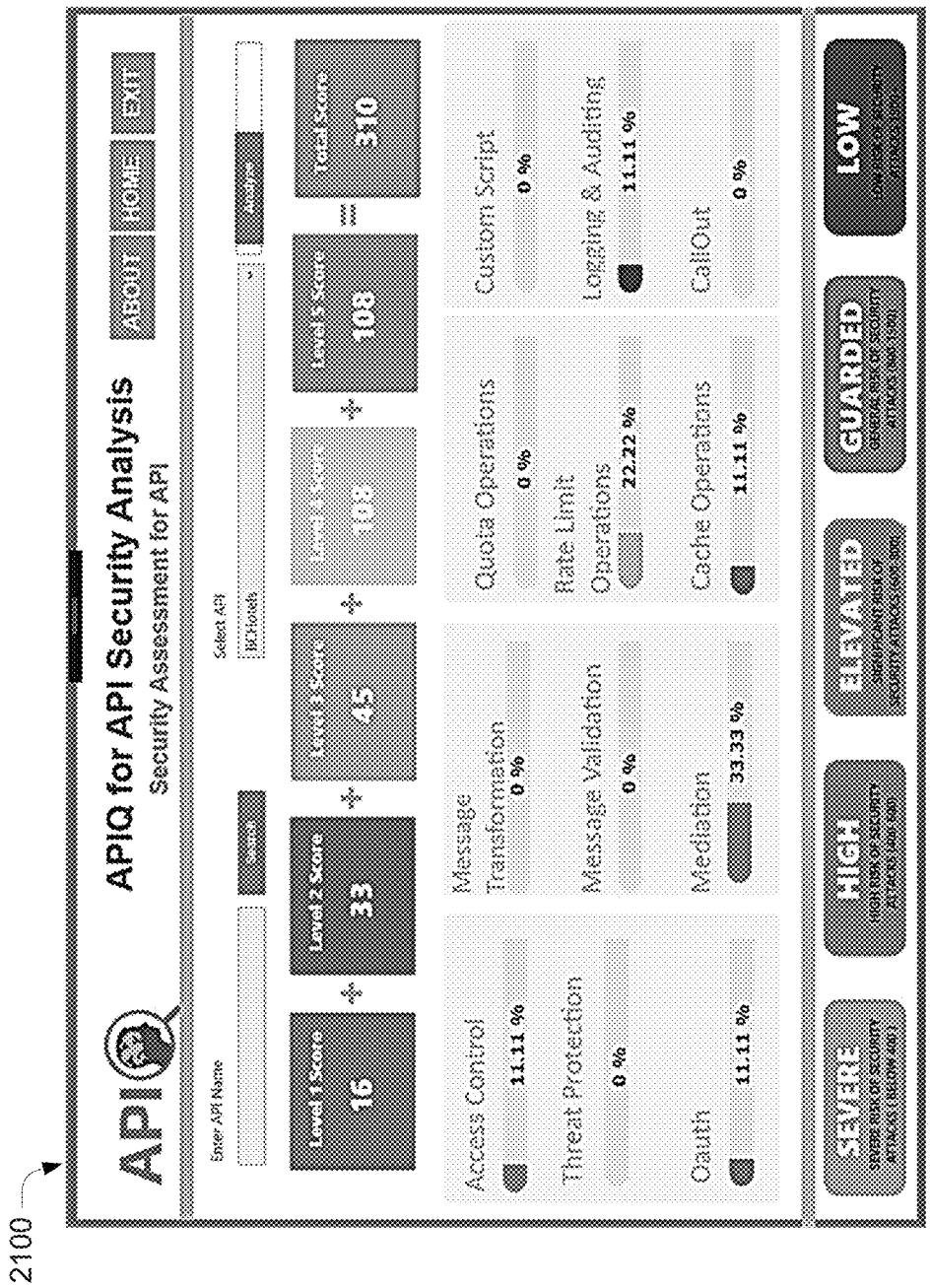
FIG. 21 illustrates a pictorial representation for an API security assessment performed by an API assessment system, according to an example embodiment of the present disclosure.

FIG. 21 illustrates a pictorial representation 2100 for an API security assessment performed by the API assessment system 110, according to an example embodiment of the present disclosure. The components of the system 110 may be deployed for the description of FIG. 21. For the same of brevity and technical clarity any description of the components of the system 110 described above may be repeated hereinafter. In an example, the pictorial representation 2100 may illustrate the score L1, L2, L3, L4, and L5 associated with each of the plurality of risk mapping levels 226. For example, the L1 score may be 16, the L2 score may be L3, the L3 score may be 45, the L4 score may be 108, and the L5 score may be 108, thereby leading to a total risk score 232 as 310. In the illustrated example, various risk parameters such as "Access Control", "Threat Protection", "Oauth", "Message", "Message Validation", "Mediation", "Quota Operations", "Rate Limit Cache Operations", "Custom Script", "logging and auditing", and "callout" may be mapped across the level 1, the level 2, the level 3, the level 4, and the level 5 to generate the risk score 232.

Figure 22:
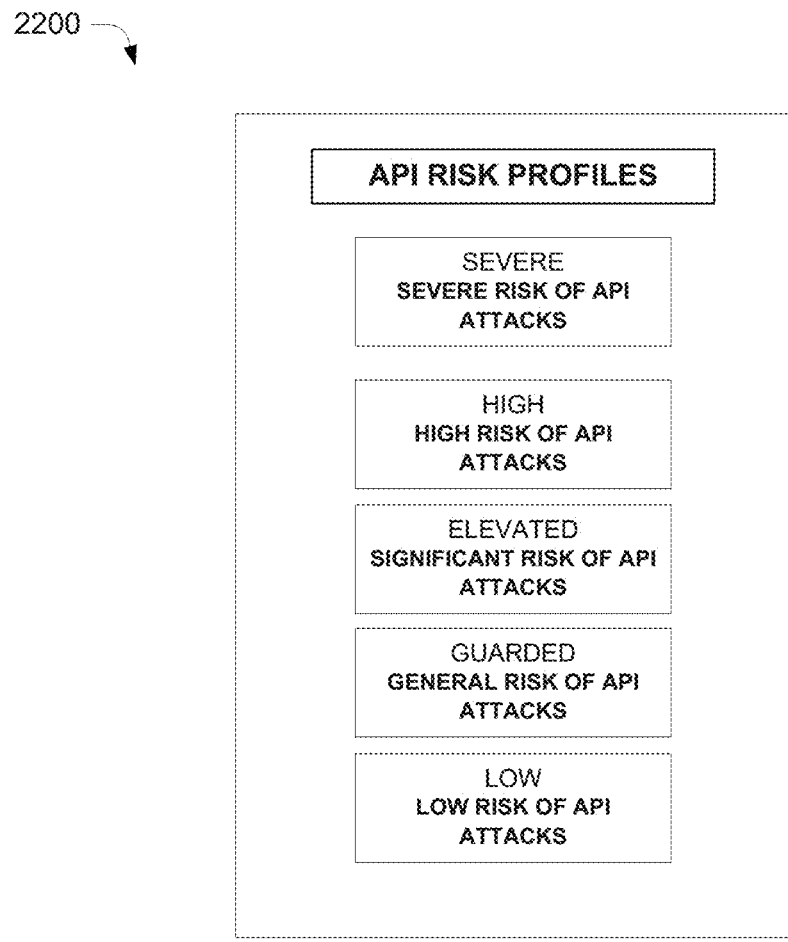
FIG. 22 illustrates examples of risk profile levels detected by an API assessment system for security assessment, according to an example embodiment of the present disclosure.

FIG. 22 illustrates a examples of risk profile levels detected by the API assessment system 110 for security assessment, according to an example embodiment of the present disclosure. The components of the system 110 may be deployed for the description of FIG. 22. For the same of brevity and technical clarity any description of the components of the system 110 described above may be repeated hereinafter. The diagram 2200 may be comprising a detailed view of the API security risk profile 230 as detected by the API assessment system 110 for security assessment as an exemplary embodiment of the present disclosure. In the illustrated example, the "low" risk level may pertain to a low risk of API attack, the "guarded" risk level may pertain to a general risk of API attack, the "elevated" risk level may pertain to a significant risk of API attack, the "high" risk level may pertain to a high risk of API attack, and the "severe" risk level may pertain to a severe risk of API attack.

Figure 23:
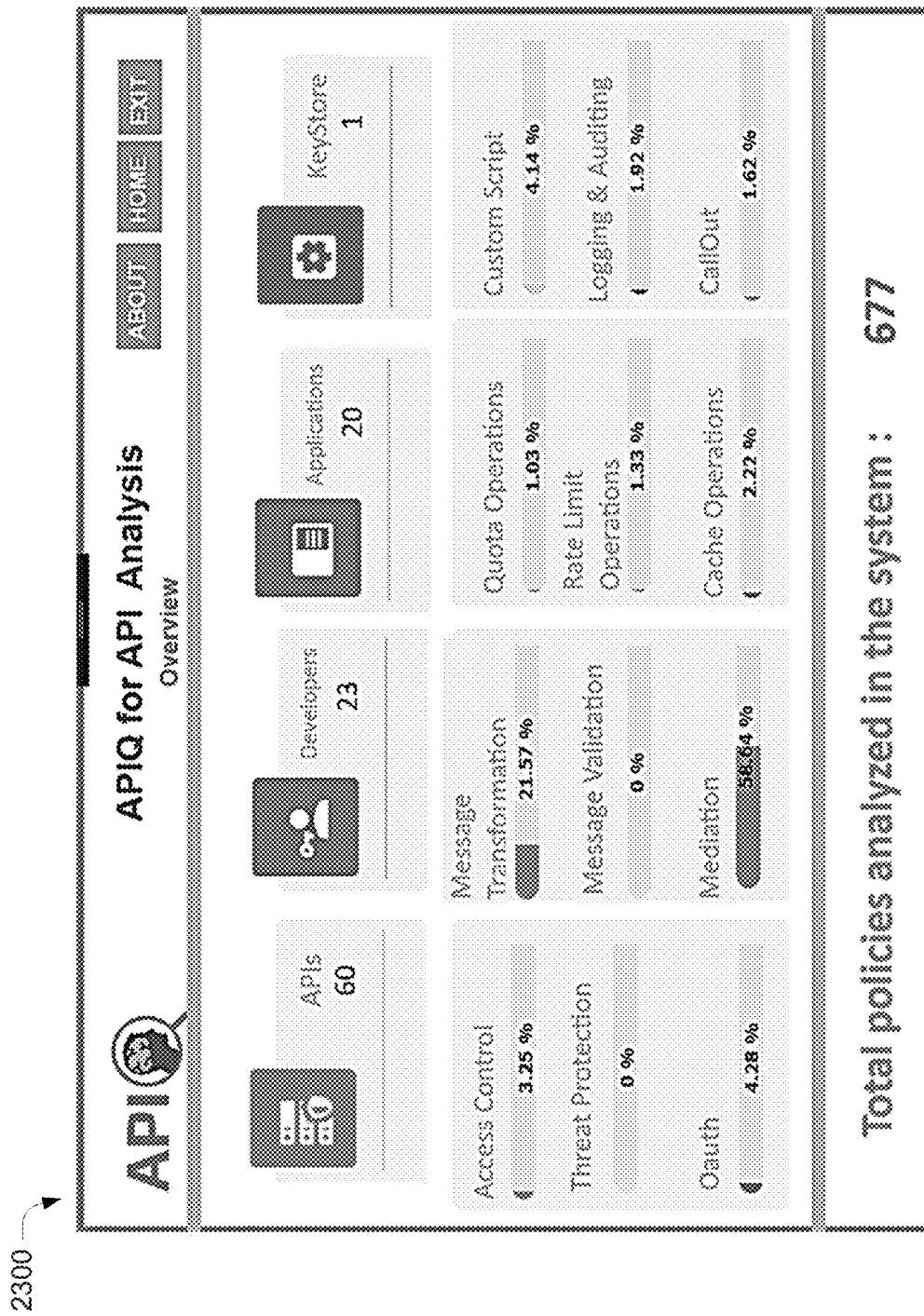
FIG. 23 illustrates a pictorial representation of an overview of a security assessment performed by an API assessment system, according to an example embodiment of the present disclosure.

FIG. 23 illustrates a pictorial representation 2300 of an overview of a security assessment performed by the API assessment system 110, according to an example embodiment of the present disclosure. The components of the system 110 may be deployed for the description of FIG. 23. For the same of brevity and technical clarity any description of the components of the system 110 described above may be repeated hereinafter. The pictorial representation 2300 may represent the security assessment result along with risk protection levels for the plurality of risk parameters 224 such as "Access Control", "Threat Protection", "Oauth", "Message", "Message Validation", "Mediation", "Quota Operations", "Rate Limit Cache Operations", "Custom Script", "logging and auditing", and "callout".

Figure 24:
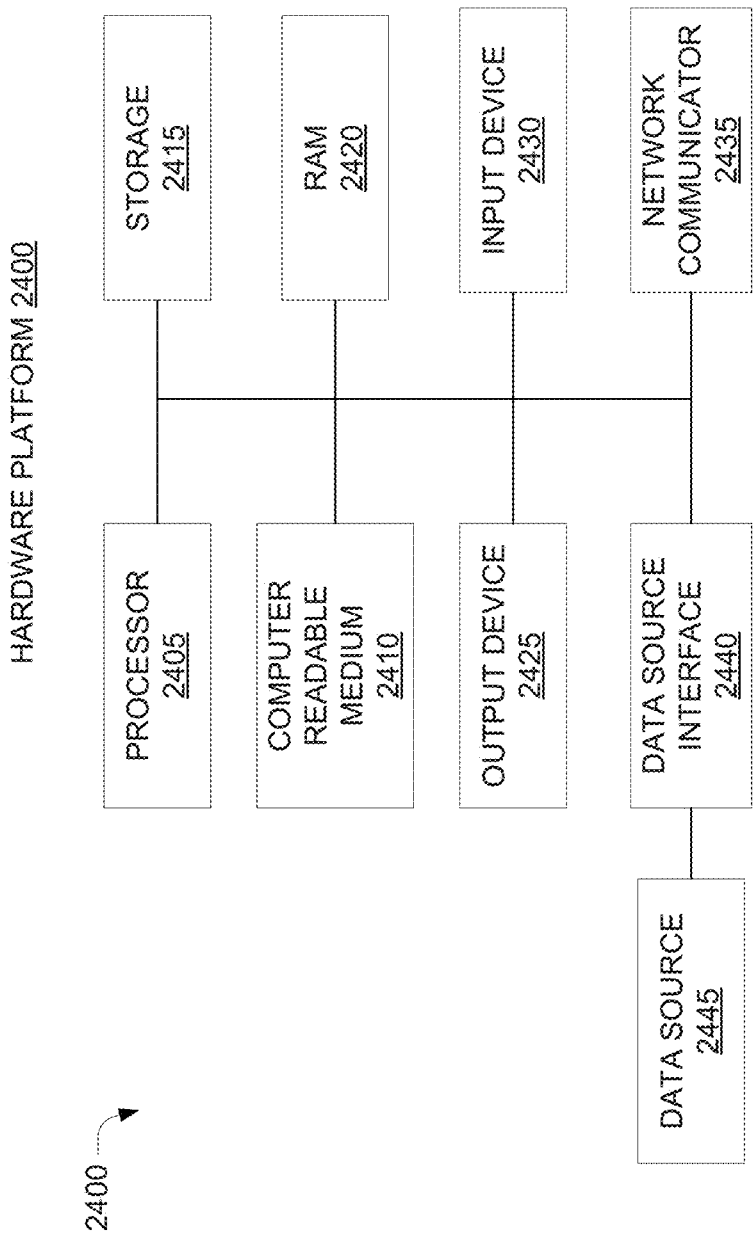
FIG. 24 illustrates a hardware platform for the implementation of an API assessment system, according to an example embodiment of the present disclosure.

FIG. 24 illustrates a hardware platform 2400 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 2400. The hardware platform 2400 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 24, the hardware platform 2400 may be a computer system 2400 that may be used with the examples described herein. The computer system 2400 may represent a computational platform that includes components that may be in a server or another computer system. The computer system 2400 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 2400 may include a processor 2405 that executes software instructions or code stored on a non-transitory computer-readable storage medium 2410 to perform methods of the present disclosure. The software code includes, for example, instructions to gather data and documents and analyze documents. In an example, the data corpus builder 130, the data classifier 140, the risk profiler 150, and the data rectifier 160 may be software codes or components performing these steps.

The instructions on the computer-readable storage medium 2410 are read and stored the instructions in storage 2424 or in random access memory (RAM) 2420. The storage 2424 provides a large space for keeping static data where at least some instructions could be stored for later execution. The stored instructions may be further compiled to generate other representations of the instructions and dynamically stored in the RAM 2420. The processor 2405 reads instructions from the RAM 2420 and performs actions as instructed.

The computer system 2400 further includes an output device 2425 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 2400 further includes input device 2430 to provide a user or another device with mechanisms for entering data and/or otherwise interact with the computer system 2400. The input device may include, for example, a keyboard, a keypad, a mouse, or a touchscreen. Each of these output devices 2425 and input devices 2430 could be joined by one or more additional peripherals. In an example, the output device 2425 may be used to display the results of the query 202.

A network communicator 2435 may be provided to connect the computer system 2400 to a network and in turn to other devices connected to the network including other clients, servers, data stores, and interfaces, for instance. A network communicator 2435 may include, for example, a network adapter such as a LAN adapter or a wireless adapter. The computer system 2400 includes a data source interface 2440 to access data source 2445. A data source is an information resource. As an example, a database of exceptions and rules may be a data source. Moreover, knowledge repositories and curated data may be other examples of data sources.

Figure 25A:
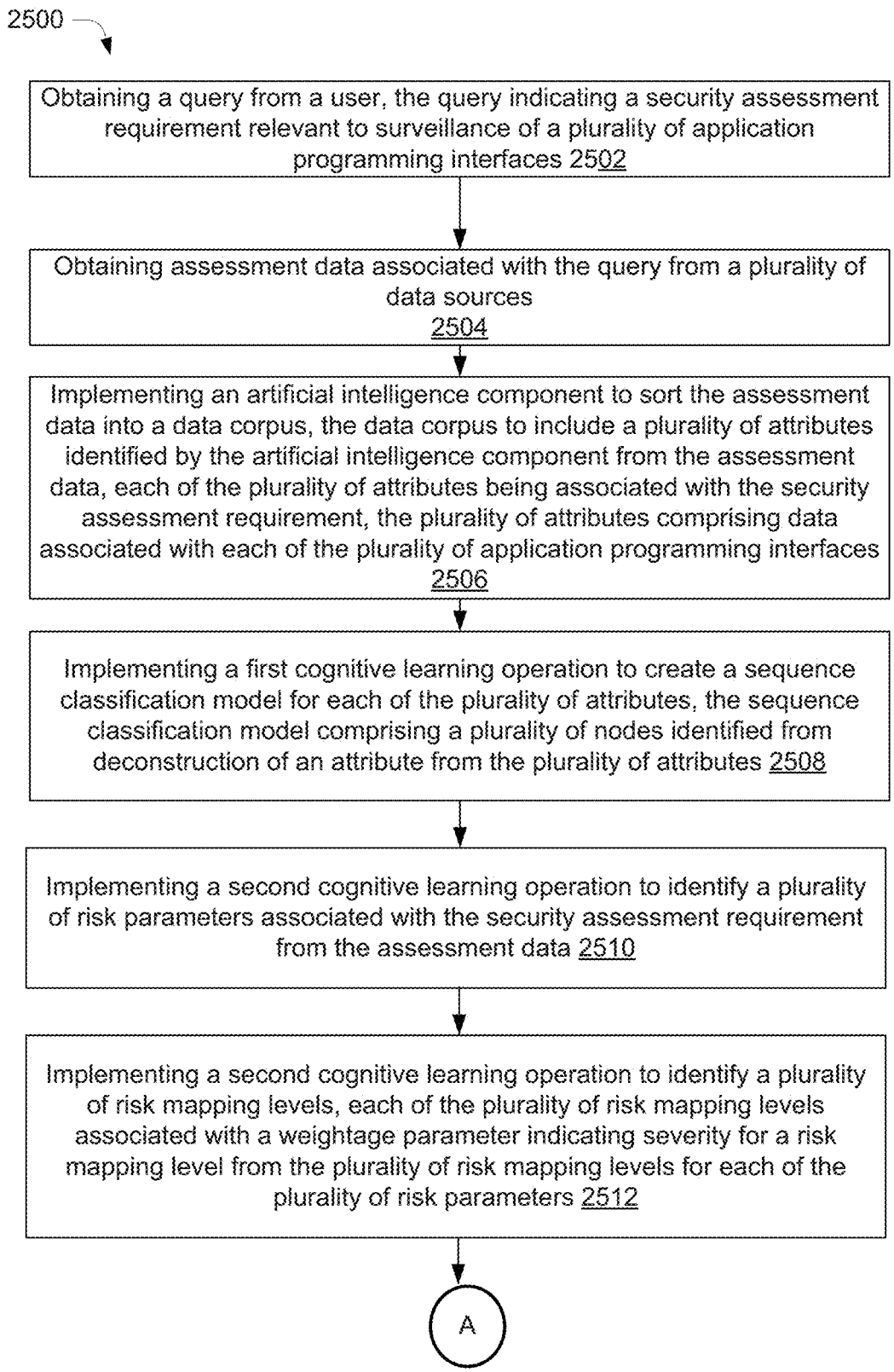
FIGS. 25A and 25B illustrate a process flowchart for security assessment using an API assessment system, according to an example embodiment of the present disclosure.
Figure 25B:
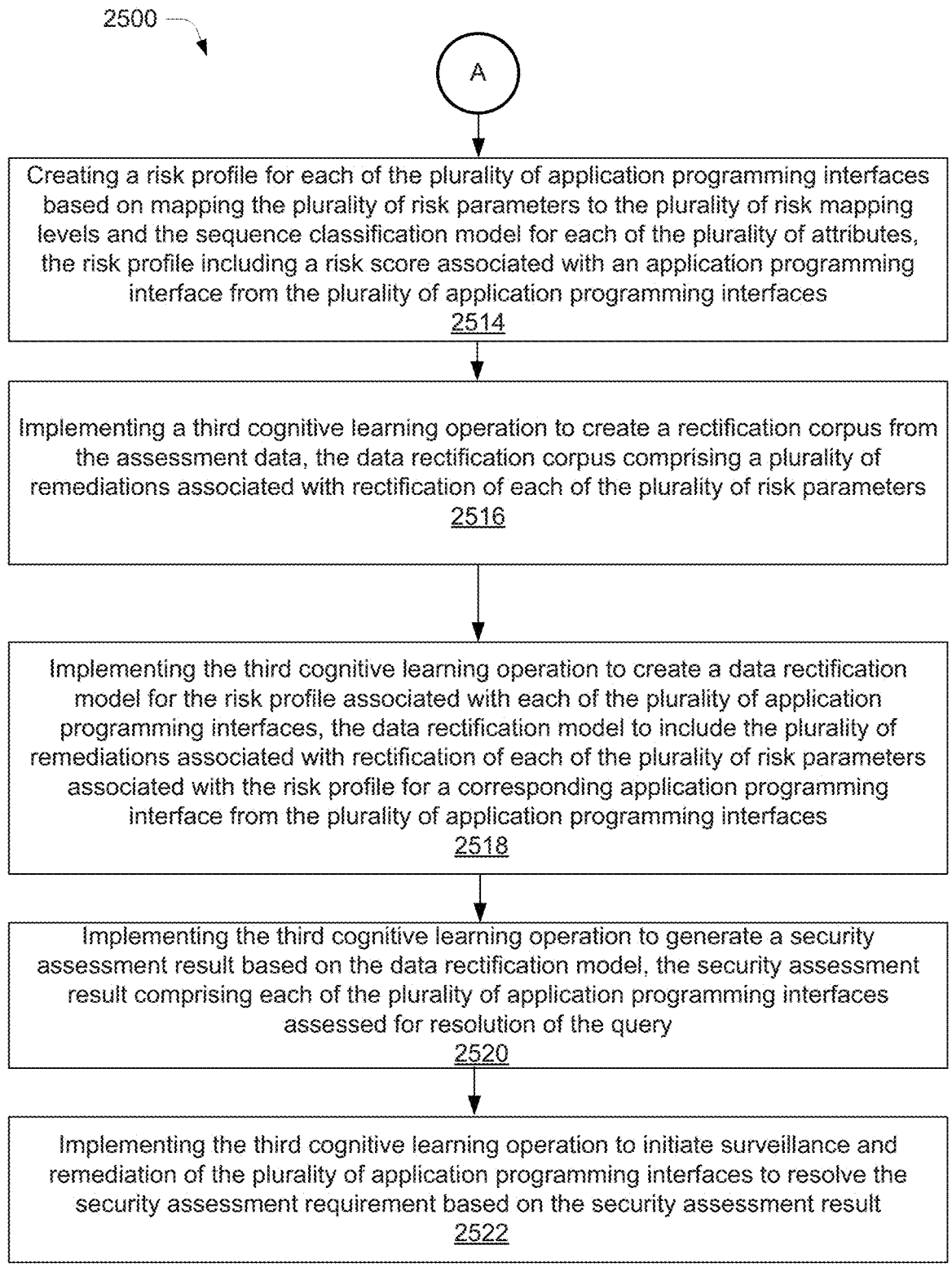

FIGS. 25A and 25B illustrate a process flowchart for security assessment using the API assessment system 110, according to an example embodiment of the present disclosure.

It should be understood that method steps are shown here for reference only and other combinations of the steps may be possible. Further, the method 2500 may contain some steps in addition to the steps shown in FIG. 25. For the sake of brevity, construction and operational features of the system 110 which are explained in detail in the description of FIGS. 1-24 are not explained in detail in the description of FIG. 25. The method 2500 may be performed by a component of the system 110, such as the processor 120, the data corpus builder 130, the data classifier 140, the risk profiler 150, and the data rectifier 160.

At block 2502, a query 202 may be obtained by a user. The query 202 may be indicating a security assessment requirement 206 relevant to surveillance of a plurality of application programming interfaces 208

At block 2504, assessment data 204 associated with the query 202 may be obtained from a plurality of data sources.

At block 2506, an artificial intelligence component 210 may be implemented to sort the assessment data 204 into a data corpus 214. The data corpus 214 may include a plurality of attributes 212 identified by the artificial intelligence component 210 from the assessment data 204. Each of the plurality of attributes 212 may be associated with the security assessment requirement 206. Each of the plurality of attributes 212 may be comprising data associated with each of the plurality of application programming interfaces 208.

At block 2508, a first cognitive learning operation 216 may be implemented to create a sequence classification model 218 from the data corpus 214. The sequence classification model 218 may be comprising a plurality of nodes 220 identified from a deconstruction of an attribute from the plurality of attributes 212.

At block 2510, a second cognitive learning operation 222 may be implemented to identify a plurality of risk parameters 224 associated with the security assessment requirement 206 from the assessment data 204.

At block 2512, the second cognitive learning operation 222 may be implemented to identify a plurality of risk mapping levels 226. Each of the plurality of risk mapping levels 226 may be associated with a weightage parameter 228 indicating severity for a risk mapping level from the plurality of risk mapping levels 226 for each of the plurality of risk parameters 224.

At block 2514, the second cognitive learning operation 222 may be implemented to create a risk profile 230 for each of the plurality of application programming interfaces 208 based on mapping the plurality of risk parameters 224 to the plurality of risk mapping levels 226 and the sequence classification model 218, the risk profile 230 to include a risk score 232 associated with an application programming interface from the plurality of application programming interfaces 208.

At block 2516, a third cognitive learning operation 238 may be implemented to create a rectification corpus 234 from the assessment data 204. The rectification corpus 234 may be comprising a plurality of remediations 236 associated with the rectification of each of the plurality of risk parameters 224 for each of the plurality of risk mapping levels 226.

At block 2518, the third cognitive learning operation 238 may be implemented to create a data rectification model 240 for the risk profile 230 associated with each of the plurality of application programming interfaces 208. The data rectification model 240 may include the plurality of remediations 236 associated with the rectification of each of the plurality of risk parameters 224 associated with the risk profile 230 for a corresponding application programming interfaces from the plurality of application programming interfaces 208.

At block 2520, the third cognitive learning operation 238 may be implemented to generate a security assessment result based on the data rectification model 240, the security assessment result comprising each of the plurality of application programming interfaces 208 assessed for resolution of the query 202.

At block 2522, based on the security assessment result, the third cognitive learning operation 238 may be implemented. The third security assessment may perform a remediation action to resolve a security issue associated with the security assessment requirement. The remediation action may include initiating surveillance and/or initiating a remediation process to remedy the security issue. In an example, the remediation process may be predefined, based on historical data and user feedback.

In an example, the method 2500 may further comprise obtaining the assessment data 204 on a near real-time basis from the plurality of data sources. The method 2500 may further comprise redistributing the sequence classification model 218 to create a harmonized sequence classification model 218 comprising surveillance insight associated with the plurality of application programming interfaces 208, the harmonized sequence classification model 218 to be used for resolution of the query 202. The method 2500 may further comprise assigning the risk score 232 for each of the plurality of nodes 220 based on the weightage parameter 228 associated with the plurality of risk mapping levels 226. The method 2500 may further comprise obtaining user input to implement the data rectification model 240 for the risk profile 230 associated with each of the plurality of application programming interfaces 208. The method 2500 may further comprise updating the rectification corpus 234 based on an update in the assessment data 204. The method 2500 may further comprise compounding the weightage parameter 228 for each of the plurality of risk mapping levels 226 to indicate an increase in the severity for a risk mapping level from the plurality of risk mapping levels 226.

In an example, the method 2500 may be practiced using a non-transitory computer-readable medium. In an example, the method 2500 may be a computer-implemented method.

The present disclosure provides for an API assessment system that may generate key insights related to security assessment of an API on a near real-time basis while incurring minimal costs and minimal human intervention. Furthermore, the present disclosure may categorically analyze various parameters that may have an impact on deciding an appropriate remediation action for a risk parameter, thereby providing a holistic security assessment of an API.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;

a data corpus builder coupled to the processor, the data corpus builder to:
  obtain a query from a user, the query indicating a security assessment requirement relevant to surveillance of a plurality of application programming interfaces;
  obtain assessment data associated with the query from a plurality of data sources; and
  implement an artificial intelligence component to sort the assessment data into a data corpus, the data corpus to include a plurality of attributes identified by the artificial intelligence component from the assessment data, each of the plurality of attributes being associated with the security assessment requirement, the plurality of attributes comprising data associated with each of the plurality of application programming interfaces;
a data classifier coupled to the processor, the data classifier to implement a first cognitive learning operation to create a sequence classification model for each of the plurality of attributes, the sequence classification model comprising a plurality of nodes identified from deconstruction of an attribute from the plurality of attributes;
a risk profiler coupled to the processor to implement a second cognitive learning operation to:
  identify a plurality of risk parameters associated with the security assessment requirement from the assessment data,
  identify a plurality of risk mapping levels, each of the plurality of risk mapping levels associated with a weightage parameter indicating severity for a risk mapping level from the plurality of risk mapping levels for each of the plurality of risk parameters; and
  create a risk profile for each of the plurality of application programming interfaces based on mapping the plurality of risk parameters to the plurality of risk mapping levels and the sequence classification model for each of the plurality of attributes, the risk profile including a risk score associated with an application programming interface from the plurality of application programming interfaces;
a data rectifier coupled to the processor, the data rectifier to implement a third cognitive learning operation to:
  create a rectification corpus from the assessment data, the rectification corpus comprising a plurality of remediations associated with rectification of each of the plurality of risk parameters;
  create a data rectification model for the risk profile associated with each of the plurality of application programming interfaces, the data rectification model to include the plurality of remediations associated with rectification of each of the plurality of risk parameters associated with the risk profile for a corresponding application programming interface from the plurality of application programming interfaces;
  generate a security assessment result based on the data rectification model, the security assessment result comprising each of the plurality of application programming interfaces assessed for resolution of the query; and
  perform a remediation action to address the security assessment requirement, based on the security assessment result.

2. The system as claimed in claim 1, wherein the data corpus builder is to obtain the assessment data on a near real-time basis from the plurality of data sources.

3. The system as claimed in claim 1, wherein the data classifier is to redistribute the sequence classification model by synchronizing the plurality of nodes to create a harmonized sequence classification model comprising surveillance insight associated with the plurality of application programming interfaces, the harmonized sequence classification model being used for resolution of the query.

4. The system as claimed in claim 1, wherein the risk profiler is to assign a level score to each of the plurality of risk mapping levels based on the weightage parameter associated with the plurality of risk mapping levels.

5. The system as claimed in claim 4, wherein the risk profiler is to determine the risk score associated with the application programming interface from the plurality of application programming interfaces based on aggregation of the level score for each of the plurality of risk mapping levels.

6. The system as claimed in claim 1, wherein the data rectifier is to update the rectification corpus based on an update in the assessment data.

7. The system as claimed in claim 1, wherein the risk profiler is to compound value of the weightage parameter for each of the plurality of risk mapping levels to indicate an increase in the severity for the risk mapping level from the plurality of risk mapping levels.

8. A method comprising:
  obtaining, by a processor, a query from a user, the query indicating a security assessment requirement relevant to surveillance of a plurality of application programming interfaces;
  obtaining, by the processor, assessment data associated with the query from a plurality of data sources;
  implementing, by the processor, an artificial intelligence component to sort the assessment data into a data corpus, the data corpus to include a plurality of attributes identified by the artificial intelligence component from the assessment data, each of the plurality of attributes being associated with the security assessment requirement, the plurality of attributes comprising data associated with each of the plurality of application programming interfaces;
  implementing, by the processor, a first cognitive learning operation to create a sequence classification model for each of the plurality of attributes, the sequence classification model comprising a plurality of nodes identified from deconstruction of an attribute from the plurality of attributes;
  implementing, by the processor, a second cognitive learning operation to identify a plurality of risk parameters associated with the security assessment requirement from the assessment data;
  implementing, by the processor, a second cognitive learning operation to identify a plurality of risk mapping levels, each of the plurality of risk mapping levels associated with a weightage parameter indicating severity for a risk mapping level from the plurality of risk mapping levels for each of the plurality of risk parameters;
  creating, by the processor, a risk profile for each of the plurality of application programming interfaces based on mapping the plurality of risk parameters to the plurality of risk mapping levels and the sequence classification model for each of the plurality of attributes, the risk profile including a risk score an application programming interface from the plurality of application programming interfaces;

implementing, by the processor, a third cognitive learning operation to create a rectification corpus from the assessment data, the rectification corpus comprising a plurality of remediations associated with rectification of each of the plurality of risk parameters;

implementing, by the processor, the third cognitive learning operation to create a data rectification model for the risk profile associated with each of the plurality of application programming interfaces, the data rectification model to include the plurality of remediations associated with rectification of each of the plurality of risk parameters associated with the risk profile for a corresponding application programming interface from the plurality of application programming interfaces;

implementing, by the processor, the third cognitive learning operation to generate a security assessment result based on the data rectification model, the security assessment result comprising each of the plurality of application programming interfaces assessed for resolution of the query; and performing, by the processor, a remediation action to address the security assessment requirement, based on the security assessment result.

9. The method as claimed in claim 8, wherein the method further comprises obtaining, by the processor, the assessment data on a near real-time basis from the plurality of data sources.

10. The method as claimed in claim 8, wherein the method further comprises redistributing, by the processor, the sequence classification model by synchronizing the plurality of nodes to create a harmonized sequence classification model comprising surveillance insight associated with the plurality of application programming interfaces, the harmonized sequence classification model being used for resolution of the query.

11. The method as claimed in claim 8, wherein the method further comprises assigning, by the processor, a level score to each of the plurality of risk mapping levels based on the weightage parameter associated with the plurality of risk mapping levels.

12. The method as claimed in claim 11, wherein the method further comprises determining, by the processor, the risk score associated with the application programming interface from the plurality of application programming interfaces based on aggregation of the level score for each of the plurality of risk mapping levels.

13. The method as claimed in claim 8, wherein the method further comprises updating, by the processor, the rectification corpus based on an update in the assessment data.

14. The method as claimed in claim 8, wherein the method further comprises compounding, by the processor, the weightage parameter for each of the plurality of risk mapping levels to indicate an increase in the severity for the risk mapping level from the plurality of risk mapping levels.

15. A non-transitory computer readable medium including machine readable instructions that are executable by a processor to:

obtain a query from a user, the query indicating a security assessment requirement relevant to surveillance of a plurality of application programming interfaces;

obtain assessment data associated with the query from a plurality of data sources; and implement an artificial intelligence component to sort the assessment data into a data corpus, the data corpus to include a plurality of attributes identified by the artificial intelligence component from the assessment data, each of the plurality of attributes being associated with the security assessment requirement, the plurality of attributes comprising data associated with each of the plurality of application programming interfaces;

implement a first cognitive learning operation to create a sequence classification model for each of the plurality of attributes, the sequence classification model comprising a plurality of nodes identified from deconstruction of an attribute from the plurality of attributes;

implement a second cognitive learning operation to identify a plurality of risk parameters associated with the security assessment requirement from the assessment data;

implement the second cognitive learning operation to identify a plurality of risk mapping levels, each of the plurality of risk mapping levels associated with a weightage parameter indicating severity for a risk mapping level from the plurality of risk mapping levels for each of the plurality of risk parameters;

implement the second cognitive learning operation to create a risk profile for each of the plurality of application programming interfaces based on mapping the plurality of risk parameters, the plurality of risk mapping levels and the sequence classification model for each of the plurality of attributes, the risk profile including a risk score associated with an application programming interface from the plurality of application programming interfaces;

implement a third cognitive learning operation to create a rectification corpus from the assessment data, the rectification corpus comprising a plurality of remediations associated with rectification of each of the plurality of risk parameters;

implement a third cognitive learning operation to create a data rectification model for the risk profile associated with each of the plurality of application programming interfaces, the data rectification model to include the plurality of remediations associated with rectification of each of the plurality of risk parameters associated with the risk profile for a corresponding application programming interface from the plurality of application programming interfaces;

generate a security assessment result based on the data rectification model, the security assessment result comprising each of the plurality of application programming interfaces assessed for resolution of the query; and perform a remediation action to address the security assessment requirement, based on the security assessment result.

16. The non-transitory computer-readable medium of claim 15, wherein the processor is to obtain the assessment data on a near real-time basis from the plurality of data sources.

17. The non-transitory computer-readable medium of claim 15, wherein the processor is to redistribute the sequence classification model by synchronizing the plurality of nodes to create a harmonized sequence classification model comprising surveillance insight associated with the plurality of application programming interfaces, the harmonized sequence classification model being used for resolution of the query.

18. The non-transitory computer-readable medium of claim 15, wherein the processor is to assign a level score to each of the plurality of risk mapping levels based on the weightage parameter associated with the plurality of risk mapping levels and determine the risk score associated with the application programming interface from the plurality of application programming interfaces based on aggregation of the level score for each of the plurality of risk mapping levels.

19. The non-transitory computer-readable medium of claim 15, wherein the processor is to update the rectification corpus based on an update in the assessment data.

20. The non-transitory computer-readable medium of claim 15, wherein the processor is to compound the weightage parameter for each of the plurality of risk mapping levels to indicate an increase in the severity for the risk mapping level from the plurality of risk mapping levels.

* * * * *